US007016886B2

(12) United States Patent
Cabana et al.

(10) Patent No.: US 7,016,886 B2
(45) Date of Patent: Mar. 21, 2006

(54) ARTIFICIAL NEURONS INCLUDING WEIGHTS THAT DEFINE MAXIMAL PROJECTIONS

(75) Inventors: David R. Cabana, Cary, NC (US); Manuel Aparicio, IV, Chapel Hill, NC (US); James S. Fleming, Apex, NC (US)

(73) Assignee: Saffron Technology Inc., Morrisville, NC (US)

( * ) Notice: Subject to any disclaimer, the term of this patent is extended or adjusted under 35 U.S.C. 154(b) by 739 days.

(21) Appl. No.: 10/216,341

(22) Filed: Aug. 9, 2002

(65) Prior Publication Data

US 2003/0033265 A1 Feb. 13, 2003

Related U.S. Application Data

(60) Provisional application No. 60/311,316, filed on Aug. 10, 2001.

(51) Int. Cl.
*G06G 7/00* (2006.01)
(52) U.S. Cl. ........................................... 706/39
(58) Field of Classification Search ............... 706/39, 706/15
See application file for complete search history.

(56) References Cited

U.S. PATENT DOCUMENTS

| 4,660,166 | A | 4/1987 | Hopfield |
| 5,073,867 | A | 12/1991 | Murphy et al. |
| 5,103,405 | A | 4/1992 | Murphy et al. |
| 5,487,133 | A | 1/1996 | Park et al. |
| 5,619,709 | A | 4/1997 | Caid et al. |
| 5,719,955 | A | 2/1998 | Mita |
| 5,870,729 | A | 2/1999 | Yoda |
| 5,943,670 | A | 8/1999 | Prager |
| 6,052,679 | A * | 4/2000 | Aparicio et al. ............... 706/15 |
| 6,243,490 | B1 * | 6/2001 | Mita ........................... 382/158 |

FOREIGN PATENT DOCUMENTS

EP 0 461 902 A2 12/1991

OTHER PUBLICATIONS

*That's Not How My Brain Works*, Technology Review, vol. 102, No. 4, Jul./Aug. 1999, pp. 76-79.
*Report: IBM's Memory Agent*, Intelligence in Industry, vol. 8, No. 1, Jan. 1999, pp. 5-9.

* cited by examiner

Primary Examiner—Anthony Knight
Assistant Examiner—Nicole Allen
(74) Attorney, Agent, or Firm—Myers Bigel Sibley & Sajovec

(57) ABSTRACT

An artificial neuron includes inputs and dendrites, a respective one of which is associated with a respective one of the inputs. A respective dendrite includes a respective power series of weights. The weights in a given power of the power series represent a maximal projection. A respective power also may include at least one switch, to identify holes in the projections. By providing maximal projections, linear scaling may be provided for the maximal projections, and quasi-linear scaling may be provided for the artificial neuron, while allowing a lossless compression of the associations. Accordingly, hetero-associative and/or auto-associative recall may be accommodated for large numbers of inputs, without requiring geometric scaling as a function of input.

72 Claims, 36 Drawing Sheets

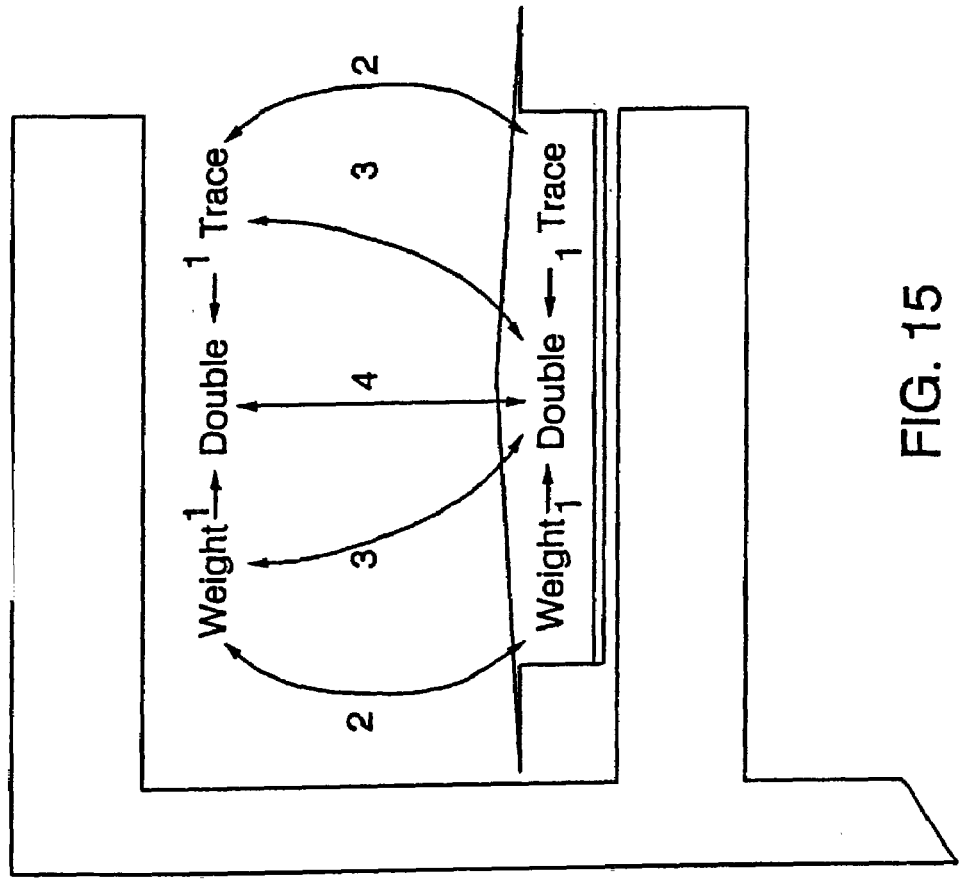
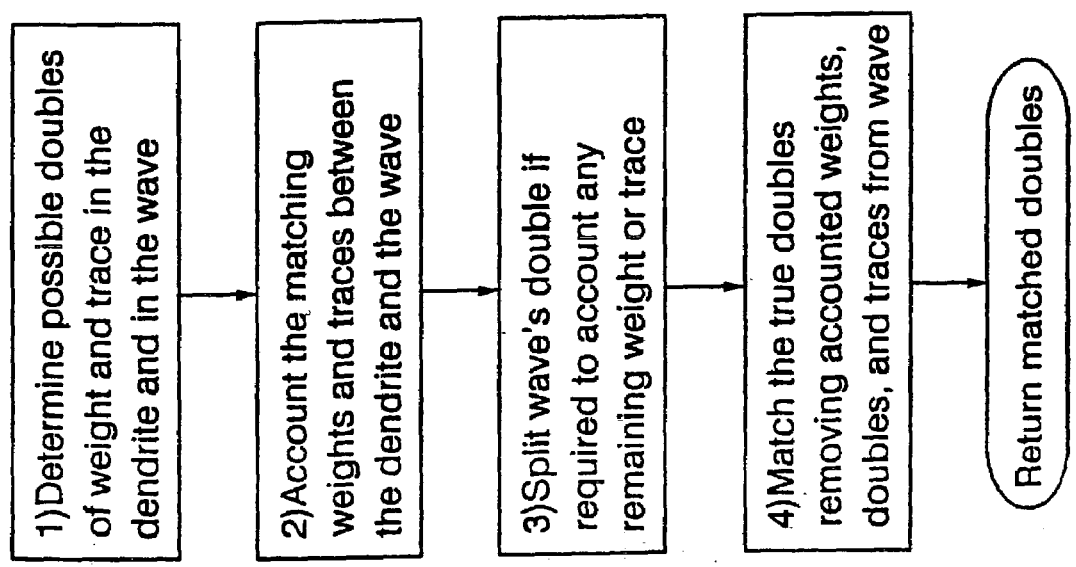
FIG. 15

FIG. 16
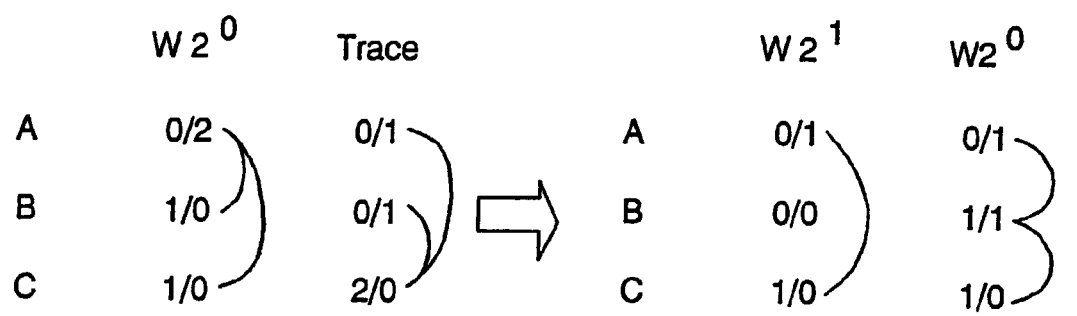
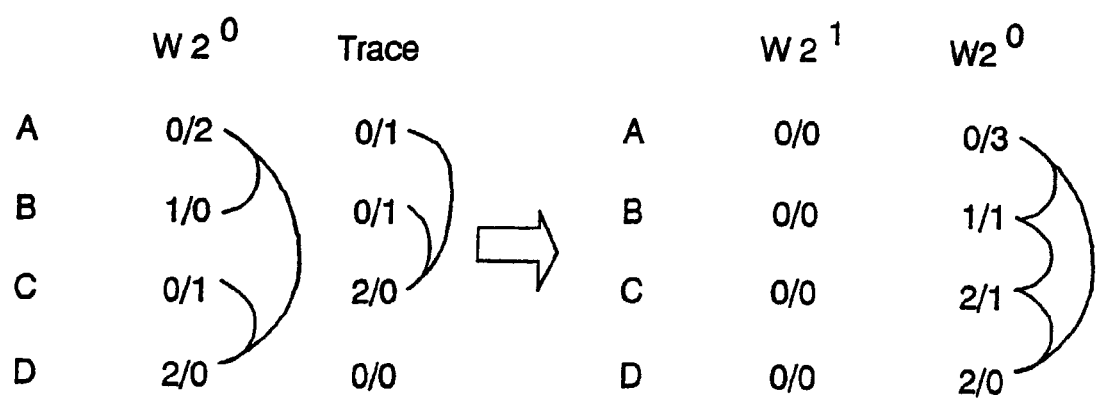

FIG. 18

1802
```
int possibleDouble = Math.min(traces[direction], weights[direction][wave.power]);
int possibleTrace = traces[direction] - possibleDouble;
int possibleWeight = weights[direction][wave.power] - possibleDouble;

int matchedTrace = Math.min(wave.priorTraces, possibleTrace);
int matchedWeight = Math.min(wave.priorWeights, possibleWeight);

int residualTrace = possibleTrace - matchedTrace;
int residualWeight = possibleWeight - matchedWeight;
int forcedSplits = Math.max(residualTrace, residualWeight);

wave.priorTraces += forcedSplits;
wave.priorWeights += forcedSplits;
wave.priorDoubles = forcedSplits;
```

1804
```
int matchedDoubles = Math.min(wave.priorDoubles, possibleDouble);

int truePriorTraces = traces[direction] - matchedDoubles;
int truePriorWeights = weights[direction][wave.power] - matchedDoubles;

wave.priorTraces = truePriorTraces;
wave.priorWeights = truePriorWeights;
wave.priorDoubles = matchedDoubles;
```

1806
```
int nextDoubles = Math.min(traces[nextDirection], weights[nextDirection][wave.power]);
wave.priorDoubles += nextDoubles;
wave.priorTraces += traces[nextDirection] - nextDoubles;
wave.priorWeights += weights[nextDirection][wave.power] - nextDoubles;
```

Adapted from *Discrete Tomography: A Historical Perspective*

FIGURE 36
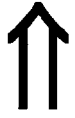

ARTIFICIAL NEURONS INCLUDING WEIGHTS THAT DEFINE MAXIMAL PROJECTIONS

CROSS-REFERENCE TO PROVISIONAL APPLICATION

This application claims the benefit of provisional Application Ser. No. 60/311,316, filed Aug. 10, 2001, entitled Compression of Power Series of Weights and Counts That Represent Row and Column Associations, assigned to the assignee of the present application, the disclosure of which is hereby incorporated herein by reference in its entirety as if set forth fully herein.

FIELD OF THE INVENTION

This invention relates to artificial intelligence systems, methods and computer program products, and more particularly to artificial neuron systems, methods and computer program products.

BACKGROUND OF THE INVENTION

Associative memories, also referred to as content addressable memories, are widely used in the field of pattern matching and identification, expert systems and artificial intelligence. A widely used associative memory is the Hopfield artificial neural network. Hopfield artificial neural networks are described, for example, in U.S. Pat. No. 4,660,166 to Hopfield entitled "Electronic Network for Collective Decision Based on Large Number of Connections Between Signals".

Although associative memories may avoid problems in prior back-propagation networks, associative memories may present problems of scaling and spurious memories. Recent improvements in associative memories have attempted to solve these and other problems. For example, U.S. Pat. No. 6,052,679 to coinventor Aparacio, IV et al., entitled "Artificial Neural Networks Including Boolean-Complete Compartments" provides a plurality of artificial neurons and a plurality of Boolean-complete compartments, a respective one of which couples a respective pair of artificial neurons. By providing Boolean-complete compartments, spurious complement memories can be avoided.

Associative memories also have been marketed commercially. For example, a product known as MemoryAgent marketed by International Business Machines Corporation (IBM) provides a low level set of application programming interfaces that can be used for building embedded learning agents, characterized by the term "Smart Assistance". See the publication entitled "Report:IBM's Memory Agent", Intelligence In Industry, Vol. 8, No. 1, January 1999, pp. 5–9. Other vendors, including Haley Enterprises and Intellix A/S also offer associative memory tools. In particular, Haley Enterprises supports a commercial associative memory called "The Intelligent Memory". See haley.com. Intellix A/S supports another commercial associative memory called "Knowman" using a software framework called SOUL (Self-Optimizing Universal Learner). See intellix.com. Some vendors offer self-organizing feature maps, as described in U.S. Pat. No. 5,870,729 to Yoda entitled Self-Organizing Neural Network for Pattern Classification; and U.S. Pat. No. 5,943,670 to Prager entitled System and Method for Categorizing Objects in Combined Categories, which also are a form of associative memory. Associative memories also have been applied to electronic commerce, as shown in U.S. Pat. No. 5,619,709 to Caid et al. entitled System and Method of Context Vector Generation and Retrieval. Other applications of associative memories include handwriting recognition in hand-held devices, such as the Palm Pilot, marketed by 3Com. Moreover, memory-based reasoning may now be included in data mining systems such as marketed by SAS Institute, Oracle Corporation and others.

Although associative memories only recently have been marketed commercially, they are expected to rapidly grow for applications that desire personalization and knowledge management. In fact, one expert has predicted that "Building autoassociative memories will be a very large business—some day more silicon will be consumed building such devices than for any other purpose." See Technology Review, Vol. 102, No. 4, July/August 1999, p. 79.

Unfortunately, there is a fundamental scaling problem that may limit the use of associative memories to solve real world problems. In particular, many associative memories use linear weights. As shown in FIG. 1A, each input can be associated once with each output according to a weight $W_A$–$W_E$. However, the inputs in such linear networks generally do not associate with each other. This can severely limit the ability of such networks to learn and represent possible nonlinearities, such as interactions between the inputs, that may be found in co-requirements or trade-offs between inputs.

An alternative to the linear network of FIG. 1A is the geometric Hopfield network of FIG. 1B. In the Hopfield network, one-to-one connections are provided between all nodes, and a weight is provided for each arch between the nodes. As shown in FIG. 1B, it may be difficult to scale Hopfield networks for real-world applications due to the explosion of weights that is provided between all inputs. Since nonlinear networks generally intercept all inputs with each other, an $N^2$ or geometric scaling function is produced. More specifically, the number of connections between inputs generally is equal to $N \cdot (N-1)/2$, where N is the number of inputs.

This geometric scaling generally is unreasonable to support applications at the scale of complexity that warrants such technology. For example, for general purpose search and personal modeling, tens of thousands of input variables and millions of models may need to be managed. At the other extreme, machine learning in operating systems may need to be more efficient as client machines become smaller, wireless devices. In such situations, only one user's model may be needed, but the number of contexts and input variables may still be very large. Even at the level of a household with a few individuals, the number of inputs may be on the order of hundreds of thousands. It therefore may be unreasonable to use present techniques in such applications, even in the larger physical memory capacities that are expected in the next few years. Thus, applications of agent-based learning for such environments are now emerging, but the learning technology to support these applications may be difficult to implement due to the scaling problems of learning and using nonlinear associations.

SUMMARY OF THE INVENTION

Embodiments of the present invention can provide an artificial neuron that includes a plurality of inputs and a plurality of dendrites, a respective one of which is associated with a respective one of the plurality of inputs. At least some of the dendrites comprise a power series of weights. At least some of the weights in at least one power of the power series define a maximal projection. In other embodiments, a respective dendrite comprises a power series of weights, the respective weights in a respective power of the power series defining a maximal projection. By providing a maximal projection, linear scaling may be provided for the maximal projection, and quasi-linear scaling may be provided for the artificial neurons, while allowing a lossless compression of the associations in some embodiments of the present invention. Accordingly, hetero-associative and/or auto-associative recall may be accommodated for large numbers of inputs, in some embodiments of the invention, without requiring geometric scaling as a function of input.

In some embodiments of the present invention, at least one power of the power series also includes at least one switch, to identify holes in the projection. In some embodiments of the present invention, the power series of weights is a base 2 power series of weights, and at least some of the weights in the at least one power of the power series define a maximal row projection and/or maximal column projection. The maximal row projection and/or maximal column projection is sorted by sums of row projections and/or or column projections, respectively.

In other embodiments of the present invention, the artificial neuron also includes a trace that is responsive to an input signal at the associated input. The trace is configured to map activations of the input signal to locations in the maximal row projection and/or maximal column projection. In still other embodiments of the present invention, the artificial neuron also includes a router that is configured to map the at least some of the weights in the at least one power of the power series, to define the maximal row projection and/or column projection.

In order to provide a reading operation, according to some embodiments of the present invention, an activated subset in the plurality of maximal row projections and/or maximal column projections is determined, in response to the trace. For each column of the activated subset, a smallest row projection that is greater than or equal to an index for the column is selected. In other embodiments, the smallest row projections that are greater than or equal to the index for the associated column are accumulated for the columns of the activated subset, to thereby obtain an association of the input signal with the weights. In other embodiments, a writing or memorizing operation is provided by embedding the trace into the maximal projections and the switch. In some embodiments, redundant projections between the trace and the maximal projections is found.

It will be understood that, although a power series of weights may be used with maximal projections according to some embodiments of the present invention, maximal projections may be used without the power series of weights in other embodiments of the invention. It also will be understood that the present invention may be embodied as systems, methods, computer program products and/or combinations thereof.

BRIEF DESCRIPTION OF THE DRAWINGS

FIG. 15 is a block diagram of a Double Match/Filter according to some embodiments of the present invention.

FIG. 16 illustrates examples of operations of a Double Match/Filter of FIG. 15 according to some embodiments of the present invention.

FIGS. 17A–17C and 18 are flowcharts of operations for Double Match/Filters according to some embodiments of the present invention.

FIG. 27 illustrates a bit matrix with maximal projections and row and column indices according to some embodiments of the present invention.

FIG. 29 illustrates activation of a trace according to some embodiments of the present invention.

FIG. 30 illustrates reading of a trace according to some embodiments of the present invention.

FIG. 32 illustrates a maximal projection with switches according to some embodiments of the present invention.

FIG. 36 illustrates writing a first observation to create a bit matrix with maximal projections from a first trace according to some embodiments of the present invention.

DETAILED DESCRIPTION OF PREFERRED EMBODIMENTS

Figure 1A:
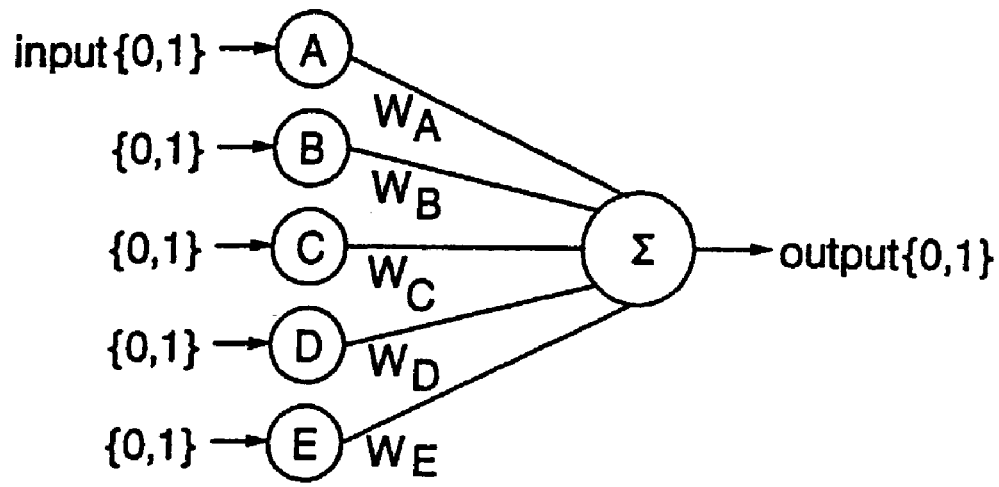
FIGS. 1A and 1B are block diagrams of conventional linear and geometric neural networks, respectively.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

Embodiments of the present invention will now be described using the illustrations of FIGS. 3–37. It will be understood that an element of the illustrations, and combinations of elements in the illustrations, can be implemented by general and/or special purpose hardware-based systems which perform the specified functions or steps, or by combinations of general and/or special purpose hardware and computer instructions.

Introduction

These program instructions may be provided to a processor to produce a machine, such that the instructions which execute on the processor create means for implementing the functions specified in the illustrations. The computer program instructions may be executed by a processor to cause a series of operational steps to be performed by the processor to produce a computer implemented process such that the instructions which execute on the processor provide steps for implementing the functions specified in the illustrations. Accordingly, FIGS. 3–37 support combinations of means for performing the specified functions, combinations of steps for performing the specified functions and program instructions for performing the specified functions.

A breakthrough in neural networks is described in application Ser. No. 09/436,925, now U.S. Pat. No. 6,581,049, entitled Artificial Neurons Including Power Series of Weights and Counts That Represent Prior and Next Associations, assigned to the assignee of the present application, the disclosure of which is hereby incorporated herein by reference in its entirety as if set forth fully herein. As described in application Ser. No. 09/436,925, an artificial neuron includes a plurality of inputs and a plurality of dendrites, a respective one of which is associated with a respective one of the plurality of inputs. Each dendrite comprises a power series of weights, and each weight in a power series includes an associated count for the associated power. It will be understood that a weight generally is a place-holder for a count, and need not be a separate physical entity. The power series of weights preferably is a base-two power series of weights, each weight in the base-two power series including an associated count that represents a bit position. A power series of weights is illustrated, for example, in FIG. 5 of application Ser. No. 09/436,925, reproduced herein as FIG. 5. It was found, according to application Ser. No. 09/436,925, that, in part, by representing the weights as a power series, the geometric scaling as a function of input in conventional artificial neurons can be reduced to a liner scaling as a function of input. Large numbers of inputs may be handled using real world systems, to thereby solve real-world applications.

As also described in application Ser. No. 09/436,925, the counts for the associated power preferably are statistical counts. More particularly, the dendrites preferably are sequentially ordered, and the power series of weights preferably comprises a pair of first and second power series of weights. Each weight in the first power series includes a first count that is a function of associations of prior dendrites, and each weight of the second power series includes a second count that is a function of associations of next dendrites. Prior/next counts are illustrated, for example, in FIG. 6 of application Ser. No. 09/436,925, reproduced herein as FIG. 6.

Figure 22:
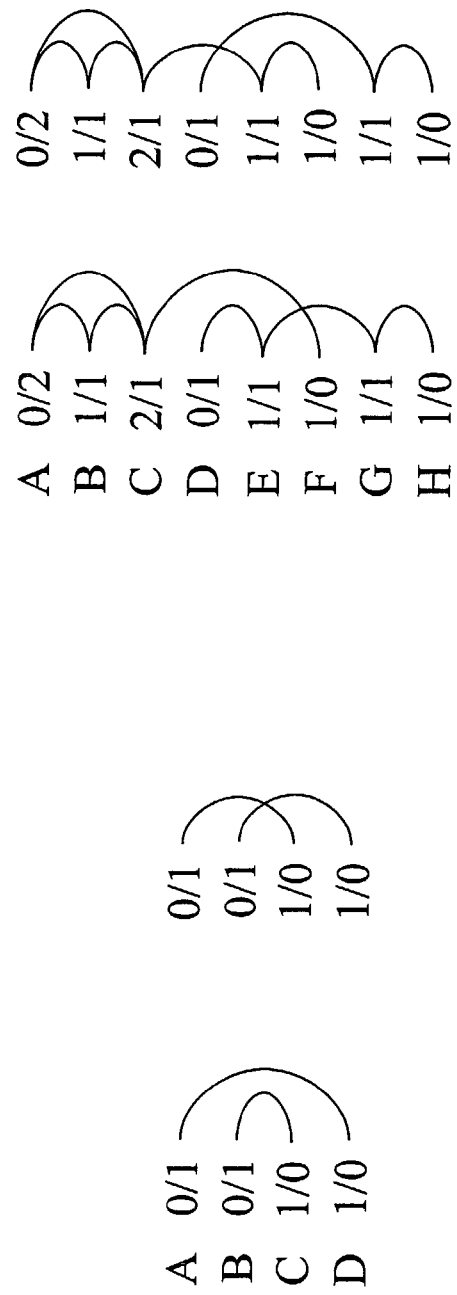
FIG. 22 is a diagram illustrating how different graphs can have the same prior/next weights.

It has now been found, however, that prior/next counts may not perfectly reflect a weightless graph. For example, FIG. 22 shows how different graphs can have the same prior/next weights. The smaller graphs at the left side of FIG. 22 show that the prior/next weights may not distinguish between two possible configurations: A is associated with D and B is associated with C, or A might equally be associated with C with B associated with D. In effect, the prior/next representations can provide for compression, but this compression may be lossy.

This lossy compression may not be significant in many applications. For example, application Ser. No. 09/436,925 describes an application for scoring, based on hetero-associative recall: given an input vector, the application returns a general measure of similarity. The lossy compression may have little effect in this application, as can be seen in the larger arrays of prior/next weights at the right side of FIG. 22. The weights give only a statistical sense of association between any one node and other nodes after it. Although the D-E association may be confusable with the D-G association, these errors may have a low effect in hetero-associative recall, given all the associations.

On the other hand, the lousiness of prior/next accounting may not provide auto-associative recall: given an input vector of known values, it may be desirable to give back a specific association to unknown values. For this application, it may be desirable for an associative memory to represent exact associations between inputs.

In order to facilitate a complete understanding of the present invention, a theoretical discussion of the separation and reconfiguration of an observation matrix into a linear structure first will be provided, as was described in application Ser. No. 09/436,925. Artificial neuron structures according to application Ser. No. 09/436,925 then will be described in detail. The generation and propagation of trace waves then will be generally described. Operations of application Ser. No. 09/436,925 for memorization (writing) and imagination (reading) will be described in detail. FIGS. 1–21 of the present application are reproductions of FIGS. 1–21 of application Ser. No. 09/436,925.

Then, artificial neurons including weights that represent maximal projections according embodiments of the present invention, will be described. A theoretical discussion of maximal projections will be provided, followed by a description of embodiments of the present invention, and a description of reading and writing according to embodiments of the present invention.

Artificial Neurons Including Power Series of Weights and Counts That Represent Prior and Next Associations Theoretical Considerations Some embodiments of the present invention were inspired by the cerebellar structure, long believed to be an auto-associative memory. While the cerebellum was traditionally thought to record and play unconscious motor skills, it is now understood to play a role in all cognitive activity, particularly in imagining and decision making generally.

Figure 2:
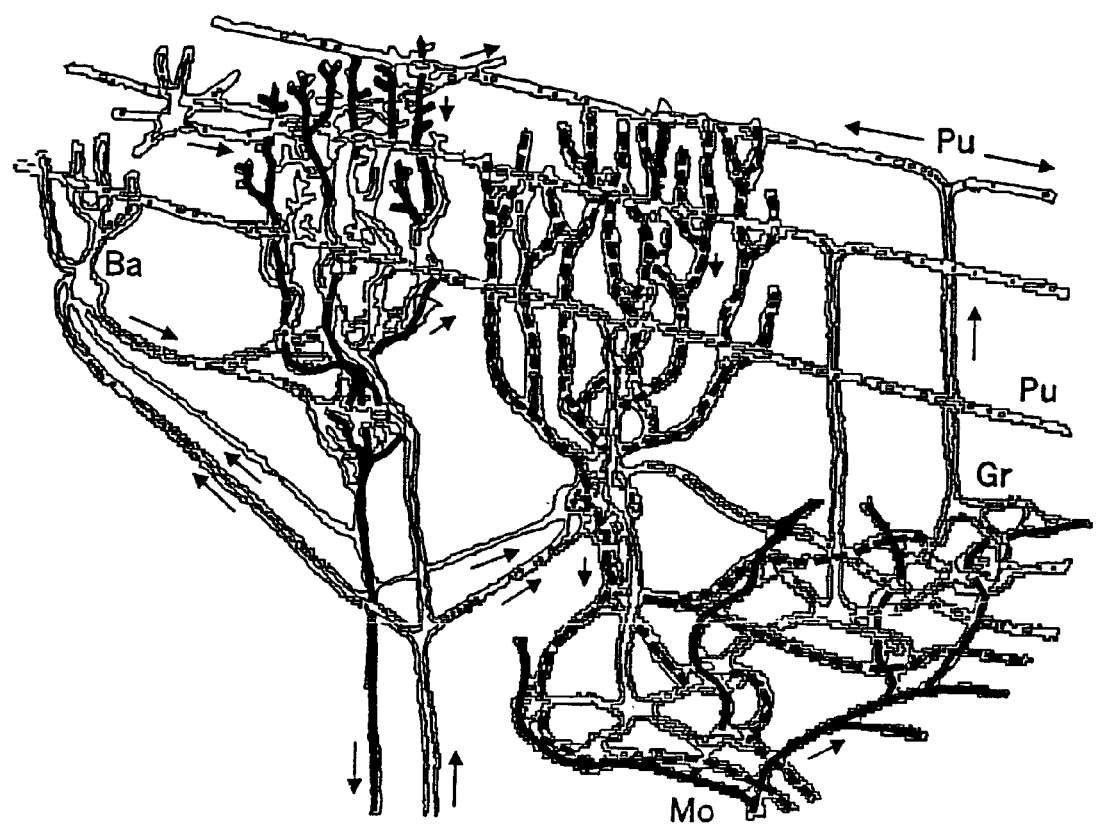
FIG. 2 is a diagram of neurons of the cerebellar cortex.

FIG. 2 is a reproduction of a neuron of the cerebellar cortex, reproduced from Llinas, *The Cortex of the Cerebellum*, Scientific American, Vol. 232, No. 1, Page 56–71, 1975. The Purkinje neuron Pu in the cerebellum is thought to represent an associative memory per se. Each Purkinje neuron has up to 100,000 input synapses—more than any other type of neuron. Computing and summing all this input, each Purkinje neuron sends one axon out from the cerebellum. Given this enormous fan-in, one assumption is that the associativity of the inputs to the output is linear, based on simple synaptic weights at each input and a summation (dot product) of these inputs and synaptic weights. However, the real dynamics of this and most other neurons are known to be highly nonlinear. Thus, nonlinear computational power appears to be present in these real, highly evolved systems, but the nature of the computation to produce an associative memory still appears to be unknown. However, it appears clear that the Purkinje neuron structure is a tree, not an astronomical plexus of $O(100,000^2)$ interconnections, as would be used in a nonlinear associator defined by a Hopfield neural network.

Some embodiments of the present invention can provide artificial neuron systems, methods and/or computer program products that can virtually represent the learned interactions between inputs but can be physically implemented in a realizable system. In fact, an approximation of an $O(N^2)$ virtual representation will be shown as an $O(N)$ physical machine. Such pure linearity can allow scaling of high performance prediction and pattern matching, up to the Internet and down to small wireless devices.

Figure 3A:
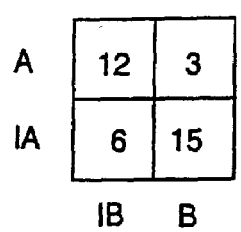
FIGS. 3A and 3B conceptually illustrate observations as polar phases.

A theoretical consideration can begin with a 2×2 observation matrix that is used in statistics. Given any two binary input variables (such as the flip of two coins), there are four possible observations. The 2×2 observation matrix is a set of four counters for the observed combinations. For instance, FIG. 3A shows two variables A and B. A can be ON or OFF, A or !A, respectively. This is similar for B. The observation count shows, for example, that the co-occurrence of A and B has been observed three times. Overall, it appears that A and B tend to exclude each other (represent a strong stochastic XOR relationship).

Figure 3B:
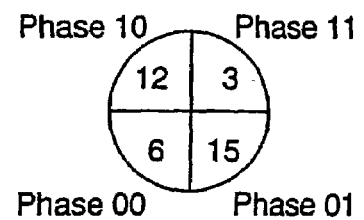

As shown in FIG. 3B, each of the four cell counters may be represented as one of four phases. Each phase is identified by 00, 01, 10, or 11 relative to the ON (1) or OFF (0) condition of each of the two inputs. In this case, the low bit represents the A coordinate while the high bit represents the B coordinate.

Figure 4A:
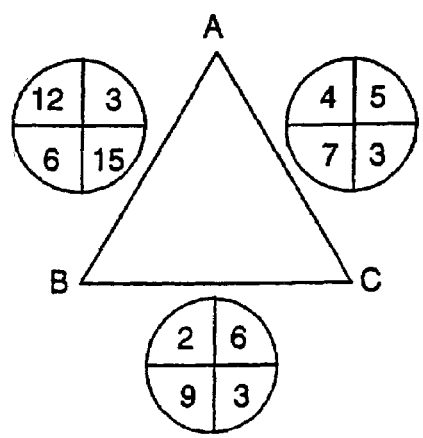
FIGS. 4A and 4B conceptually illustrate separation of observations into phase graphs.
Figure 4B:
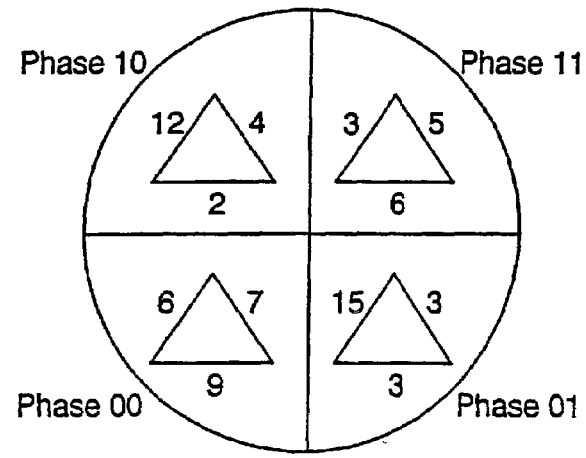

When more than two input variables are considered, an $O(N^2)$ number of 2×2 matrixes may be needed. For example, as shown in FIG. 4A, for three inputs (A, B, and C) there are three matrixes (A×B, A×C, B×C). Geometric scaling takes place with more inputs so that four inputs use six matrixes, five inputs use ten matrixes, etc. However, the simple graph of three inputs more clearly shows all relationships as a triangle. Each pair-wise edge of the triangle has a 2×2 observation matrix. Note that the sums of observations can be different, which allows the tri-state input values of true, false, and unknown.

Some embodiments of the present invention can compress this representation of associations into a linear form. There appears to be little possibility of finding commonality across any two matrixes. For example, the collapse of even two such matrixes only may be accomplished if four observation counts match each other. In a worst case, all possible pair-wise matrixes can be different from each other, allowing no compression by some combinations. However, some embodiments of the present invention can separate such counts in ways that can allow their compression.

Two rearrangements of these matrixes can result in graphs that have appropriate properties. The first rearrangement separates each of the phases from each other and recombines them into four graphs, one for each phase. See FIG. 4B. The result of each graph can leave only a single weight, rather than a matrix of weights, on each edge of the graph.

Figure 5:
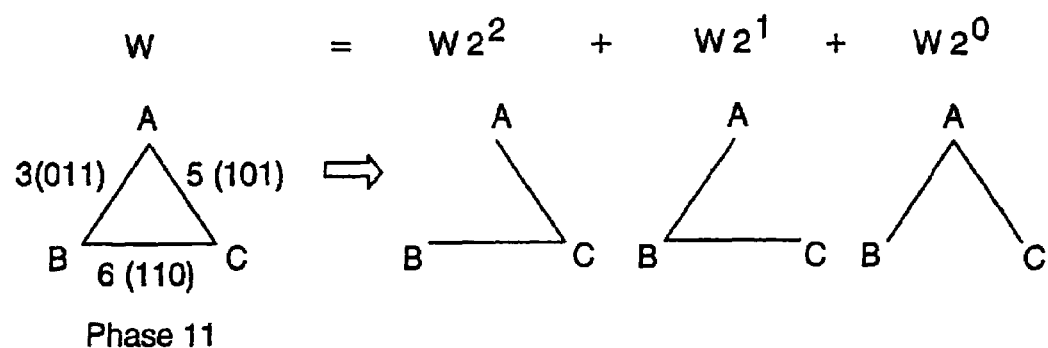
FIG. 5 conceptually illustrates separation of phase graphs into weightless graphs.

The second rearrangement separates each weight of the phase graph into a power series, preferably a base-two power series. FIG. 5 shows one phase graph with weights of 3, 6, and 5 between the input variables A, B, and C. The binary representation of each weight is also shown. Each bit of a weight represents the base-two power of that weight.

Because these bit powers are additive in representing the full magnitude of the weight ($6=2^2+2^1$), each phase graph can be further separated into a set of power graphs, one for each bit. FIG. 5 shows an example phase graph separated into three power graphs, for $2^2$, $2^1$ and $2^0$ magnitudes. The power of the graph is associated with the graph itself, but each graph now can be weightless, meaning that each arc represents one occurrence or nonoccurrence of an association between any two inputs for a particular phase and power.

A set of weightless graphs therefore can be produced. These graphs can each be of geometric size and can be further reduced, but the number of such graphs now may be contained. Given a representation of 2×2 matrixes (other basic shapes can also be decomposed as such), there are only four phases. As with the efficient binary representation of exponentially large weights, the binary separation of any weight then limits the number of power graphs to $\log_2$ (weight). Any particular weight is limited to the number of total memory loadings, M (assuming that all observations are of only one phase), with an expected value of M/4.

Continuing with the theoretical description, the weightless graphs then can be compressed, also into a linear form, using a statistic around each node. A statistic represents the characteristics around the node, but are not the characteristics themselves. For example, the number of links to each node is one such statistic. Each node may be characterized by one number, which may represent the number of associations of that node to all others. However, this statistic may not carry very strong constraints, such as which node-to-node associations are actually represented.

A preferred statistic may be obtained by analogy from dynamic programming. Dynamic programming techniques can reduce combinatoric complexity. Rather than explicitly accounting for all combinations, dynamic programming can find properties that allow implicit enumeration of many elements at once. Dynamic programming conventionally is used in tree structures. For example, each branch of a tree contains an exponential number of leaf nodes, but some problems have constraints such that an entire branch can be accounted at once. An exponential number of leaves are implicitly accounted, without the computational burden of actually accounting for each leaf.

Figure 6:
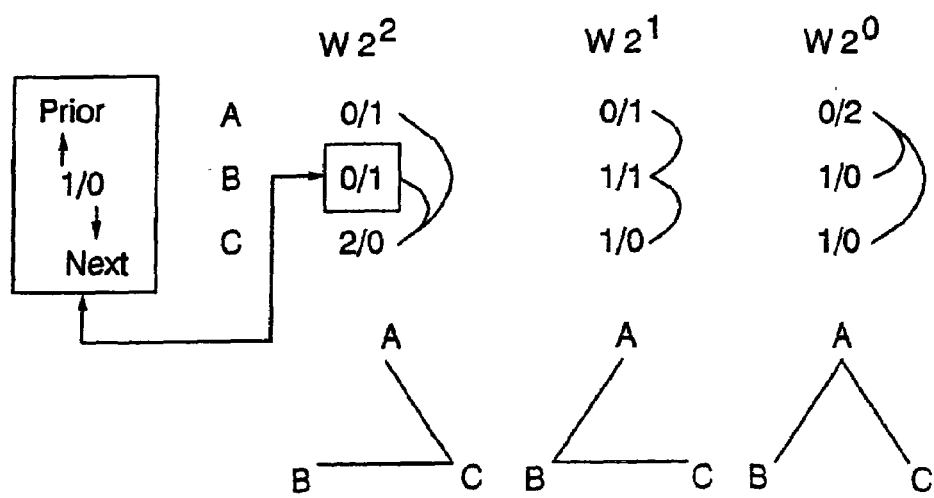
FIG. 6 conceptually illustrates dynamic program weights.

FIG. 6 illustrates a preferred statistic that can provide this implicit accounting. Since the power graphs of FIG. 5 are weightless, the weights of the linear array may be used to account for the number of edges belonging to each vertex of the graph. For example, the power graph of FIG. 6 for $2^0$ shows that A has two edges: one association to B and one association to C. While the sum of associations of one node to all other nodes may not force very strong constraints, ordering the vertices and separating each sum into the sum of associations to prior nodes and the sum of associations to next nodes can force very hard constraints, which can then be used to account for particular associations.

More specifically, each power graph is represented as a power series of ordered weight pairs, one weight of each pair representing all associations to inputs before it (prior inputs) and the other weight representing all associations after it (next inputs) in the ordering. The notation for the pair is shown as [prior]/[next], and each pair is shown associated with one and only one input. These weight pairs generally are highly constrained to each other. For example, the weights of A are 0/2 for 2° weight power, representing two edges with B and C. The weight pairs of B and C are 1/0 and 1/0. Assuming the lexical ordering of A, B, and C, the prior weights of B and C match the next weight of A. In general, the sum of all prior weights has a complement sum of next weights. As will be shown later, the constraints between these pairs actually can be much stronger.

FIG. 6 also shows that the sequential order of inputs can change the exact distribution of the weight pair. A single weight does not always map to the number of edges on the graph. For instance, the weights for B are 1/1 for the power graph $2^1$ only because B is ordered between A and C. One edge with A is prior to it and one edge with C is next after it. The ordering itself is otherwise arbitrary.

This completes the theoretical discussion of separation and reconfiguration of the observation matrix into a linear structure. Specifically, the scaling factor generally is $4*\log_2(M)*2N$. There are four phases. The number of power graphs for each phase grows as a log function of observations, M. Each graph is represented by two weights for each input, given N such inputs.

Artificial Neuron Structures

Figure 7:
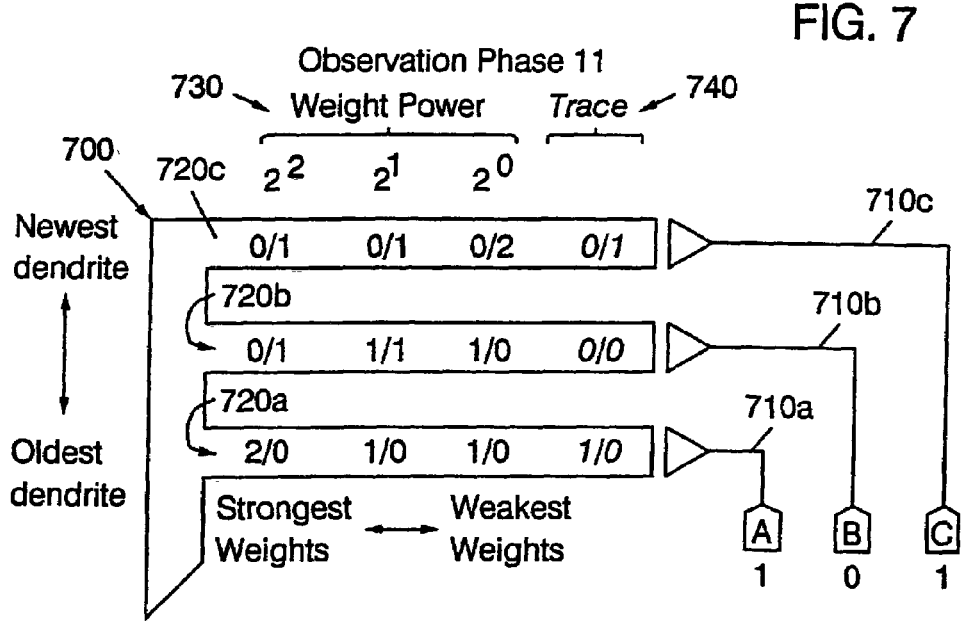
FIG. 7 is a block diagram of neurodendritic structures according to some embodiments of the present invention for a single observation phase.

FIG. 7 is a block diagram of artificial neurons according to some embodiments of the present invention. As shown in FIG. 7, the artificial neuron 700 includes a plurality of inputs 710a–710c and a plurality of dendrites 720a–720c. A respective dendrite is associated with a respective one of the inputs. Each dendrite comprises a power series 730 of weights. Each weight in a power series includes an associated count for the associated power. Preferably, as shown in FIG. 7, the power series of weights is a base-two power series of weights, so that each weight in the base-two power series includes an associated count that represents a bit position. The artificial neuron 700 of FIG. 7 represents a single observation phase, here observation phase 11 of FIG. 6. Each dendrite preferably comprises at least a second power series of weights corresponding to a second observation phase, as shown in more detail in FIG. 8. Finally, still referring to FIG. 7, each power series of weights preferably comprises a pair of first and second power series of weights. Each weight in the first power series preferably includes a first count that is a function of associations of prior dendrites, and each weight in the second power series preferably includes a second count that is a function of associations of next dendrites. The counts of prior and next dendrites are indicated by a "/" so that, for example, the notation 0/1 for the $2^2$ power of the dendrite 720c indicate zero prior associations and one next association.

Thus, each input or sensor neuron 710a–710c is connected to one dendrite branch 720a–720c. With this branch, the weight pairs for each power preferably are arranged from strongest to weakest. These weights are persistent. They can represent all the accumulated experiences that have been stored in the particular multipolar neuron.

In addition, each dendrite also contains a trace store 740 also referred to as a trace, which is transient. A trace 740 represents the current active sensor signal. The trace many be analogized to a post-synaptic biochemical trace (intracellular calcium buildup) left by sensor signaling. According to such biochemistry of learning, if a strong signal to memorize the signal follows the sensor signal, the trace signal interacts with the memorize signal to effect a permanent change in the dendritic weights.

A representation of a trace according to some embodiments of the present invention preferably is not as simple as a direct recording of the sensor signal. The trace representation preferably is converted into the same structure as the weights, preferably a power series of prior/next associations. In a sense, the trace may be regarded as the weakest "weight". The trace, rather than the sensor signals themselves, are used in the neuron's computational dynamics. The weights and trace preferably are in the same form for their most efficient computation together, as will be described below.

Figure 8:
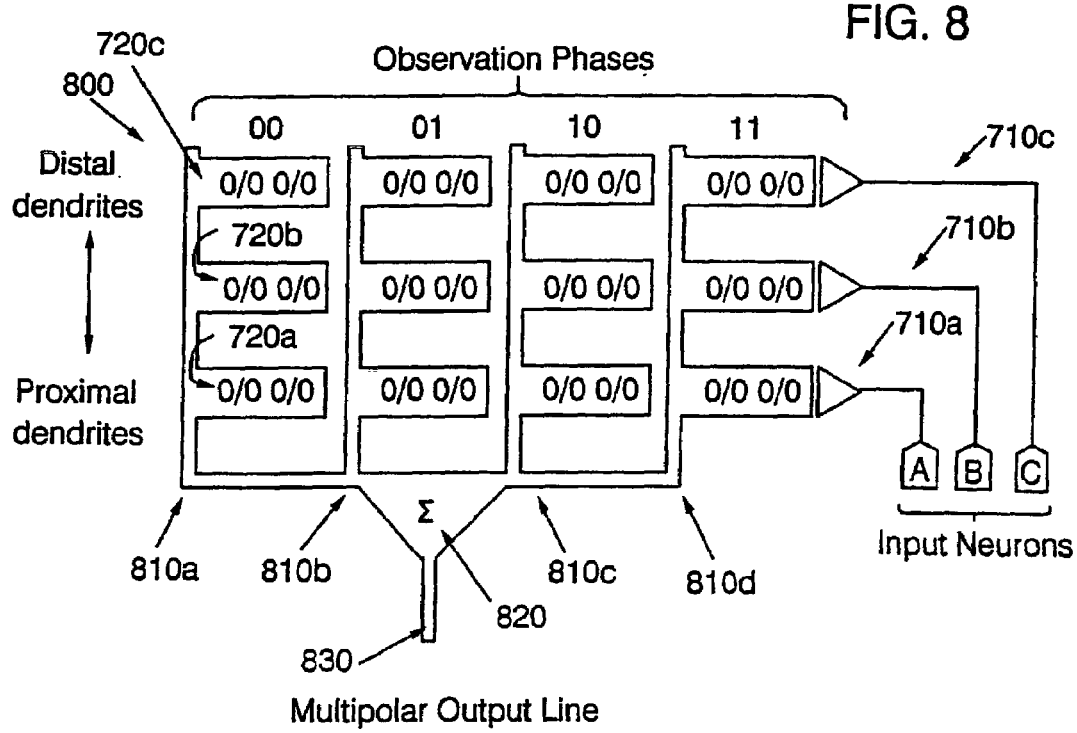
FIG. 8 is a block diagram of a multipolar neuron including multiple observation phases according to some embodiments of the present invention.

While FIG. 7 shows the dendritic arrangement for one phase, FIG. 8 represents all the phases, powers, and weight pairs to provide a multipolar neuron 800. FIG. 8 shows the initialized state of such a neuron. All weights and traces are initialized to zero, and there are no higher weight powers. Each major branch 810a–810d of the neuron 800 represents one of the possible observation phases. The outputs of the branches 810a–810d are summed at summing node 820 to provide an output on a multipolar output line 830.

Note that inputs 710a–710c are represented by sensor neurons. Each sensor neuron connects to a lateral dendritic branch at its appropriate level. The sensor neuron connects with every lateral branch at its level, but this is not shown for simplicity. Each lateral branch stores its weight pairs across all powers as detailed in FIG. 7.

Since the mathematics allows the arbitrary ordering of sensors and their weights for dynamic programming, biological neural architecture apparently has been decided on birth order. The terms proximal and distal rather than "prior" and "next", respectively, are used in FIG. 8 to indicate the oldest and newest dendrites, respectively. The latter terms may properly represent the birth order of sensors and connections to the multipolar neuron, but the former terms may be clearer and more structural. Proximal dendrites are closer to the cell body (summing node 820). They are formed first by the earliest sensor inputs to connect. By analogy to neurocortical systems, new growth is added at the distal "surface". In other words, newer dendrites are connected distally, after the earlier dendrites.

The dendritic structure may change over time. The ordering of dendrites may be from oldest to newest as shown, but this ordering can be rearranged to improve performance and to add more information. For instance, the stronger dendrites can be ordered to be more proximal. This could overlay a stronger ordering of phases so that, for example, phase 01 can be considered weaker than 10.

Trace Wave Propagation

The creation of a trace is the simplest of the multipolar dynamics for artificial neurons according to some embodiments of the present invention, and can show how the linear array of weight pairs represents observations and their memories. Accordingly, trace creation and trace wave propagation now will be described.

Figure 9:
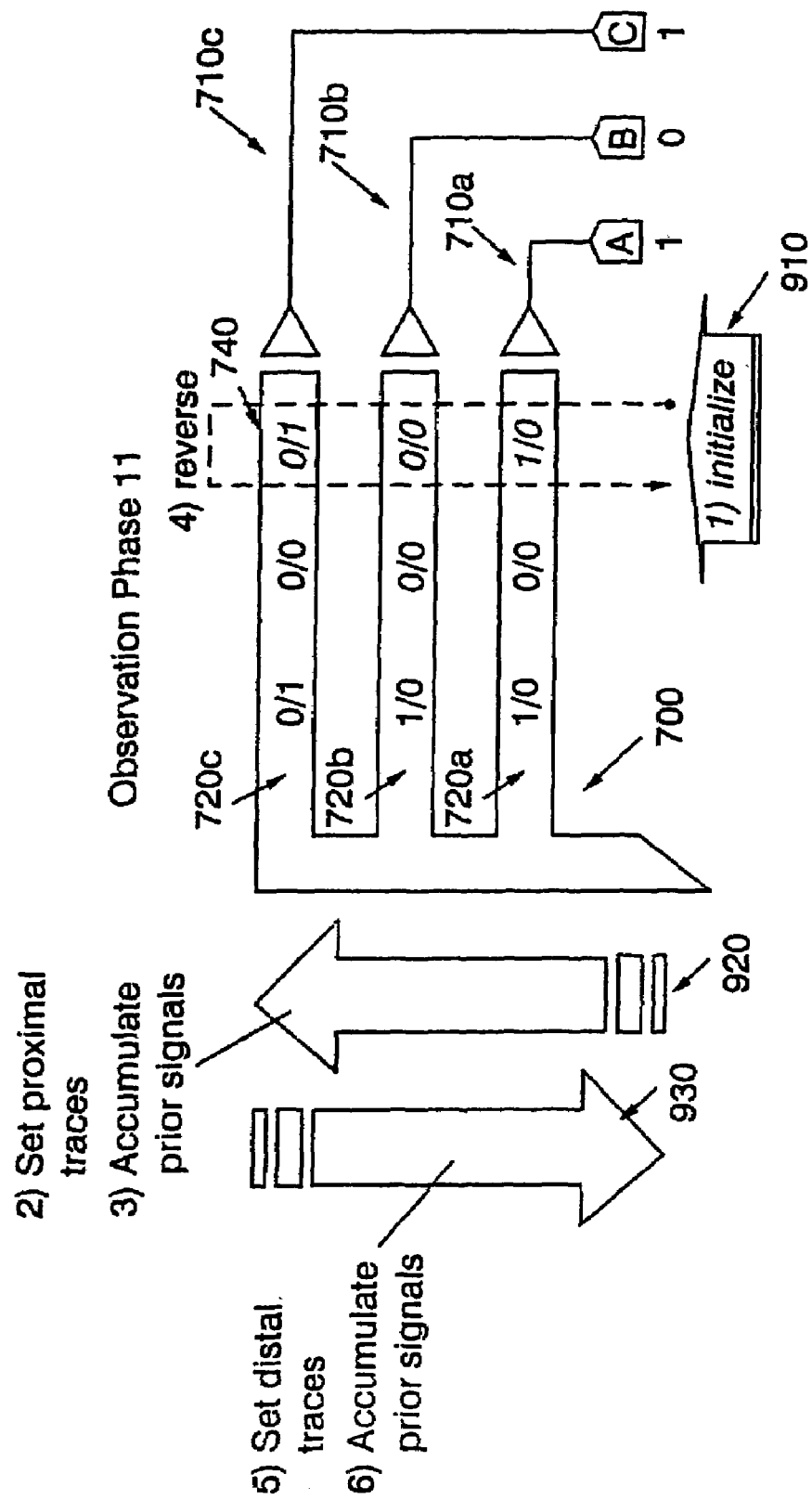
FIG. 9 conceptually illustrates trace wave propagation according to some embodiments of the present invention for a single observation phase.

Dynamics of the multipolar neuron preferably are mediated by the propagation of waves from one dendrite to another. Such wave propagation is known across biological neural systems and has been very well studied in Purkinje neurons. FIG. 9 shows how the wave moves across the dendrites to trace the sensor signal. While the biology may be more of a parallel processor and may update the trace as each sensor signal changes, the computational model starts the wave at the soma (the cell body) of the multipolar neuron. The wave preferably moves from the proximal dendrites (arrow 920) and then from the distal dendrites (arrow 930) in one pass.

Referring to FIG. 9, first, the wave is initialized to represent the given phase of the dendrite, as shown by arrow 910. The two bits of the phase, high bit and low bit, are kept in the wave as a highFilter and lowFilter. This setting of "high" and "low" can be arbitrary, as long as each dendrite will assume two perspectives: 1) calculating its associations to dendrites before it; and 2) calculating its associations to dendrites after it. In order to calculate the existence of an association between such dendrites—given a particular phase—one dendrite acts as one bit of the phase while another one acts as the other bit of the phase. For example, for phase 10, one dendrite must decide if its input is ON while another dendrite must determine if its input is OFF for the two of them to represent one such association. By convention, prior dendrites are assumed to act as the high bit while the next dendrite acts as the lower bit. More correctly, each dendrite acts first as the low bit, when calculating its associations to prior dendrites, and then acts as the high bit (acting like a prior dendrite) when passing its own signal into the wave to the next dendrite.

As the wave moves across the dendrites, the highFilter represents the sensor signal for the dendrite to be considered active within the given phase from the perspective of being the proximal dendrite in association with other distal dendrites. The lowFilter takes the opposite perspective; it represents the sensor signal for the dendrite's perspective as the distal dendrite in association with other proximal dendrites. Again, this assignment of "high" and "low" is merely by convention. In general, each dendrite acts as one bit of the phase for one perspective and then the other bit for the other perspective.

The wave's priorSignals counter is initialized to 0. As the wave moves across the dendrites, they accumulate their signals for association to the next dendrites.

Figure 10:
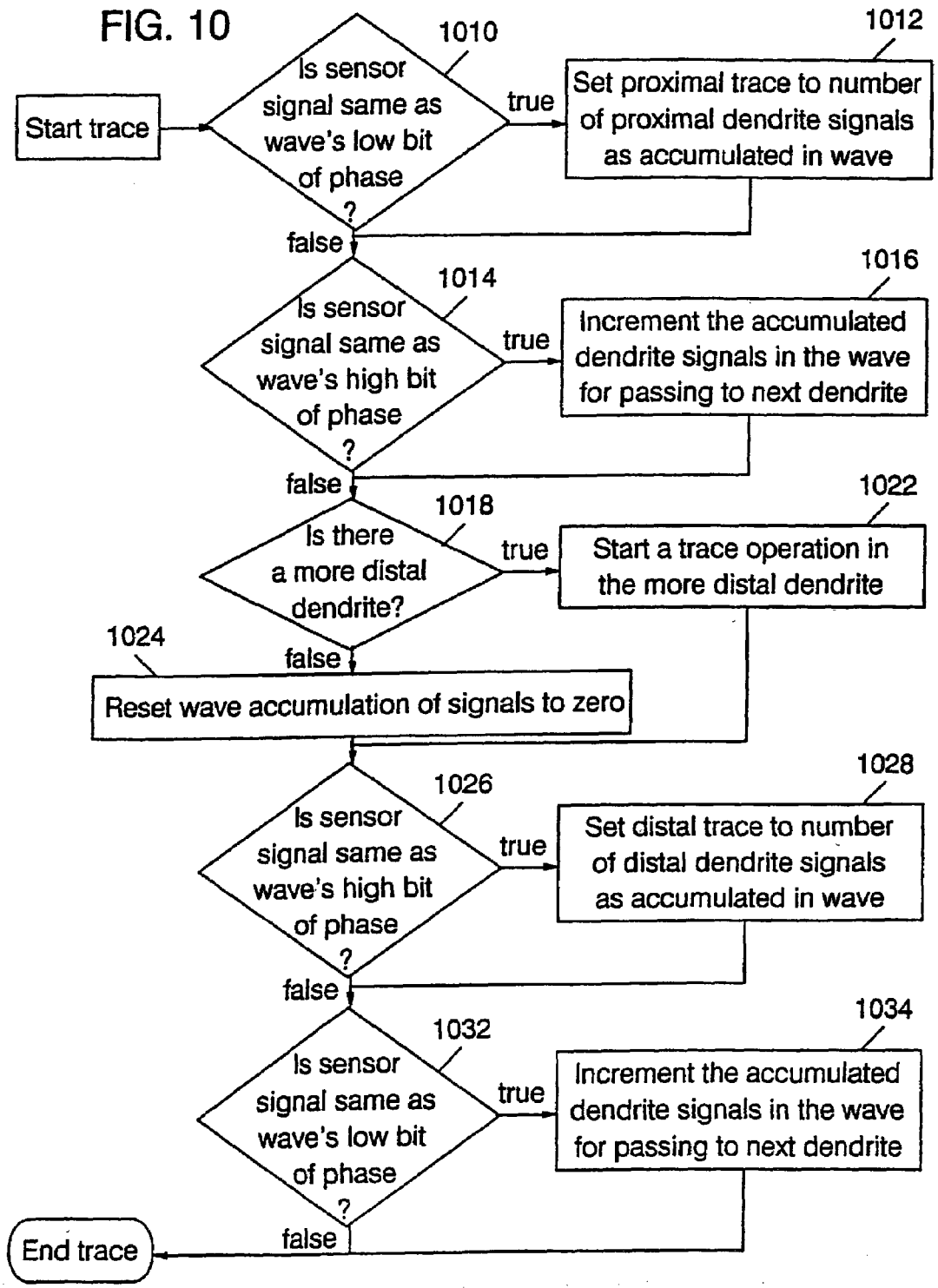
FIGS. 10 and 11 are flowcharts illustrating operations for trace formation according to some embodiments of the present invention.

FIG. 10 is a flowchart of computations within each dendrite. When the wave first passes into a dendrite, the dendrite takes the perspective of the low bit, distal dendrite. It compares the wave's low filter to the sensor's signal. If they are the same, then it is active in this perspective. The number of associations that are proximally active are found in the wave's accumulation of prior signals. It will be understood that the first dendrite does not see any prior signals.

The dendrite then takes the perspective of the high-bit proximal dendrite before the wave moves to the next dendrite. If the wave's high bit filter matches the sensor's signal, the dendrite is active in this perspective for this phase and accumulates itself in the wave's prior signals counter. As the simplest form of the multipolar's dynamic programming, the trace wave propagation shows how one dendrite, representing one sensor input, can implicitly enumerate all associations to other dendrites and their signal patterns.

In particular, at Block 1010, a test is made as to whether the sensor signal is the same as the wave's low bit of phase. If yes, then at Block 1012, the proximal trace is set to the number of proximal dendrite signals, as accumulated in the wave. If not, a test is made at Block 1014 as to whether the sensor signal is the same as the wave's high bit of phase. If yes, then the accumulated dendrite signal's in the wave are incremented for passing to the next dendrite at Block 1016.

At Block 1018, a test is made as to whether there is a more distal dendrite, and if yes, then the trace process is started in the more distal dendrite at Block 1022. If there is no more distal dendrite, then the wave accumulation of signals is set to 0 at Block 1024 and a test is made at Block 1026 as to whether the sensor signal is the same as the wave's high bit of phase. If yes, then at Block 1028, the distal trace is set to the number of distal dendrite signals as accumulated in the wave. At Block 1032, a test is made as to whether the sensor signal is the same as the wave's low bit of phase. If yes, then the accumulated dendrite signals are incremented in the wave for passing to the next dendrite at Block 1034.

The dendrite structure preferably is recursive. Each dendrite is connected to a possible next dendrite. Each dendrite propagates the trace signal to the next dendrite, the most distal dendrite tells the wave to reset itself (set the priorSignals back to 0) and returns control to the prior dendrite recursively. The return propagation preferably works like the forward propagation. The distal pass of the wave calculates the proximal traces, while the proximal pass of the wave calculates the distal traces.

Those skilled in the art of electronic design and parallel processing will recognize that these traces may be updated with real-time propagation in physical hardware. For example, any signal change can propagate proximally and distally at the same time, beginning with the dendrite associated with the changing sensor. Such waves preferably would propagate a prior change in signals rather than prior signals, but the dynamics otherwise can be identical. The single pass operations described above may be more efficient for sequential processing computer architectures. All sensor signals are assumed clamped and stable when the trace signal is called; all possibly parallel propagations are computed once in a single sequential pass.

Figure 11:
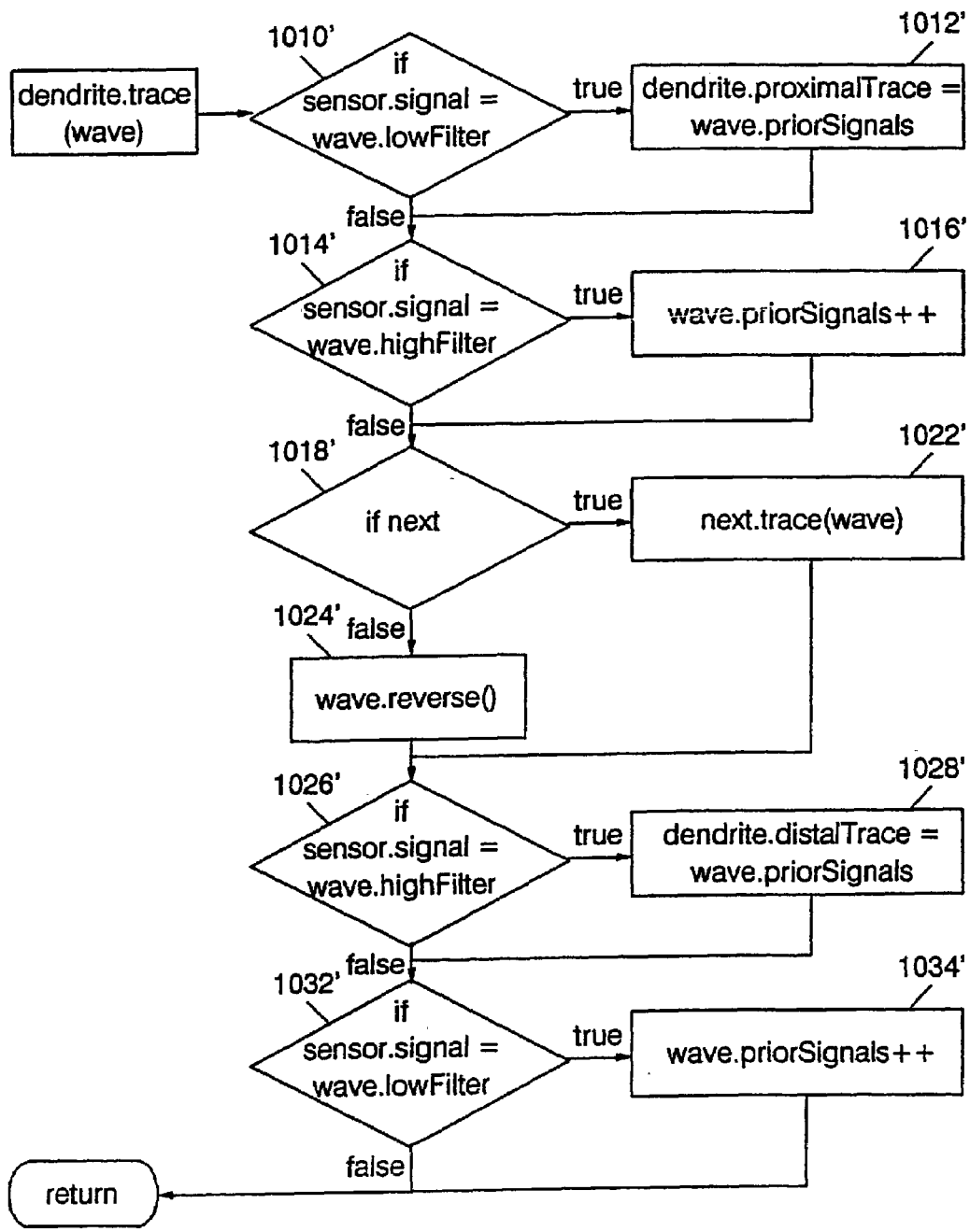

FIG. 11 represents the same flowchart as in FIG. 10, but as programming code. Like numbers are used, with prime (') notation. A dendrite object has a trace member function that takes a wave object as its argument. Each dendrite has a Sensor object as its member. The dendrite compares its sensor's signal with the wave's filters (Blocks 1010', 1014', 1026' and 1032'). If one equals the other in the case of the lowFilter, then the dendrite sets its proximalTrace to the priorSignals carried by the wave (Blocks 1012' and 1034'). In the case of the highfilter, the dendrite increments the wave's priorSignals to account for the sensor's signal (Blocks 1016' and 1028').

Each dendrite object is recursively connected to another more distal dendrite. Each dendrite calls the trace member function of such a next dendrite, if it exists. Otherwise, the trace function returns void.

Memorization

A description of memorizing or writing into an artificial neuron according to some embodiments of the present invention now will be provided. Memorization generally is more complex, preferably using more than one wave propagation. Multi-wave propagation also may be indicated in the cerebellum in that a single signal from the climbing fiber causes a burst of activity in the Purkinje neuron. FIG. 2 shows the climbing fiber and how it surrounds the Purkinje neuron's dendrites. Given the sensor signal's formation of the trace signal, the climbing fiber may provide the memorize signal.

Figure 12:
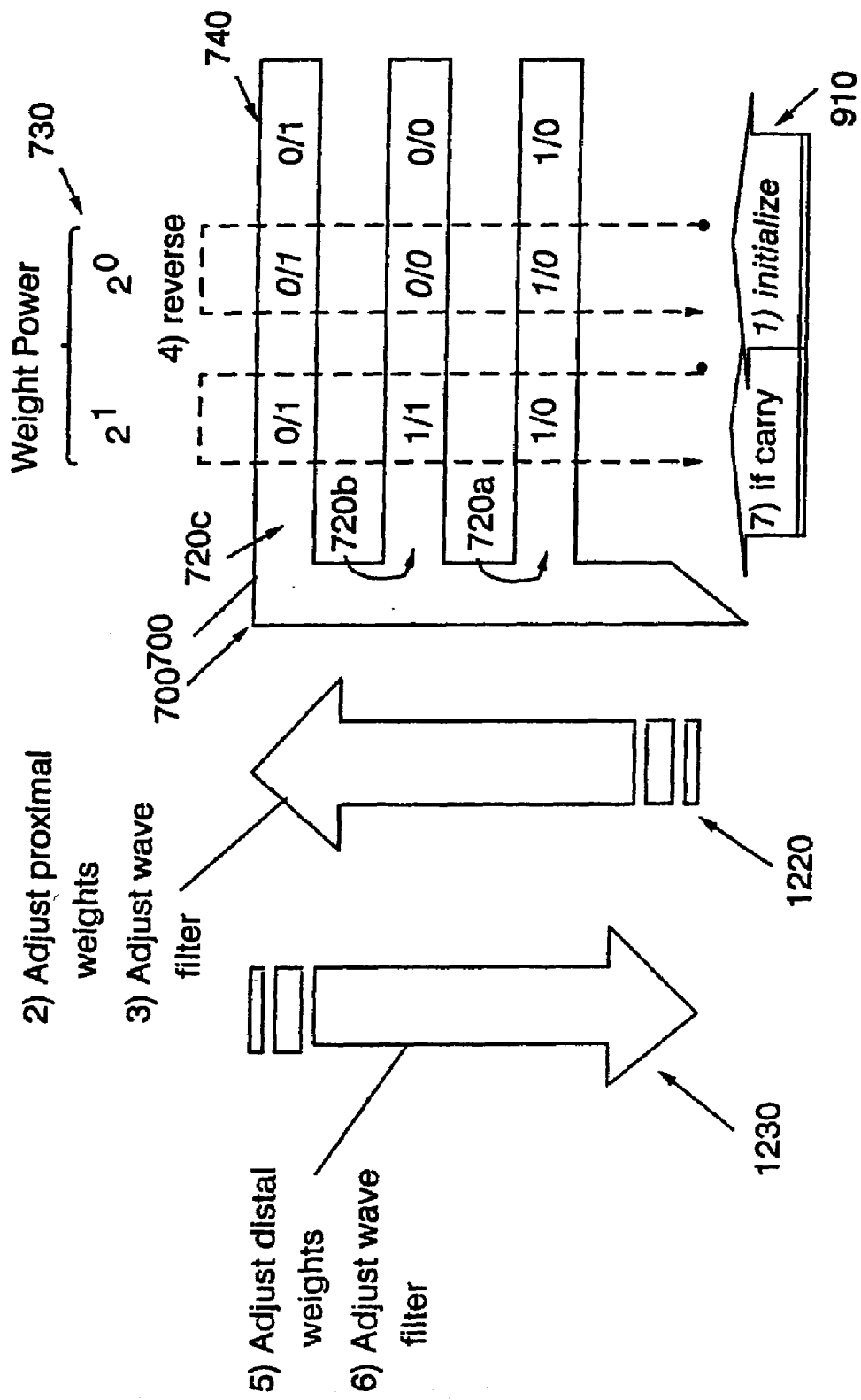
FIG. 12 is a block diagram of memorization for neural networks according to some embodiments of the present invention.

Analogous to the biology, a memorize signal to a multipolar neuron of some embodiments of the present invention generally causes a burst of wave activity. FIG. 12 shows that the neuron initializes (arrow 910) and propagates a wave through the dendritic field (arrows 1220 and 1230), much like the formation of a trace. However, the weight structure is more complex than the trace and may use several passes. As shown, each wave passes through each power of the weights. Starting from the weakest $2^0$ weight column, the memorize signal causes a transfer from the traces to the more permanent weights.

The example shown in FIG. 12 is simple. The trace weights are simply accumulated to the permanent weights at $2^0$. However, the separation of observation weights into power graphs and the resulting power columns in the dendritic field may produce a carry function from one weight power to another. For example, addition and carrying in binary codes is simple. When adding one bit to another, the value of the bit is doubled, and hence needs to be shifted into the next, higher-bit column. If the higher bit is off, then it is turned on. If the higher bit is on, then it is doubled and needs to be left-shifted into its next, higher bit column. This operation continues until the carry bit propagates appropriately.

FIG. 12 represents this need to carry the results of one weight column into the addition of another weight column. For each weight power, the multipolar neuron propagates a wave, so long as the returning wave indicates that some values must be carried. Depending on the memory load and the effect of the new signal pattern, a $\log_2(O)$ number of wave bursts can be expected. In actual practice, only a few such waves may be expected, because unless the carry flows all the way to the highest order power, the waves pass through only a subset of powers.

Although the memorize function is complex, it may be viewed as somewhat similar to the trace formation described above. The wave generally travels to each dendrite in succession, modifying the proximal weight (like forming the proximal trace) and changing the wave as well to implicitly communicate its activity with other more distal dendrites through dynamic programming. The wave adjusts the proximal weights, and then reverses to adjust the distal weights. However, the nature of the dynamic programming generally is more intricate and elegant, as now will be described.

Figure 13:
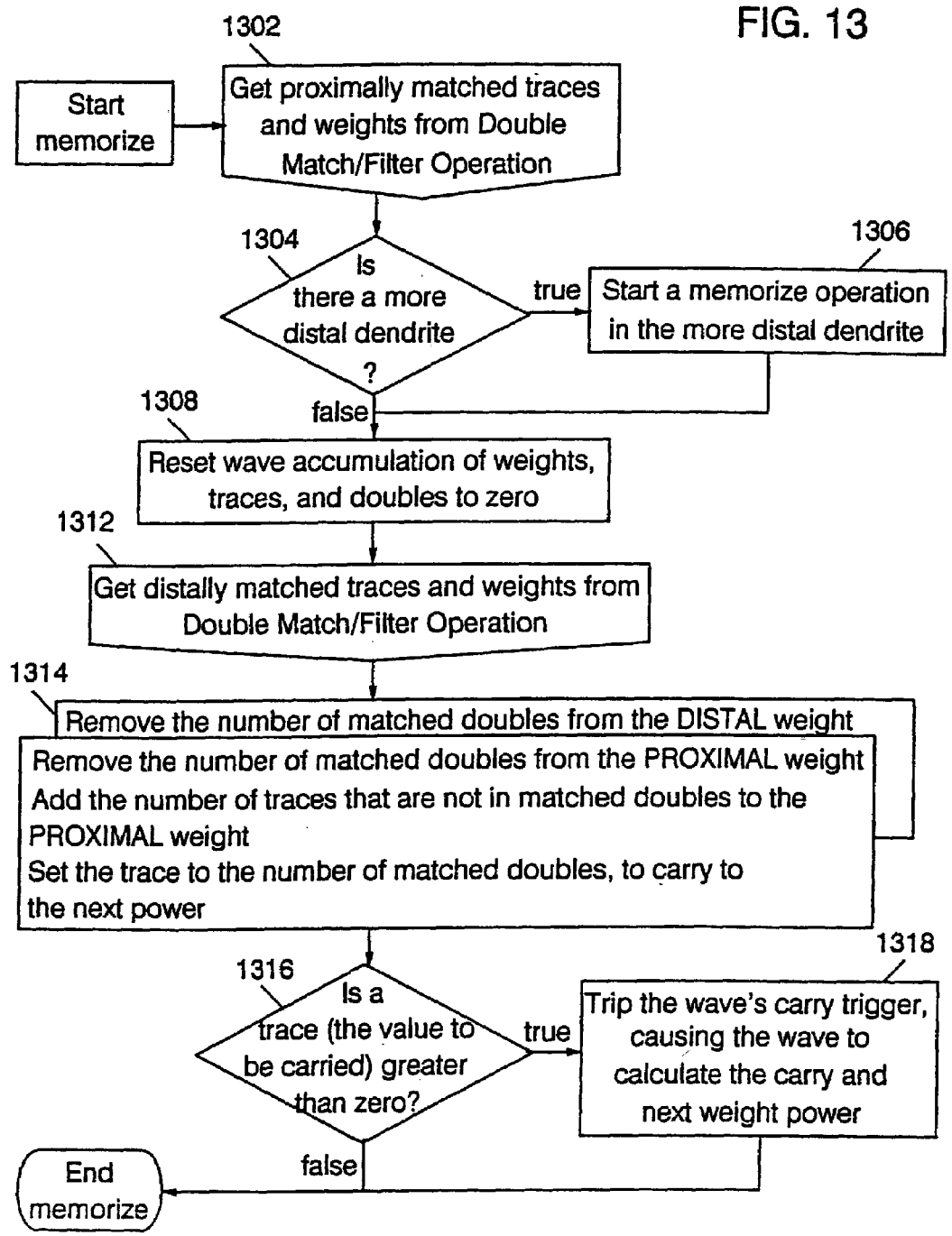
FIGS. 13 and 14 are flowcharts of operations for memorization according to some embodiments of the present invention.

Memorization first will be generally described. Then, a detailed description of carrying from one weight power to another will be described. FIG. 13 shows the overall memorization operation and its call to the Double Match/Filter to be introduced next.

In particular, when the wave first enters a dendrite, the dendrite assumes the perspective of the distal dendrite. Given both its proximal weight and trace values, the dendrite must determine whether the addition caused by the trace should be added to the current weight or carried to the next power. The logic of the decision is much like in binary coding: if the association does not exist, then the weight is set so that it does exist. If the association already exists, then the old and new association account for two-of-the-same and should be left-shifted to a higher power. As will be described below, Double Match/Filter finds such "doubling" of the currently known associations, which should be carried to the next power.

Referring now to FIG. 13, the Double Match/Filter (Block 1302) extracts the number of proximal doubles that should be carried forward and also alters the wave, which the dendrite sends to the next dendrite (Block 1306), if there is one (Block 1304). The wave returns (Block 1308) and the Double Match/Filter is called again (Block 1312), this time to extract the number of distal doubles (Block 1314).

Once the number of doubles is determined to carry forward to the next power (Block 1316), the weights at the current power can be determined (Block 1318). Both proximal and distal weights are decremented by the number of associations (doubles) that should be carried forward. In other words, if the weight already held an association and the sensor signals added it again, the association should be removed from the current power and doubled into the next. Each weight is then incremented to account for the new trace values, minus those that matched old associations and are accounted in the doubles to be carried.

Finally, the doubles are carried by assigning them as traces for the next weight powers to add, as done for the lowest weight power. If there are in fact any doubles and they are set as the trace values for the next wave, then the wave's carry trigger is set true. The multipolar neuron sends a burst of waves, each tuned to a higher weight power until there are no more associations to carry forward.

The time scaling factor is the same linear O(N) function as it is for the space complexity. The neuron creates one wave, which is tuned 4 times for each phase of its dendritic field. Within each phase, a $\log_2(O)$ number of bursts (maximum possible bursts) complete the weight change.

Figure 14:
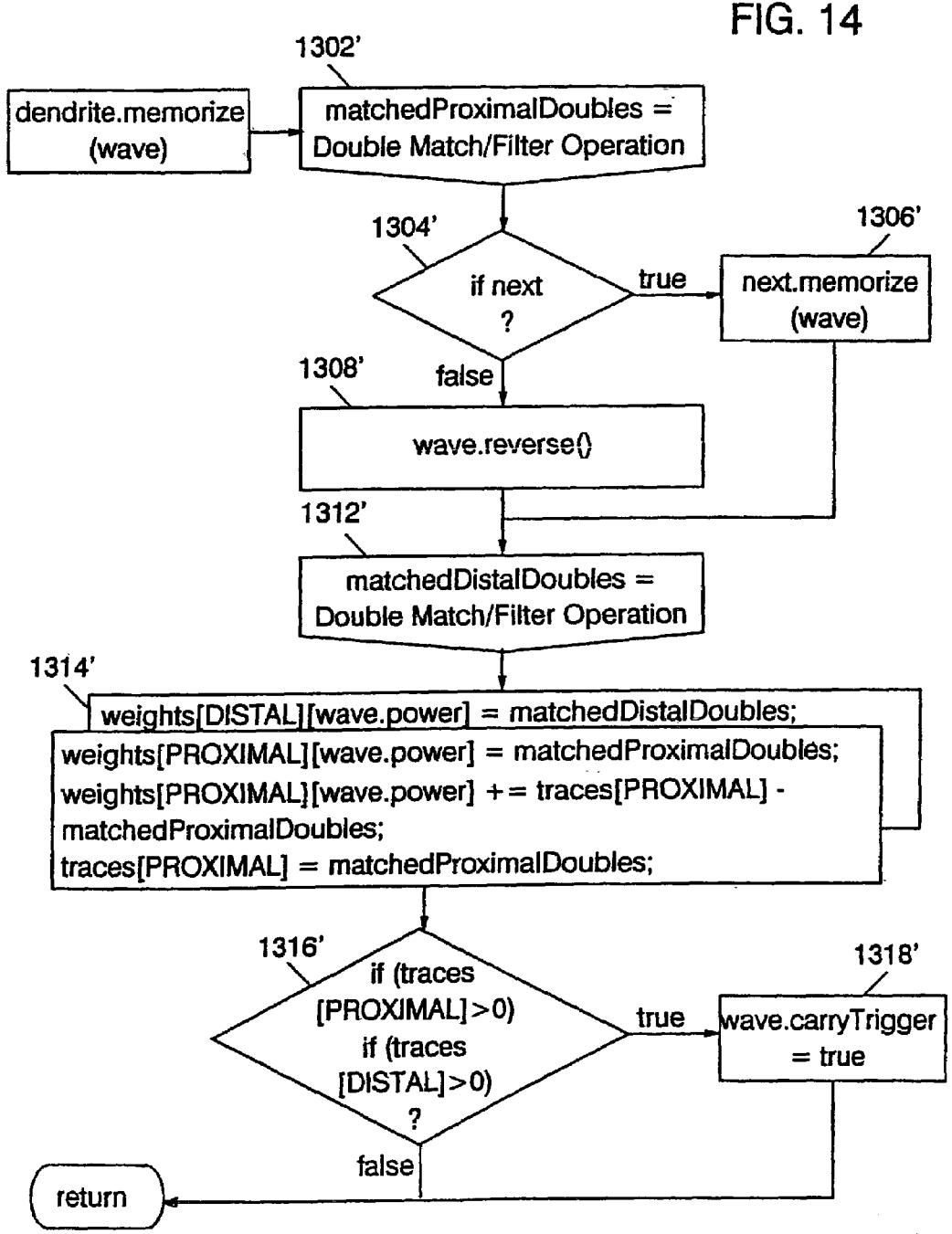

FIG. 14 shows an example of programming code for the weight modification operation. Like numbers to FIG. 13 are used with prime (') notation. The Dendrite object has a memorize member function that takes a wave as an argument, much like the trace function. Calling the next dendrite to memorize is also recursive and returns void. Otherwise, memorization involves the calculation of the matchedProximalDoubles (Block 1302') and matchedDistalDoubles (Block 1312') through a separate function that implements the Double Match/Filter process. Each dendrite has a doubly indexed array of weights. One index points to the DISTAL or PROXIMAL direction while the other index points to the weight power, which is determined by the passing of the wave as its power. The weight is adjusted in two ways. First, any matched doubles are subtracted (since they will be carried) and then the trace is added back in (minus any matched doubles, which also represent what needs to be carried). See Block 1314'.

The traces are reassigned to the number of match doubles. This represents the value to be carried to the next wave power. In order to use the same memorize function (Block 1306') on subsequent passes of the wave, these carry values are placed in the trace, just as if they represented input signals for the next weight power—which in fact they are.

Before returning, the dendrite determines whether there is in fact anything to carry in the traces (Block 1316'). If so, it trips the wave's carryTrigger (Block 1318') so that it passes back at a higher wave power.

The most intricate part of this linear scaling is the operation for finding doubles. The actual power graphs explicitly represent edges of the graph, so it can be determined if a particular association exists or not. An association of a particular power between two inputs is represented as one and only one edge between the respective input vertices. The linear weight scheme inside the dendrites may be much more peculiar and can represent a geometric number of associations, but it can be very difficult to see that one dendrite/sensor has an association with another.

However, the dynamic programming of wave propagation can account for these associations. As was shown in FIG. 6, a distal weight of 2 must encounter 2 proximal weights to match it. Considering the highest power column in FIG. 6, the weight of 2 at A will first encounter a 1 at B (A and B are associated) and another 1 at C (A and C are associated).

B and C could also have had a matched pair of proximal and distal weights, but they did not have such an association in this example.

FIG. 15 establishes the relevant values and operation sequences for computing these constraints. In FIG. 15, the neuron is represented schematically for clarity. Given that the weights and traces preferably are in the same format, the wave can propagate and account for both of them as it passes across the dendrites. In fact, the wave has accumulators for both priorWeights as well as priorTraces. Moreover, the number of doubles generally is the more critical relationship to track and match. The wave has an accumulator for priorDoubles. Thinking of just one association, a double is the co-occurrence of a weight and a trace. In other words, the association already exists and the addition of the trace strengthens or doubles it. Because dendritic weights account for a number of associations, the double is the minimum value of the weight and trace counters.

More specifically, the dendrite generally can calculate only the number of possible doubles. Although a dendrite may have some number of weights and some number of traces, there generally is no local guarantee that they represent the same associations. For example, input A might have an old association with B and a new trace with C. But A has no explicit connection with B or C to decide this. Imagine that the proximal dendrite is "looking" distally through the weights of the other dendrites trying to determine if there is another double, with which to match. There is too much noise and confusion of weights in such a perspective. Fortunately, there are a number of intricate constraints, allowing another form of dynamic programming to match-and-filter such doubles.

FIG. 16 provides some examples. The specifics of the Double Match/Filter are very intricate and may be difficult to understand with a large number of inputs. Such intricacies generally can account for all possible configuration of weights especially with a large number of inputs, but the examples shown here are more basic and explanatory.

The first example (first row of FIG. 16) shows how some associations are doubled by a new observation while others are left to simply add as new single associations. The second example (second row of FIG. 16) shows how some possible doubling of weights might appear within one dendrite, but by going through the following processing, none of the new associations actually match those of the prior memories.

For example, initial weights and traces for input A are identical across both examples. Input A has a weight of 2 associations below it, and it might be assumed that the new trace of 1 association might match an association already stored. If so, then the doubling of the association should be carried to a high power. However, only the first example has a true doubling of an existing association. While A should propose that it has a possible double in both examples, the second example shows how the trace value of C forces an accounting of the traces for both A and B above it. The trace value in A is accounted by C, but without a corresponding weight. Unlike the first example in which C can match the weight-trace double of A, the possible double in A is split and is not in fact a double in the second example.

Figure 17A:
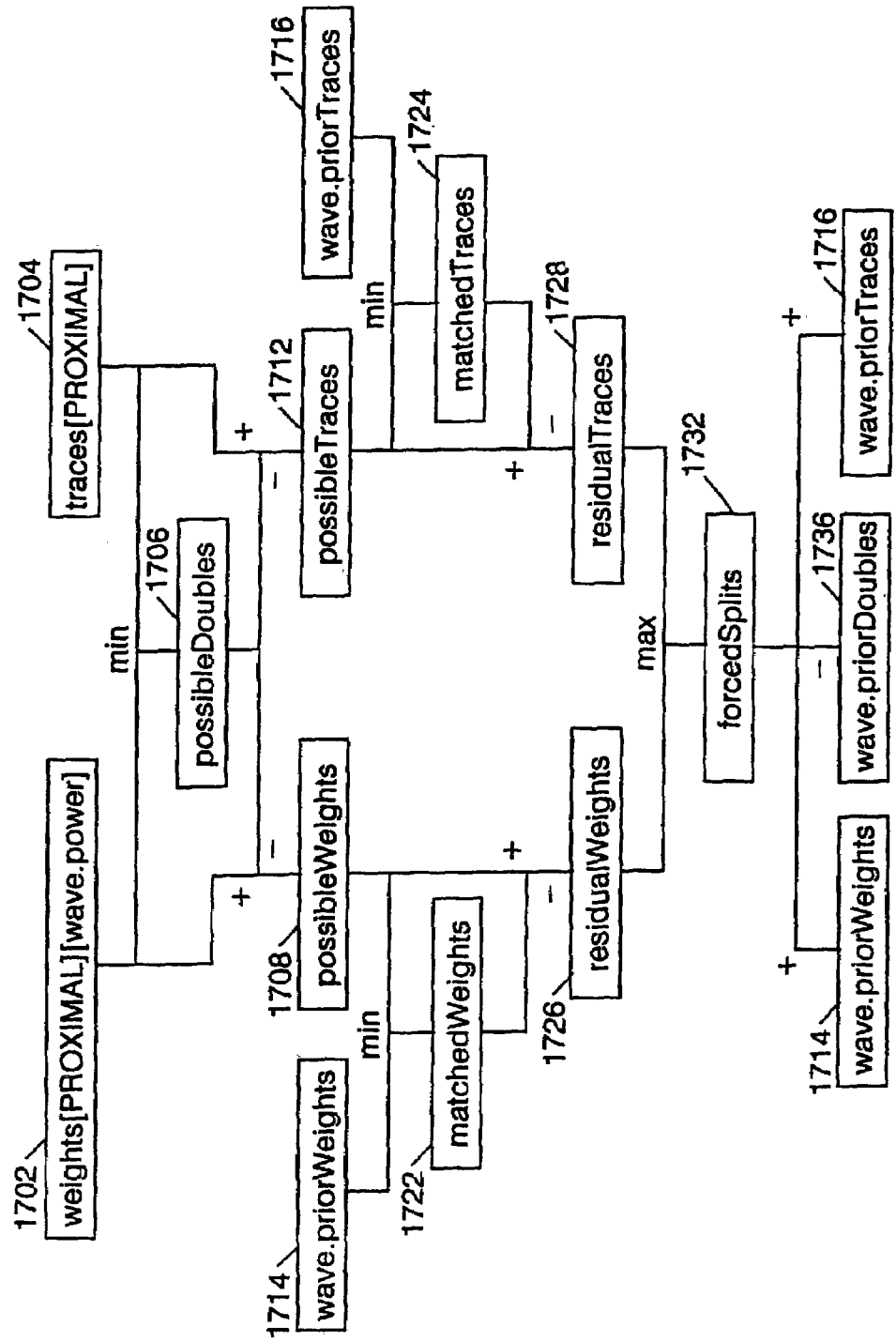
Figure 17B:
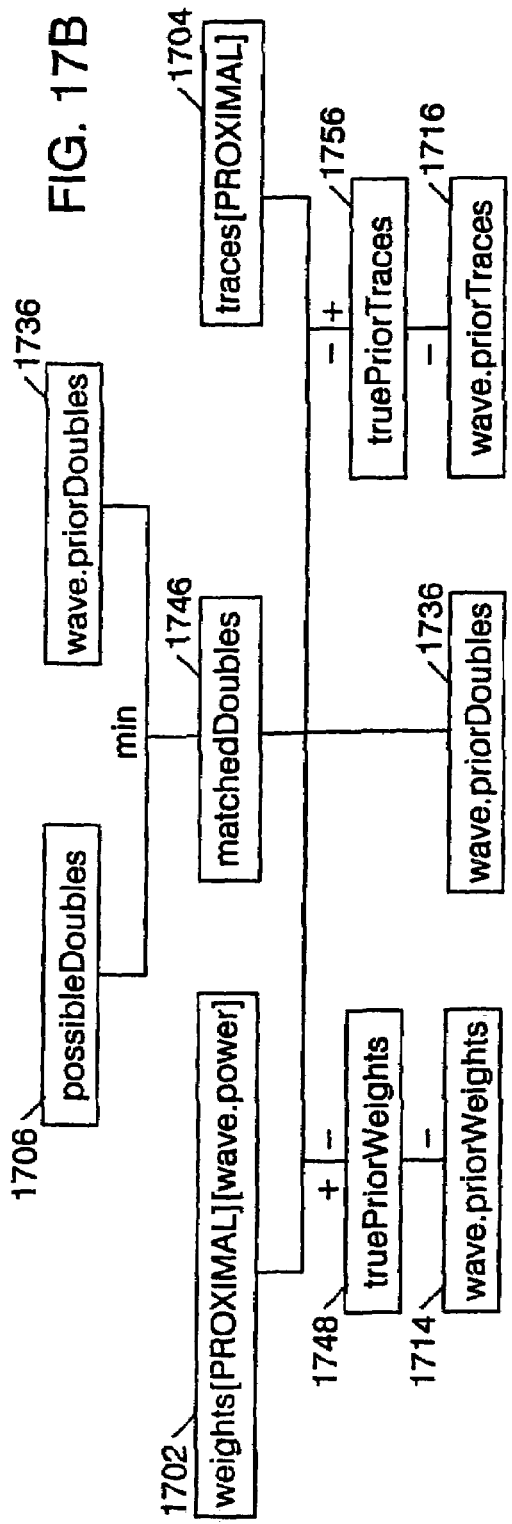
Figure 17C:
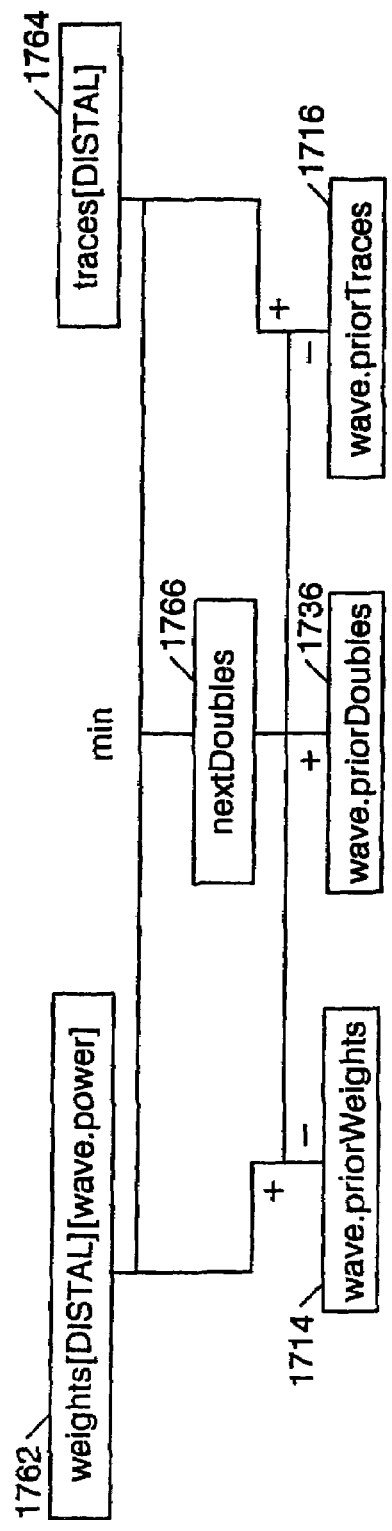

FIGS. 17A–17C outline operations of the data flow process for such logic, using elemental +, –, min, and max functions. As discussed, assume that the wave has accumulated the number of priorWeights, priorDoubles, and priorTraces. From the perspective of a distal dendrite "looking" to receive such a memorize wave, the dendrite can also compute its possible doubles (Block 1706) as the minimum of its proximal weights and traces (Block 1702 and 1704 respectively). This leaves a number of possible weights (Block 1708) and traces (Block 1712) as the number of original weights and traces, minus those candidate doubles.

If these possible doubles are true doubles and can be matched to each other as true doublings of an association, then the possible weights and residual traces of the distal dendrite preferably are accountable by matching weights and traces in the wave. This is a hard constraint; when accounting for a distal wave, all proximal counts of the dendrite preferably are accounted to match the wave's accumulations. Matched weights and traces (Blocks 1722 and 1724) are calculated as the minimums of the dendrite's and wave's weights and traces (Blocks 1714 and 1716), respectively.

If the dendrite's possible weights or traces cannot be accounted for by matching to the wave's accumulations, then the possible doubles in the wave may have been too greedy. This is calculated by finding the residual weights and traces, i.e. the possible values that were not matched at Blocks 1726 and 1728 respectively. The larger residual is the number of wave doubles that must be split into their separate weights and traces in order to balance the accounting. This forced split (Block 1732) is removed from the wave's accumulation of doubles (Block 1736) and given to its individual weights and traces (Blocks 1714 and 1716).

Then, referring to FIG. 17B, the dendrite's possible doubles (Block 1706), which also should be completely accounted before the wave moves on, might be true doubles (Block 1736), but only if the wave is carrying possible doubles (Block 1706) to match it. The minimum of these possible doubles and the wave's doubles are in fact true doubles, which have been found and matched to each other as matched doubles (Block 1746).

Knowing the number of true matchedDoubles, the number of true weights and traces can be calculated. The matchedDoubles are subtracted from the stored weights to determine the truePriorTrace (Block 1748). The matchedDoubles also are subtracted from the stored traces to determine the truePriorTraces (Block 1756).

Finally, referring to FIG. 17C, the dendrite takes the perspective of looking distally before sending the wave to the next dendrite. It calculates the possible next doubles (Block 1766) as the minimum of its distal weights (Block 1762) and traces (Block 1764). Again these are possible doubles, which this process will resolve in the next dendrites. The wave's weights and traces also are updated from the dendrite's distal perspective in order to keep a balanced account of all associations for repeated operation.

FIG. 18 shows an example of programming code for the Double Match Filter operations of FIGS. 17A–17C. Each code block 1802, 1804 and 1806 preferably is sequentially executed, corresponding to the data flow logic shown in FIGS. 17A–17C, respectively. The first block 1802 calculates the possible doubles in the dendrite, including removal of false doubles by calculation of forced splits. The second block 1804 calculates the true matched doubles and accounts (removes) the prior accumulations from the wave. The third block 1806 then adds the next counts to the wave's accumulations of weights, doubles and traces. These code blocks preferably are implemented as one or more private methods (subroutines) that are callable by the memorize and imaging methods of class Dendrite.

Reading

Reading of the artificial neuron now will be described. The calculation of matched doubles is used in both writing and reading operations. As described for memorization, matched doubles indicate which associations in the current sensor pattern are already known so that they can be carried to the next weight power. For the read operation, also called "imagine", matched doubles represent the number of associations in memory (the weights) that match the associations in the new observation (the trace). The Double Match/Filter process also can be the heart of this associative memory's matching function and its measure of similarity/distance.

The read operation is cast as recalling or imaging of past associations given a set of new observations. In other words, the new pattern of observations is clamped to the sensor input neurons and focused to one of the multipolar neurons. This multipolar neuron then imagines the possible output (feed-forward prediction) and imagines possible associations to any other inputs (feedback pattern completion). These two read operations are often referred to as heteroassociation (inputs to output) and autoassociation (inputs to other inputs). In the psychology of learning theory, these elements are referred to as stimulus-response associations and stimulus-stimulus associations, respectively.

The Double Match/Filter process preferably is used for such recalling of memory. Briefly, recall is a comparison for matches between the trace associations of the current observation and the permanent weight associations representing the past. The strengths of the hetero- and auto-associative images may be directly correlated to the degree to which past experiences match the current experience.

Figure 19:
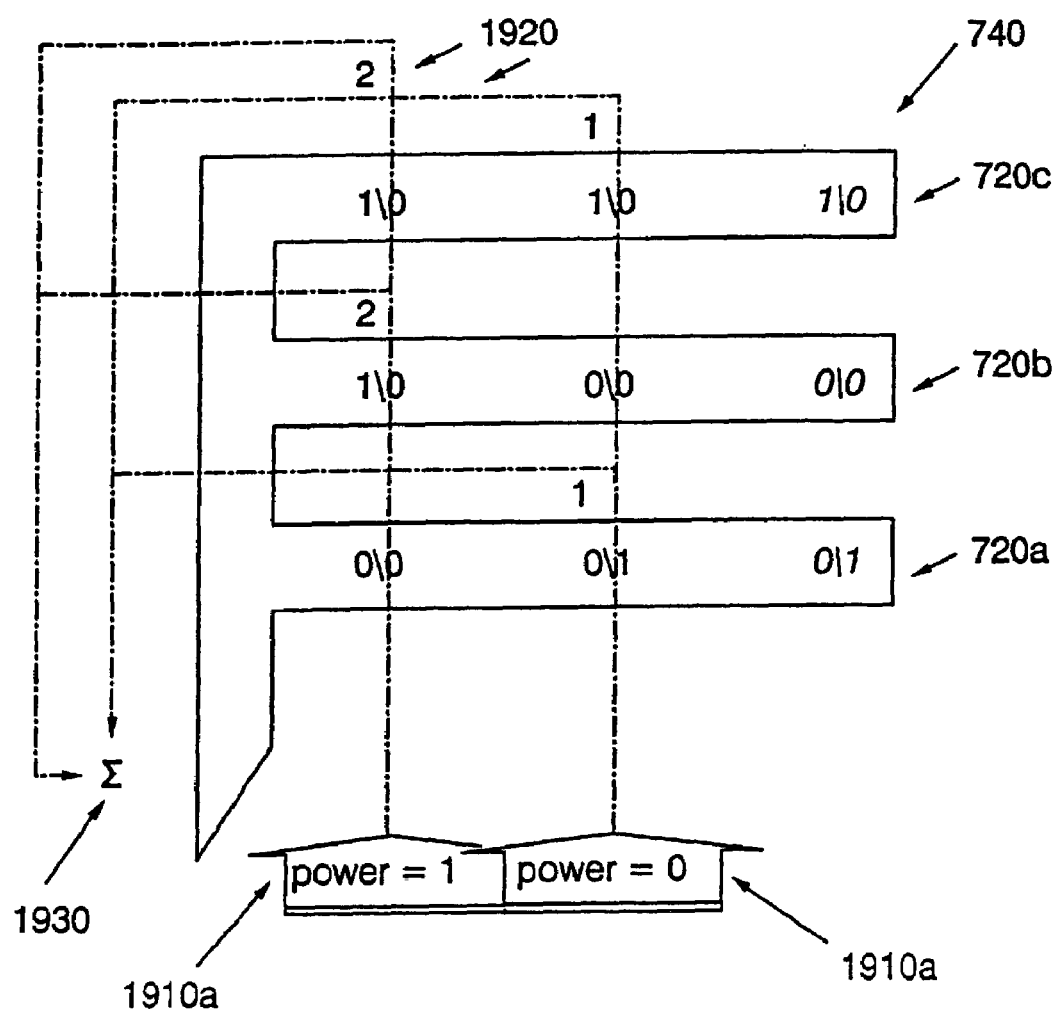
FIG. 19 is a block diagram of reading according to some embodiments of the present invention.

FIG. 19 shows that the imaging wave propagation is "bursty" like the memorize function, but rather than halting when no more carries are required, the imaging function preferably sends a wave through every weight power. Each power represents some of the possible associations, which are all additive. On each pass of the wave for each power $1910a$–$1910b$, the dendrite calculates its number of matches 1920 to the current observation and accumulates these matches in two directions: forward to the output summation, called relevance, and backward to each respective sensor. The accumulated matches are summed at a summer 1930.

Given that each multipolar neuron represents some output action or other label-category, relevance is the degree to which the current observation relates to the action or category. This can also be understood as a membership function: how well the new observation belongs to the set of observations associated with this particular output.

Figure 20:
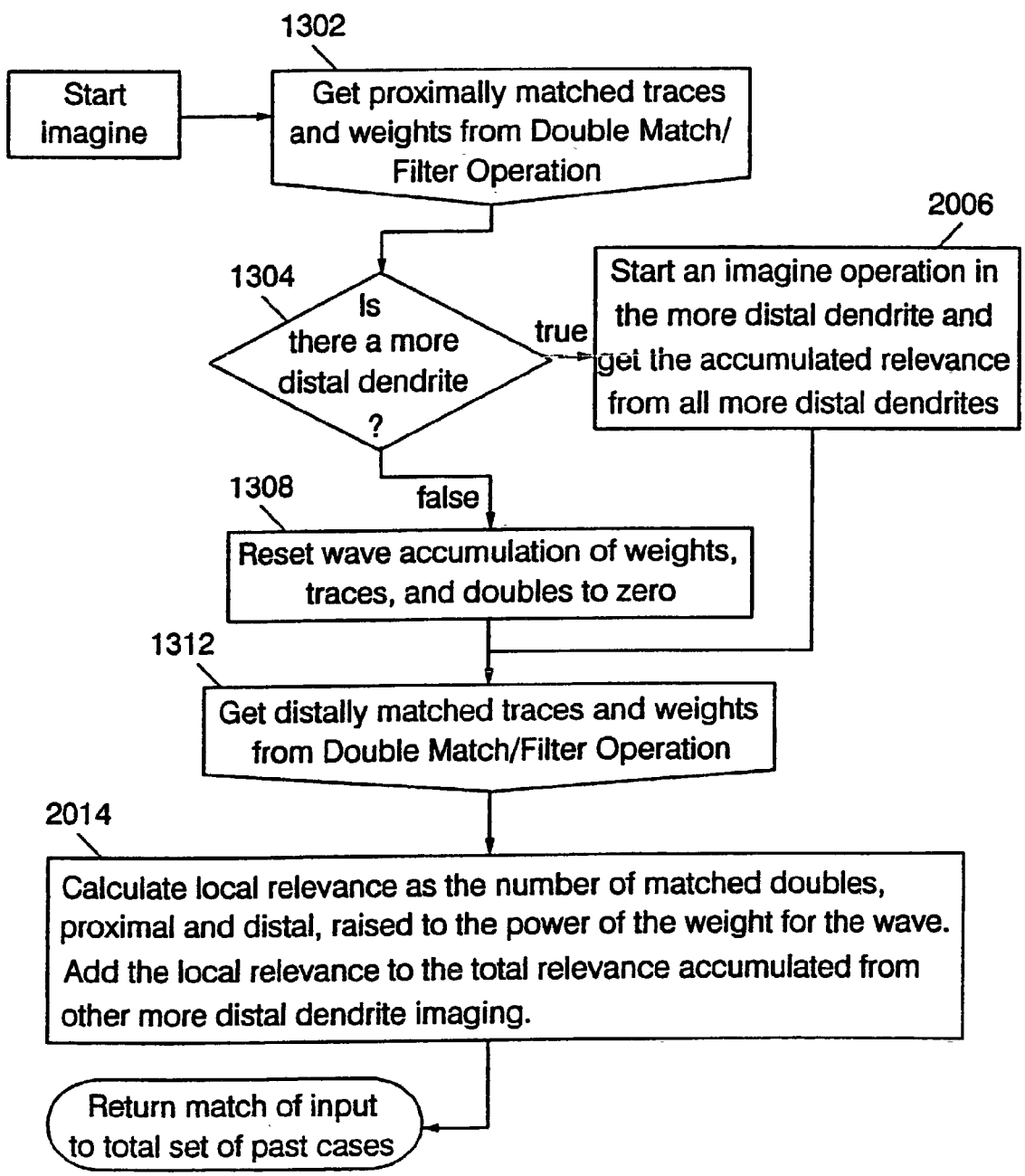
FIGS. 20 and 21 are flowcharts of operations for reading according to some embodiments of the present invention.

FIG. 20 is a flowchart that illustrates operations for reading according to some embodiments of the present invention. It can be seen that reading may be similar to writing (FIG. 13) and it can use the Double Match /Filter. Rather than changing the weights, however, the imagine function accumulates the matched doubles at Block 2006. The total relevance is accumulated through the recursive structure of dendrites, each dendrite adding both its proximal and distal matches. The matches are accumulated to a value called relevance (Block 2014). The new observation is relevant, to the degree that its patterns match those of all past observations stored in the memory.

Figure 1B:
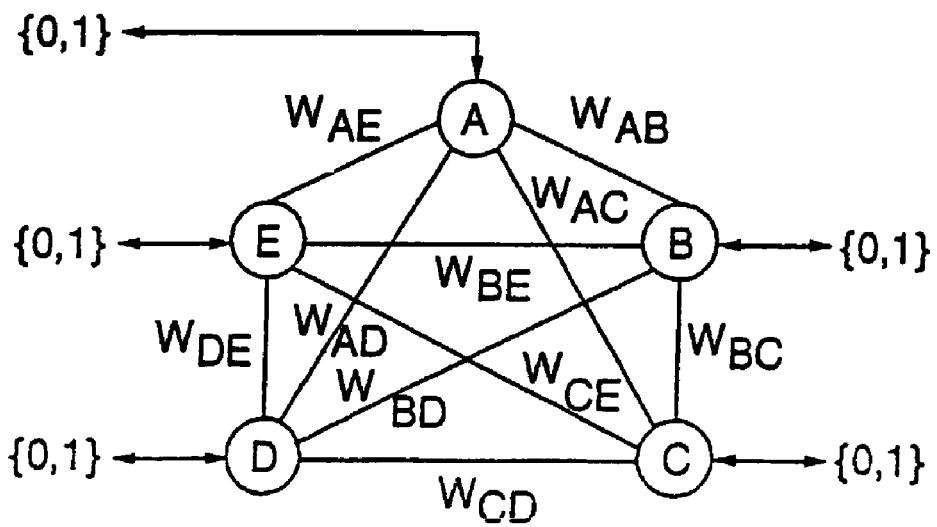

The nonlinear function of this accumulation can be derived from both the linear and nonlinear associative models introduced in FIG. 1. Assume that the relevance value for any observation matrix is composed of both linear and nonlinear terms:

$$\text{Relevance} = w_A A + w_B B - w_{AB} AB$$

Each weight can be calculated from the raw observation counts as $$w_A = w11 + w01 - w10 - w00$$

$$w_B = w11 + w10 - w01 - w00$$

$$w_{AB} = w11 + w00 - w01 - w10$$

which can be rearranged into the following partial formulas in terms of each phase $$\text{relevance00} = w00(-A*B - A - B)$$

$$\text{relevance01} = w01(A - B + A*B)$$

$$\text{relevance10} = w10(B - A + A*B)$$

$$\text{relevance11} = w11(A + B - A*B).$$

Given that the phase is already a filter of A's and B's signal states, it can be seen that the sensor terms are constant for any phase, in fact, a constant of 1 for each phase. For one instance, relevance00=w00. In other words, the partial relevance of each phase is an accumulation of the observation weight. Thus, some embodiments of the present invention can account for both linear and nonlinear associations, even though the physical representation is linear and the recall functions are an accumulation of observation counts. The Double Match/Filter selects those observation counts that represent the current observations.

Figure 21:
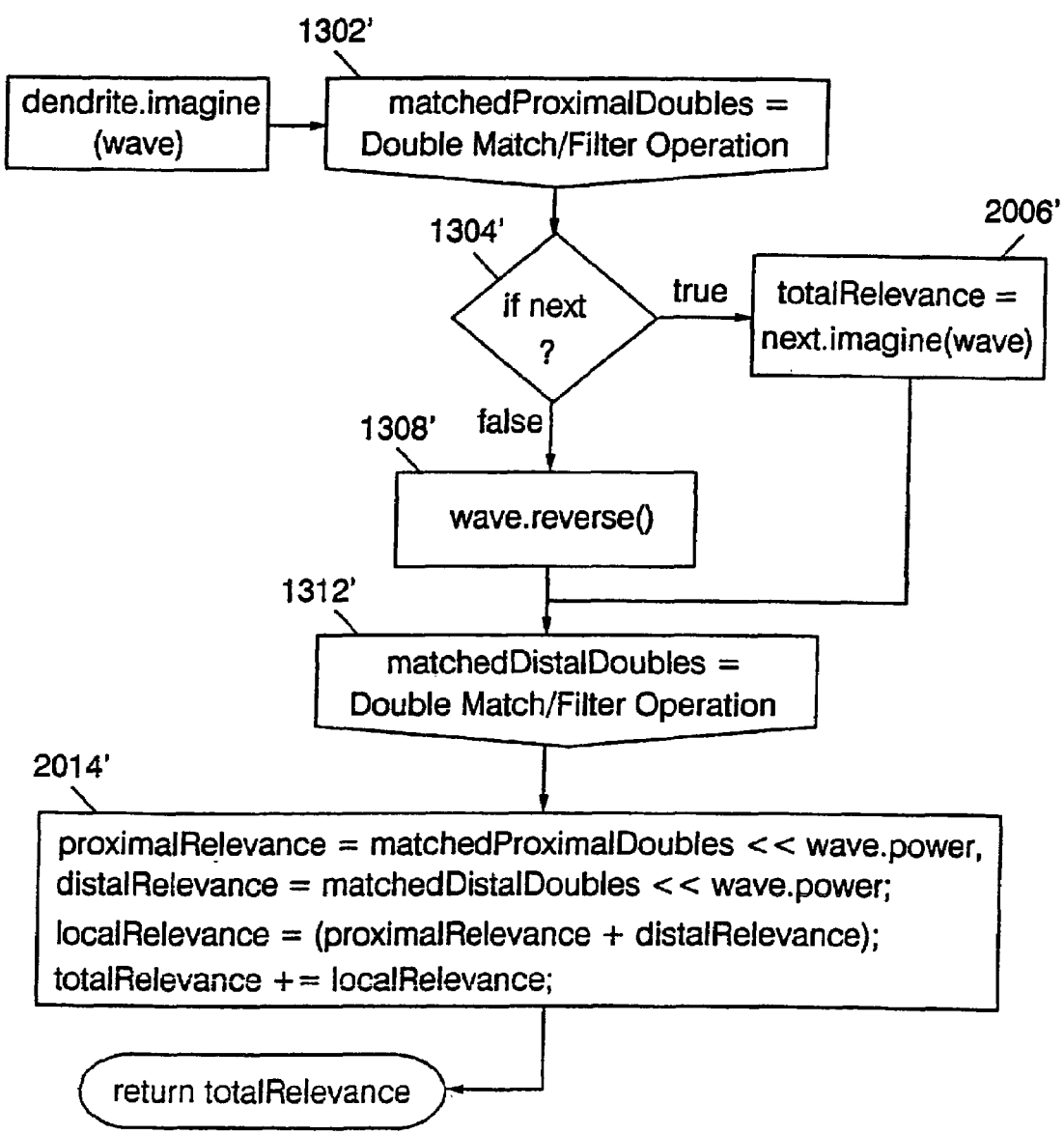

FIG. 21 shows programming code for the embodiment of imaging of FIG. 19. Prime (') notation is used. The Dendrite object has a member function imagine that also takes a wave as an argument. Like the other functions, the calling of dendrites is also recursive, but the imagine process is a READ operation and returns the totalRelevance accumulated through the dendrites (Block 2014'). Like the memorize function, the imagine operation calls the Double Match/Filter to calculate the number of proximal and distal match doubles. However, rather than changing the weights as in memorize (a WRITE operation), imagine accumulates the relevances. For both the distal and proximal matched doubles, the relevance accounts for the weight power. This exponential increase in relevance is calculated by left-shift of the match doubles. The local relevance of each dendrite's calculations is added to the total relevance returned by other dendrites (Block 2006'). This concludes the description of the reading operation.

It will be understood that the Purkinje neuron is only one form of multipolar neuron. The pyramidal neurons of the cerebral cortex also are well known, but nervous systems generally display a very wide variety of dendritic branching patterns, many of which are complex and multipolar. Likewise, some embodiments of the present invention can be applied to many other forms of observation counting. The 2×2 observation matrix was introduced as a fundamental element of recording observations and interactions; however, one skilled in the art will recognize that higher dimension matrixes, polar coordinates, Karnaugh maps, Boolean functions, and/or hierarchical structures also can be used to collect observation counts, which can then be decomposed and compressed as was described above.

In fact, even a unipolar neuron can use some embodiments of the present invention within its only dendrite. For instance, the ratio between A and B results in a single 1×1 cell, one value for each pairwise combination of inputs. This is equivalent to a single weighted graph, which can be decomposed into a set of un-weighted power graphs, which in turn can be dynamically programmed as above. A single dendritic recursion, perhaps the only one in a unipolar neuron, could then represent such ratio numbers.

In summary, the incremental learning and recall of observations has been described within a multipolar neuron, composed of primary branches for each possible pair-wise combination of terms. Although other multipolar structures can be represented, this 2×2 observation matrix provided an example of four phases. Each branch preferably is composed of recursive dendrites, each dendrite connected to one bipolar input neuron and containing a set of weights and traces. Each dendrite stores weight pairs, one weight storing the number of associations to other dendrites proximal to it, and one weight storing the number of associations to other dendrites distal to it. The dendrite preferably stores multiple weight pairs, one pair for each base-two power of possible weights. The total number of weight pairs per dendrite thus can be limited to $\log_2$ of all stored observations. Each dendrite also preferably contains a single pair of transient traces, which represent the current observation using the same proximal/distal form of accumulation weights.

Several operations using dynamic programming can allow reading from and writing to the memory in linear space and time, even though the accounting approximates nonlinear associations between all inputs. All operations can use wave propagation in which the wave filters the dendrites' phase orientation and carries the accumulation of their signals as it travels from one dendrite to another. A Double Match/Filter can process the hard constraints between dendritic weights and traces, resulting in an implicit enumeration of past associations that are matched by the current observation. Thus, weights can be added and carried from one weight power to another during the memorize operation. It also measures the pattern match between past memories and the new input in order to determine the relevance of the new observation and the sensitivity of each input in effecting such relevance.

The hypermachine scaling factor of some embodiments of the present invention can profoundly broaden the general utility of associative memories. Although the implementation described here may admit some loss in its compression from nonlinear to linear, an incremental-loading, parameter-free, nonlinear associator now can be physically implemented in a linear size and speed to open new possibilities for machine learning, both at the largest scales of the Internet and the smallest scales of wireless devices.

Artificial Neurons Including Weights That Define Maximal Projections

Some embodiments of the present invention may be based on a power series separation and prior/next counts as was described above. However, some embodiments of the present invention that now will be described can provide for a lossless compression of associations using maximal projections, and may be used in many applications of both hetero-associative and auto-associative recall.

A theoretical discussion of maximal projections first will be provided. A description of embodiments of neural networks including maximal projections according to some embodiments of the present invention then will be provided. Finally, detailed description of reading and writing according to some embodiments of the present invention will be provided.

Theoretical Discussion of Maximal Projections

It has been realized, according to some embodiments of the present invention, that concepts in the unrelated field of tomographic reconstruction may be informative to solving the potential problem of information loss. In particular, consider the problem of digital tomography in which the row and column weights for a matrix can be sensed from projections along the edge of a binary matrix.

Figure 23:
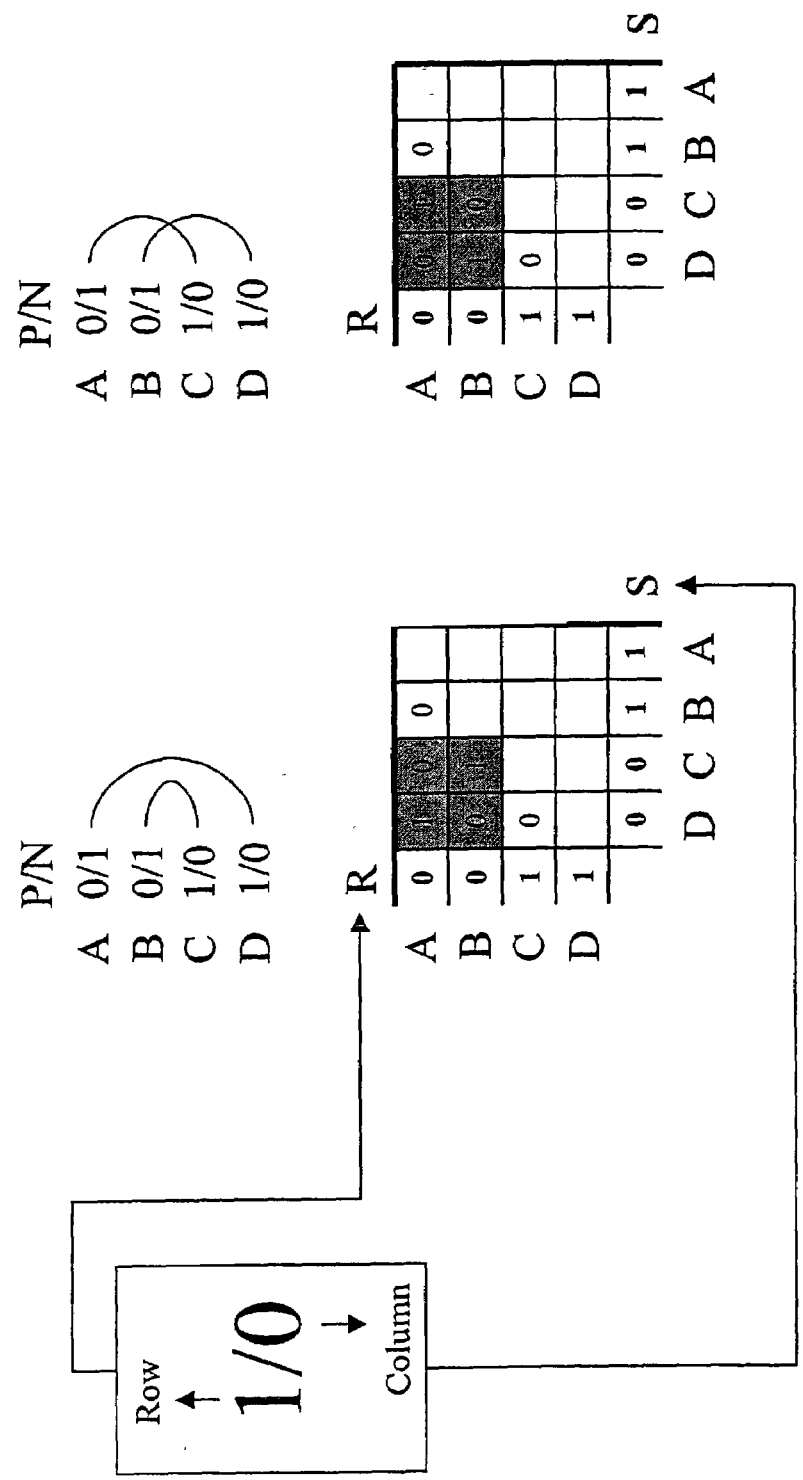
FIG. 23 illustrates how prior/next and row/column projections can be equivalent.

Consider row and column sums of a full matrix as the tomographic generalization of prior/next sums as illustrated in FIG. 23. Row/column sums are typically denoted as {R, S} in such matrix computations. It will be understood that the terms "row" and "column" are being used to indicate two different dimensions in a two-dimensional matrix, rather than an absolute direction. Accordingly, the terms "row" and "column" may be interchanged throughout.

Referring now to FIG. 23, it can be seen that the prior/next and row/column projections can be equivalent for triangular matrices. FIG. 23 shows how the "prior" weight can be mapped to a "row" weight in R, the vector of all row sums of a matrix. "Next" weights can be mapped to S, the "column" weights of the matrix. The description that follows will use the {R, S} denotation as more typical of matrix mathematics, which may also demonstrate potential applicability of embodiments of the present application to very large matrices.

Embodiments of the present invention can make use of a finding from Lorentz. Lorentz found that some arrangements of bits in a binary matrix are "maximal", meaning that the rows and columns can be resorted in such a way that all the bits are well "packed" into one corner, with no holes occurring in the packing. In some embodiments of the present invention, a power series separation as was described in some embodiments of the present invention may be used to generate bit matrices (a set of matrices containing only binary values), from which {R,S} projections can be efficiently manipulated and used.

Figure 24:
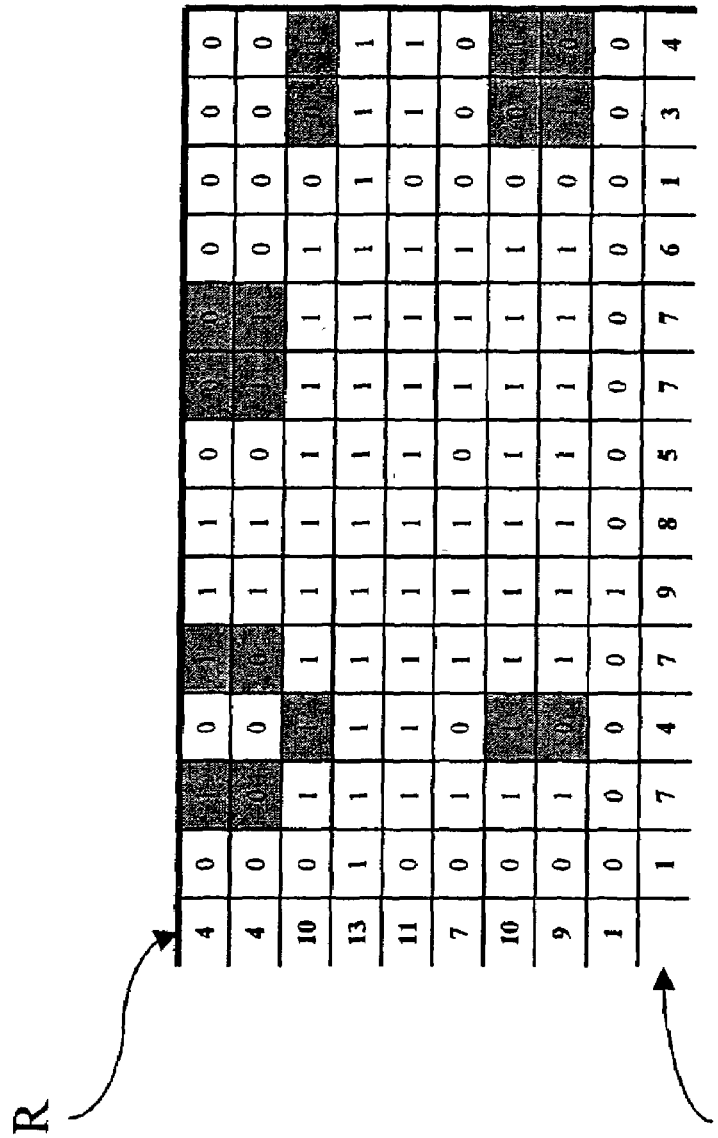
FIG. 24 illustrates a bit matrix of unsorted row and column projections.
Figure 25:
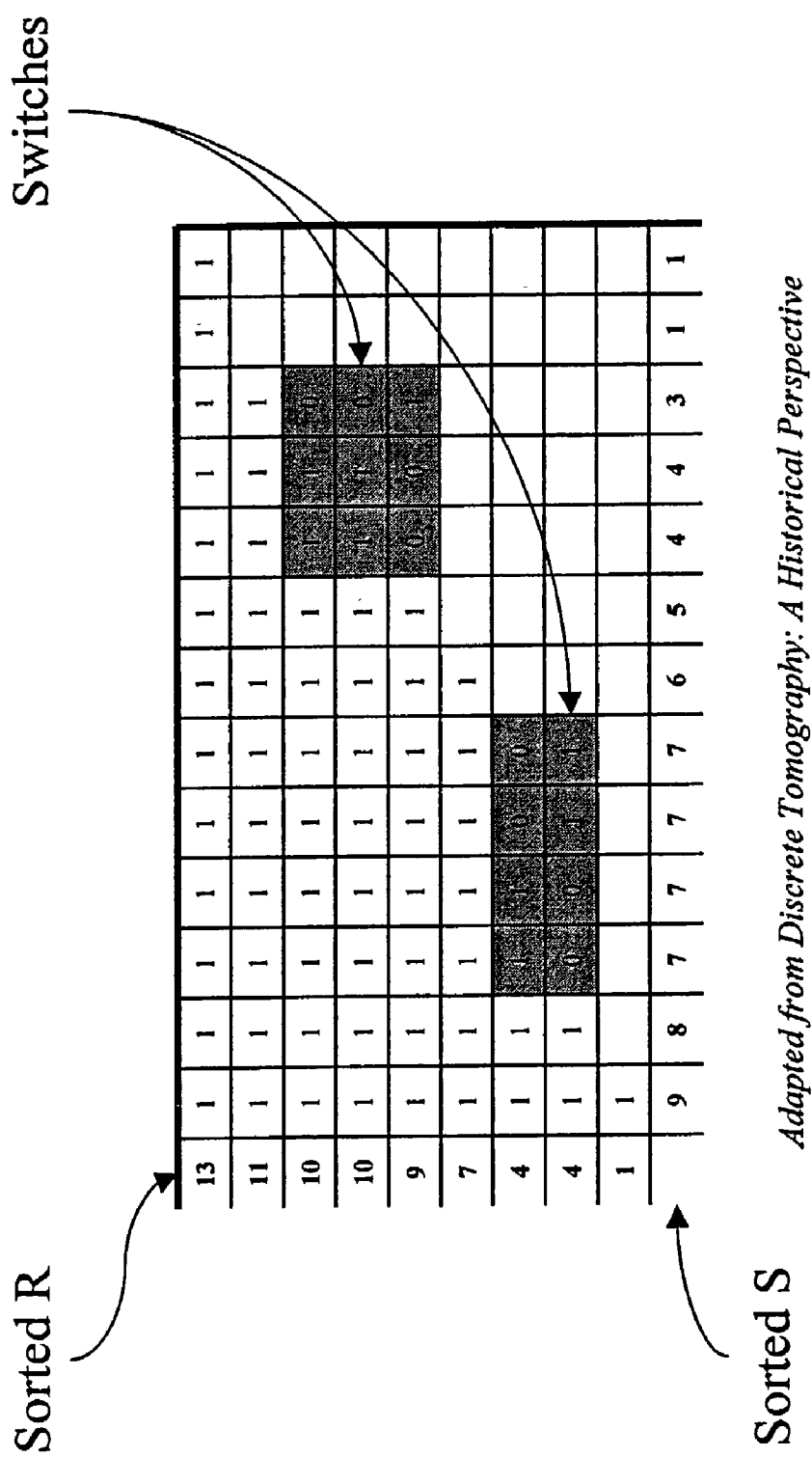
FIG. 25 illustrates a bit matrix of sorted projections.

First, it will be shown that matrix rows and columns can be resorted without loss of information. FIG. 24 illustrates a bit matrix and its unsorted {R, S} projections. The matrix can then be sorted such that the {R,S} sums are in descending order. FIG. 25 illustrates such a matrix of sorted projections. Note that most of the ONE bits are now in the upper-left. The shaded areas in FIG. 24 are better consolidated and arranged in FIG. 25 to all be just outside this area of maximal bit packing. The non-maximal areas are called "switches" because the bits can move or switch into different configurations without changing the {R,S} projections.

Figure 26:
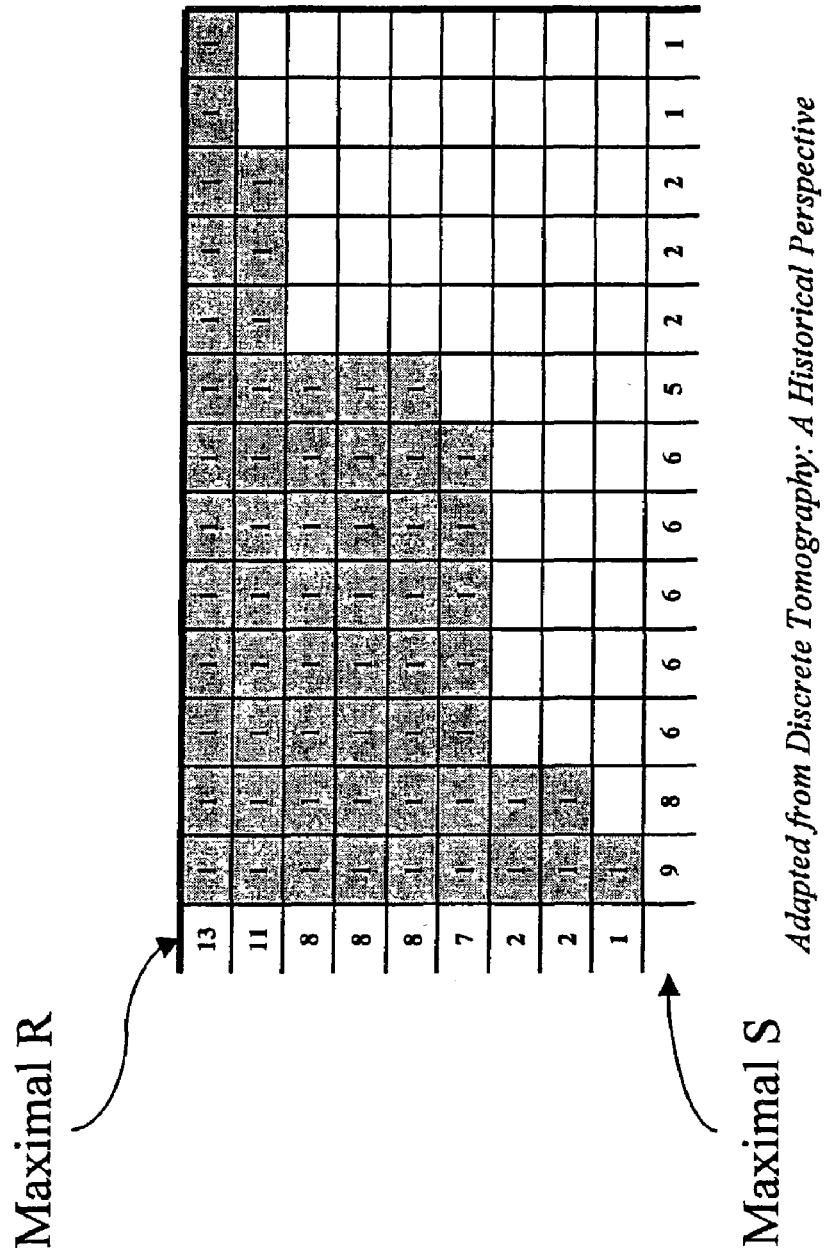
FIG. 26 illustrates a bit matrix of maximal projections according to some embodiments of the present invention.

Lorentz also determined that maximal matrixes—sorted matrices that do have such maximal bit packings—can be completely determined by their {R, S} projections as seen in FIG. 26. The row projections are denoted Maximal R and the column projections are denoted Maximal S. Here, the projections represent only the maximally packed portion of the matrix, excluding the bits that are within the switches. The projections and the matrix are equivalent and can be determined from each other. Hence, the full matrix is reversible from the projections.

For tomography, this means that some projections can be resorted and the location of bits can be determined from the projections. Lorentz determined that, given a sorted projection of a matrix indexed by i and j, any element $a_{ij}$ of a maximal matrix can be determined by the formula $a_{1j}=1$ iff $r_1 \geq j$. In other words, the bit is on if and only if the row projection ($r_1$) is greater than or equal to the column index j.

Figure 27:
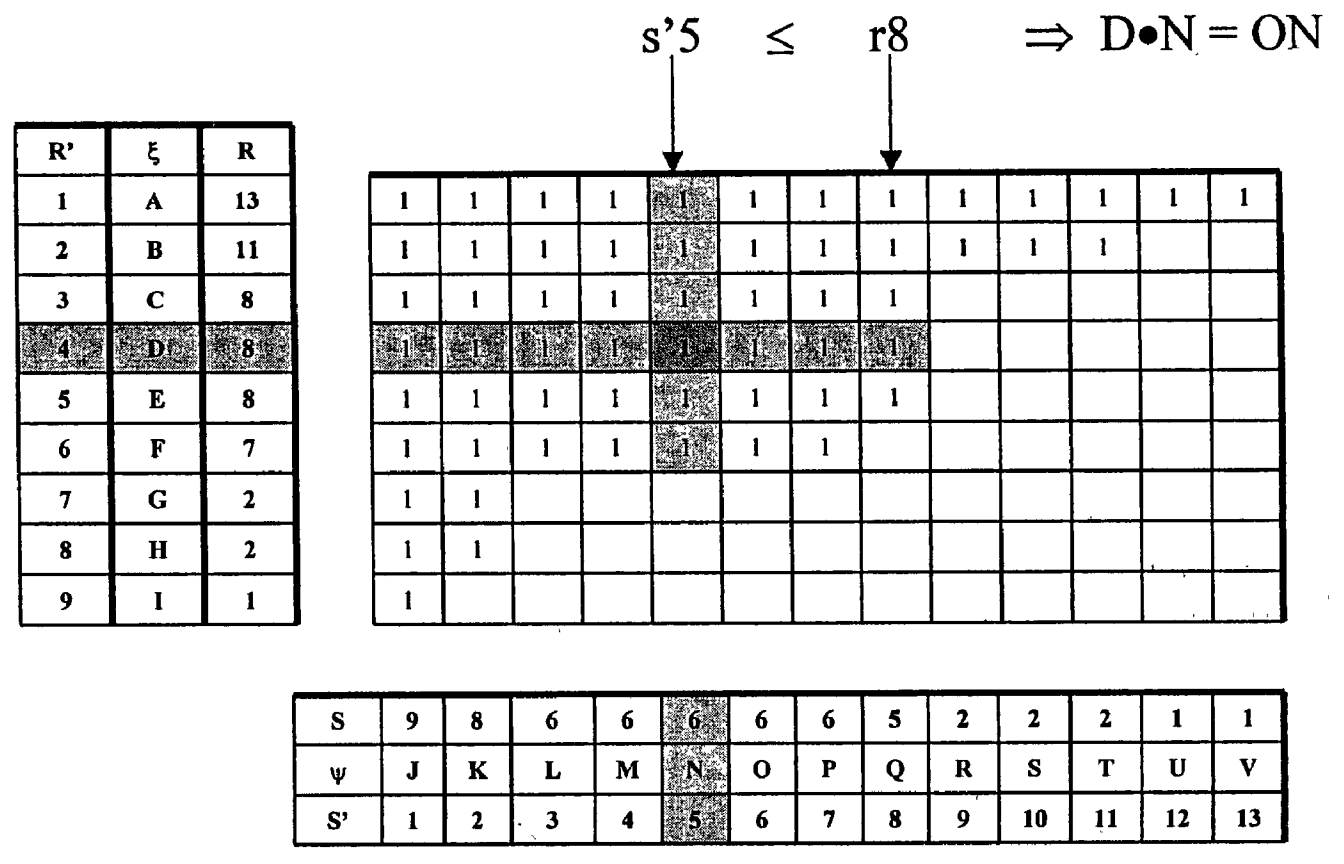

FIG. 27 illustrates a maximal matrix with {R, S} denoting the maximal projections and {R', S'} denoting the row and column indexes. {ξ,ψ} denote input labels of these projections and indices. As highlighted in the shaded portions of FIG. 27, the association of row index, 4, and column index, 5, is ON, which can be calculated as such because the column index, 5, is less than the row projection, 8. In the Lorentz formulation, $r_1=8 \geq j=5$. Therefore, $a_{4,5}$ is ON, which means that D has a definite association with N, as indicated by D·N=ON in FIG. 27.

It will be understood that many matrices and their projections do not tend to be maximal. Rather, maximal matrices are a special case of many matrices. As seen in FIG. 25, however, sorting can arrange {R, S} so that there is one contiguous maximal area, but the non-maximal holes still remain.

Such holes are called "switches" or "4-switches". The simplest condition of such a switch is shown in the shaded area of FIG. 23, when 2 bits are on and two bits are off in such a diagonal arrangement. The 4 locations form a switch in that 2 different arrangements shown in FIG. 23 are possible. The projections generally cannot determine the position of the bits in the switch. Accordingly, 4-switches are a cause of indeterminacy and non-reversibility between a binary matrix and its projections. However, 4-switches are known to be the only cause of such errors. This is known to be the only mathematical object to disturb a matrix from maximality.

Artificial Neurons Including Weights That Represent Maximal Projections

Some embodiments of the present invention can employ power series separation and/or the projection counting that were described above, but can also use maximal projections in an associative memory. These new systems, methods and/or computer program products may improve both reading and writing to and from the memory. Generally speaking, using the properties of maximal matrices may improve the speed of reading. Moreover, knowing the cause of lousiness by 4-switches may lead to a lossless reading and writing, as will be described in detail below.

Artificial Neurons Including Maximal Projections

Figure 28:
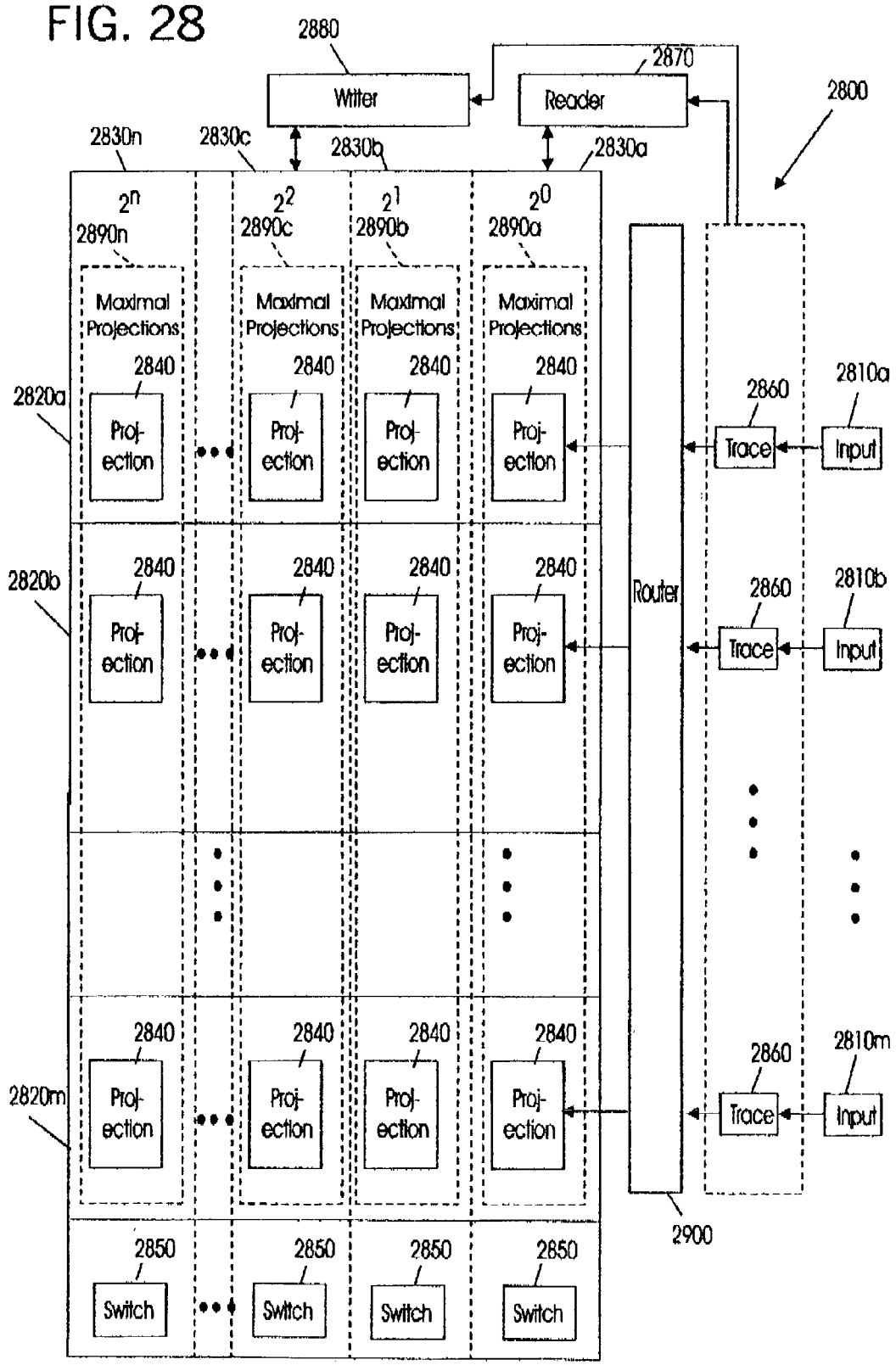
FIG. 28 is a block diagram of artificial neurons according to some embodiments of the present invention.

Referring now to FIG. 28, a block diagram of artificial neurons according to some embodiments of the present invention is shown. As shown in FIG. 28, an artificial neuron 2800 according to some embodiments of the present invention, includes a plurality of inputs 2810a–2810m, and a plurality of dendrites 2820a–2820m, a respective one of which is associated with a respective one of the plurality of inputs 2810a–2810m. In embodiments of FIG. 28, a respective dendrite 2820a–2820m includes a respective power series of weights 2830a–2830n representing weights $2^0$–$2^n$. It will be understood that a weight generally is a place-holder for a count, and need not be a separate physical entity. In embodiments of FIG. 28, a respective weight 2830 in the power series includes a respective projection 2840. In embodiments of FIG. 28, the projections 2840 for a respective power in the power series of weights 2830a–2830n are sorted to define a respective maximal projection 2890a–2890n, i.e., a plurality of projections that are arranged to be maximal, for the associated power. The projections for the associated power are mapped, sorted or indexed by projection length, by a router 2900, for example in a manner that was described above, to provide mapped, indexed or sorted projections that define the maximal projections 2890a–2890n. A separate mapping, sorting or indexing may be provided in the router 2900 for each power of the power series.

In some embodiments, at least some of the weights in the power series 2830a–2830n also include at least one switch 2850. It will be understood that, although a projection and/or switch may not be present at a particular point in time, some embodiments of the present invention provide a place-holder for a projection 2840 at every weight position in the power series and at least one switch for each power in the power series of weights 2830a–2830n. In some embodiments, the power series of weights 2830a–2830n is a base 2 power series of weights, wherein the maximal projections 2890a–2890n include a plurality of maximal row projections and/or a plurality of maximal column projections. In other embodiments, the respective maximal row projection and/or the maximal column projection is sorted by sums of row projections and column projections, respectively, that are represented by the weights in the power series. It also will be understood that not every dendrite 2820 may include a power series of weights 2830 and not every weight 2830 may include a projection 2840. Thus, in some embodiments, at least some of the dendrites 2820 includes a power series of weights and at least some weights in at least one power of the power series define a maximal projection 2890.

Still continuing with the description of FIG. 28, embodiments of artificial neurons 2800 also may include a trace or activation vector 2860, that is responsive to an input signal at the associated input. As will be described in detail below, the trace 2860 is configured to map activations of the input signal to locations in the maximal row projections and/or maximal column projections 2890. The trace 2860 also may map activations to the switches 2850.

Still referring to FIG. 28, a reader 2870 is configured to determine an activated subset in the maximal row projection and/or maximal column projection 2890 from the trace 2860, and to select, for each column of the activated subset, a smallest row projection that is greater than or equal to an index for the column. In other embodiments, the reader 2870 is further configured to accumulate the smallest row projections that are greater than or equal to the index for the associated column, for the columns of the activated subset, to thereby obtain an association of the input signal with the weights.

Still referring to FIG. 28, a writer 2880 also is included that is configured to embed the trace 2860 into the maximal projections 2890 and the switches 2850. In some embodiments, as will be described in detail below, the writer 2880 includes a matrix compressor that is configured to find redundant projections between the trace 2860 and the maximal projections 2840.

It also will be understood by those having skill in the art that in other embodiments, the dendrites 2820a–2820m need not comprise a power series of weights 2830a–2830n. Rather, one or more weights may be provided that are not in a power series, wherein at least some of the weights for at least some of the dendrites define a maximal projection 2840. The weights are sorted by the router 2900 to define a maximal projection and a switch 2850. Thus, maximal projections and switches according to embodiments of the present invention may be used independently of the power series of weights according to embodiments of the present invention.

Reading

Some embodiments of invention that were described above allowed linear reading and writing, which may be desirable when considering that an associative matrix scales quadratically. However, the entire prior/next weight set may need to be scanned from beginning to end in order to compute even a subset of the associations. Some embodiments of the present invention that now will be described can allow the reading of an individual association, independent of the length of the entire row and column projection arrays. Given that associative strength can be segmented into a set of bits, one within each matrix, each bit level can be read by lookup of any two A and B inputs in the rows and columns. Knowing the projections and indices of A and B in each matrix, one can then determine if A and B are associated for that bit.

This can allow for very large neurons. In particular, in some embodiments, reading and writing can be dependent only on the size of the given input vector—and need not be dependent on the size of the complete neuron. In many applications, the vector to be read is usually a fraction of the entire feature space in the neuron memory at large. For example, in some embodiments, a vector of 100 attribute-values may be read in milliseconds even if the entire memory contains 10K–100K possible attribute-values.

On the other hand, the read (and write) time is still generally quadratic if each attribute-value in the vector needs to be considered with each of the others. For several more demanding applications, the input vectors can be 1K–10K in size. Even if read times are independent of associative matrix sizes up to 1M features, this geometric scaling can be further improved.

Figure 29:
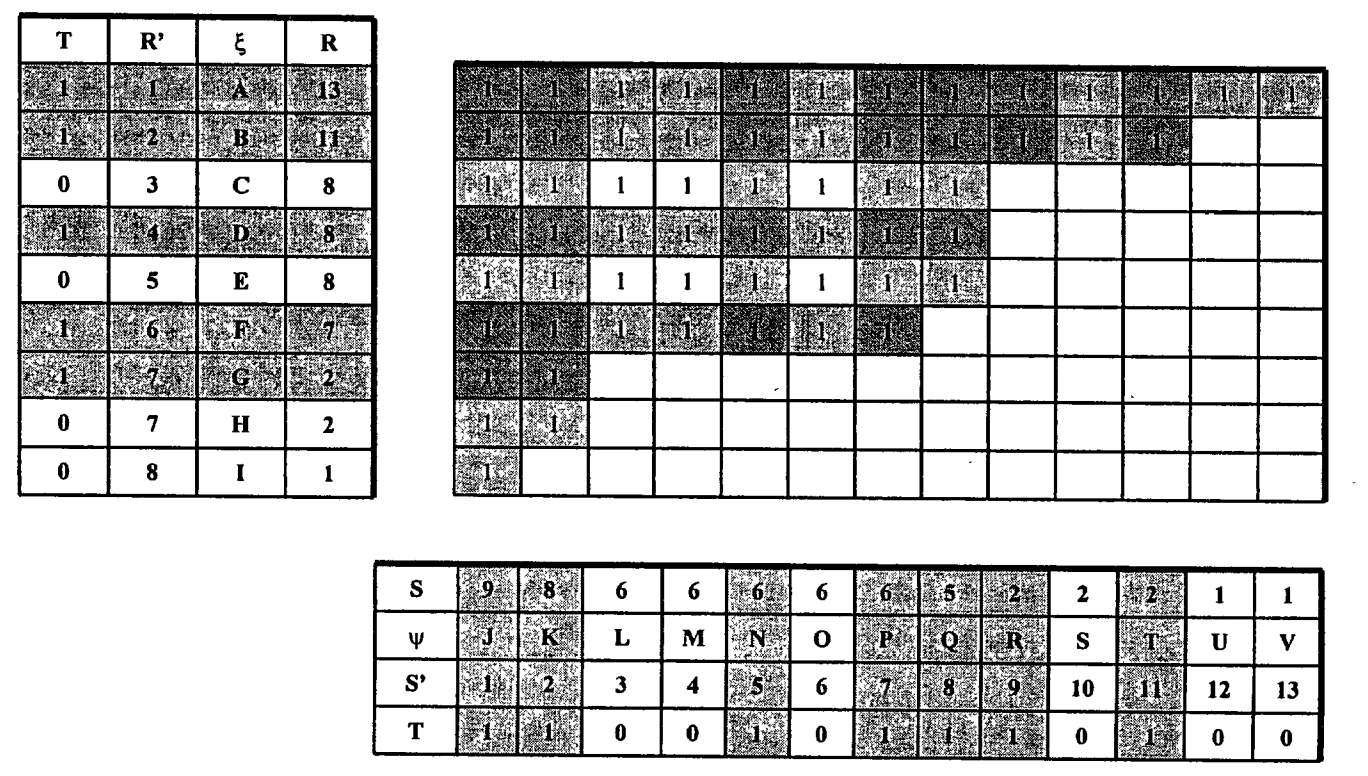

FIG. 29 shows activation of a trace vector, such as a trace 2860 of FIG. 28. As in some embodiments that were described above, a trace represents an input stimulation. Each element of the input vector, such as the input vector 2810a–2810m of FIG. 28, is represented by an input line to the matrix. Given the input vector, the trace is mapped to all appropriate rows and columns.

For example, as shown in FIG. 29, the trace T input terms include {A, B, D, F, G, J, K, N, P, Q, R, T}, with this particular matrix storing the associations A–I with J–V. The activations of these inputs are mapped to their locations in rows and/or columns of the matrix. Given this trace activation, FIG. 29 also shows the highlighting of active associations between active rows and active columns as shaded cells. Active rows and columns are highlighted with darker shading, showing their intersections to the specific associations, the cells within the matrix. The trace activates 25 associations in FIG. 29.

It will be understood that an explicit matrix is shown in FIG. 29 and in many of the other figures, in order to describe embodiments of the present invention, but need not be used as part of a system, method and/or computer program product according to embodiments of the invention. As already demonstrated, the projections themselves can be sufficient to represent the matrix. While the matrix scales quadratically, the projections can scale linearly. The following embodiments use only the projections to read from and accumulate the activations of a trace in linear time.

Figure 30:
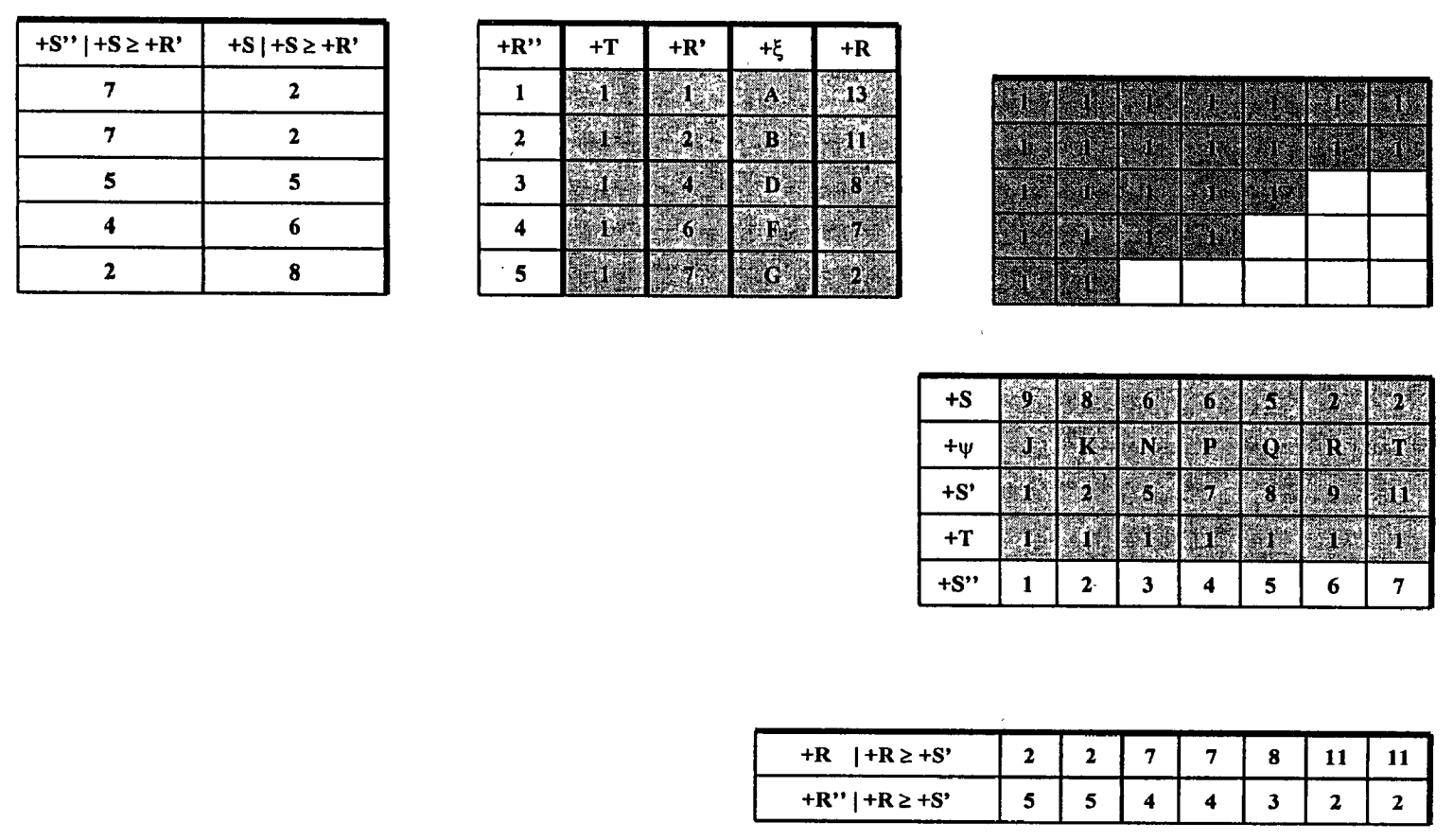

FIG. 30 shows the subset of the matrix that is activated in FIG. 29. The activated subset is also a maximal matrix, and hence, the activated projections will also be lossless in representing and reading bits of the matrix. In FIG. 30, {R, S} continues to represent the original projections, but is denoted as {+R, +S} to indicate the activated subset. Likewise, {+R',+S'} denotes the original indices that were activated. Also, {+R", +S"} denotes the indices of the subset matrix, and +T indicates the subset of the trace that is activated.

Given only the original projections and the addition of {+R", +S"}, which can be calculated in time linear to the size of {+R, +S}, these embodiments select (for each column) the lowest possible projection of +R such that +R≧+S'. In other words, +S" represents the index of a column for which the row projection must be long enough to reach it. Stated differently, from a conceptual standpoint, if there is an activated row projection long enough to reach the column, it and all row projections longer than it also are able to reach the column. Because projections are in rank order, +R' gives the number of such rows in the original matrix. Because reading need only be interested in the number of activated rows that can reach the column, +R" gives the number of such activated rows. It can be seen in FIG. 30 how these values of +R" correspond to the number of activations in the respective columns.

The above reasoning for one cell of a maximal matrix can be extended to cover all the activated cells in linear time. This can be appreciated from FIG. 29. Looking at the first row (R'=1) and its projection (R) of 13, it can extend to all column activations (S) below or at an index (S') of 13. Column 11 is the largest such index, which is the $7^{th}$ such activated index. Therefore, the activated projection of 13 will intersect with 7 columns. These intersections can be accumulated to one count of 25 or can be given as maximal projections of the activation themselves. This subset projection, such as {7, 7, 5, 4, 2}, describes the number of subset associations per row. While the total "score" of the trace can be accumulated as 25 associations, each specific association is perfectly recalled. For example, the subset projection of A is 7, meaning that A has 7 associations in the matrix with other terms in the trace set {A, B, D, F, G, J, K, N, P, Q, R, T}, which is true.

Figure 31:
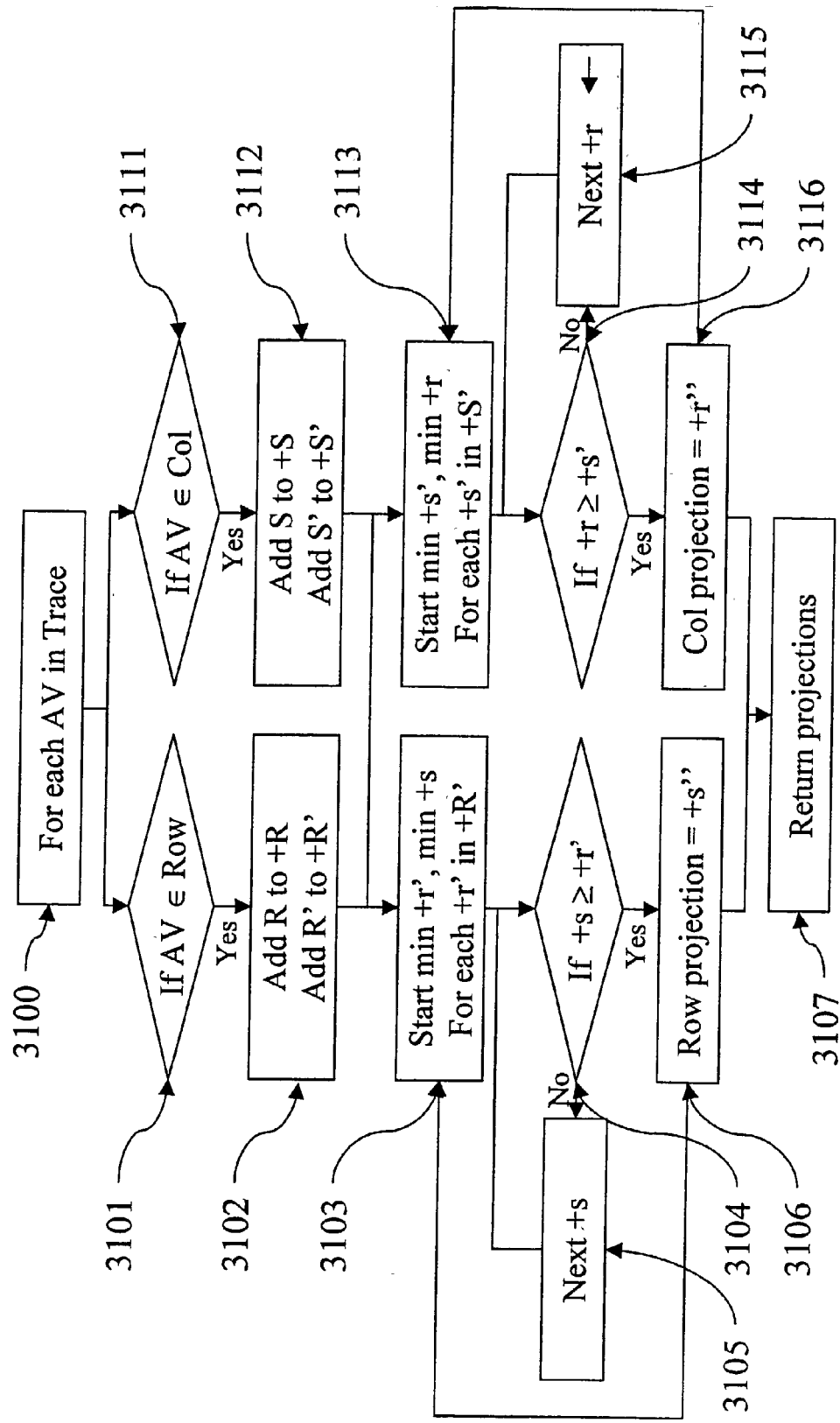
FIG. 31 is a flowchart of reading operations according to some embodiments of the present invention.

More specifically, FIG. 31 is a flowchart of operations that may be performed for reading, according to some embodiments of the present invention. Because R and S both contain the same information about the matrix, either can be used. However, in FIG. 31, construction and return of both new row and column projections are shown.

Referring now to FIG. 31, for each Activated Value (AV) in the trace (Block 3100), the activated attribute-value is contained in either the row (Block 3101) or column (Block 3111). All such rows and columns are accumulated according to their projections {+R, +S} and their indices {+R', +S'} at Blocks 3102 and 3112. Then, assuming the left side of FIG. 31, beginning with the lowest projection in +S and lowest index in +R' (Block 3103), if the projection is greater than or equal to the index ("reaches" the index) (Block 3104), then the activated projection from R is equal to the index of +S in the subset matrix (Block 3106). If not, the next higher projection in +S is evaluated (Block 3105) and these operations are repeated until the projection does reach the index (Block 3106) and the new projection from +S" is marked. These operations are repeated for each successive index in +R'. Projections are returned at Block 3107. Analogous operations for columns may be performed at Blocks 3113–3116.

Because the projections are in sorted order (maximal projections), the last value of +S will be the lowest possible value to begin with in the next iteration of +R'. In other words, this last property can allow embodiments of the invention to be linear in time to the size of +R' or +S, whichever is larger.

These accumulations of bits from each compressed matrix can be accumulated to construct the associative weights as integers, and these integers can be used for both hetero-associative and auto-associative recall. Thus, a precise account of any attribute-value to any other attribute value can be reconstructed without loss in some embodiments of the present invention. In addition to the global accumulation of counts as described for hetero-associative functions in some embodiments of the present invention, some embodiments the present invention can support exact accounting of auto-associations—the count of any attribute-value to any other.

The following algebra demonstrates how computations can be collected from this linear read. In particular, the addition of conditional probabilities can be computed from the addition of power series projections, as follows:

The conditional probability of an association between a given variable such as B and the target variable such as A is given as Prob(A|B), which can be calculated as AB/B, where AB is the number of times AB are associated and where B is the sum of all associations to B. These two values can be read from the projections of maximal matrixes. As described above, it is possible to determine whether the numerator, AB, is ON or OFF. The denominator, B, is the value of the entire projection, which represents all associations of B.

However, to read all the conditional probabilities contained in a maximal matrix in linear time rather than quadratic time (reading each combination), the linear read described above can be employed. Assume the need to accumulate two conditional probabilities:

$$P(A|B)+P(A|C)=AB/B+AC/C=(AB+AC)/(B+C).$$

Such addition is only an approximation of the joint probability, but this formulation can now be accumulated in linear time from a maximal matrix by calculating AB+AC and B and C. Using a power series of some embodiments of the present invention, the integer value of any association can be decomposed into its power series representation. The integer weights of AB and AC can be decomposed into:

$$AB=1*AB1+2*AB2+4*AB4$$

$$AC=1*AC1+2*AC2+4*AC4,$$

where AB1 represents the bit at $2^0$ (1) and AB2 represents the bit at $2^1$(2) and so on up to $2^2$(4). Each element is multiplied by the strength of its power, such as AB4 being multiplied by $2^2$(4). These terms can be rearranged to:

$$AB+AC=1*(AB1+AC1)+2*(AB2+AC2)+4*(AB4+AC4).$$

The linear read described above is now available to calculate such sums as AB1 and AC1. In other words, the combined associative count of B and C to A in the $2^0$ matrix is given by the subset projection of A in this matrix. Assuming a trace of {A, B, C}, the subset projection of A will be:

$$rA1=AB1+AC1,$$

where rA1 represents the subset row projection of A for the first matrix projections in the power series. The sum of the subset projections across the power series is calculated as:

$$rA=rA1+2*rA2+4*rA4,$$

where rA represents the associative strength of A to the other terms across all the power series. To convert this associative strength to the sum of conditional probabilities, rA is divided by the total weight of B and C as follows:

$$P(A|B)+P(A|C)=rA/(B+C).$$

Thus, the total weight of B can be accumulated from the sum of total projections in the power series. For example, if the row projection of B equals 5 in the $2^0$ matrix and equals 3 in the $2^1$ matrix, then B=1*5+2*3=11.

In summary, many matrix calculations can be computed in linear time when the matrices are maximal. To do so, the calculation may be decomposed into a power series representation as described above, and individual terms may be collectable and readable as subset projections or total projections of each power series level. In other embodiments, a power series decomposition need not be used with the maximal projections. The simultaneous computation in linear time of many pair-wise conditional probabilities is an example of one such linear reading, but many other formulations (such as measures of variation) are also possible, according to embodiments of the present invention.

Writing

Writing according to some embodiments of the present invention now will be described. Given the above-described ability to read maximal matrices in linear time, these embodiments will describe how to extract such maximal matrices and manage both the maximal and non-maximal partitions.

A goal of discrete tomography is to estimate the internal position of the bits within the matrix from these projections. In tomographic applications, the projections are given. The matrix itself is hidden within an object, and the tomographic method is used to "see" into the matrix and regenerate the matrix such as for medical imaging. The write operation of an associative memory can present the opposite problem. The association matrix is given, and the memory compresses all the associations into such efficient projections.

Figure 32:
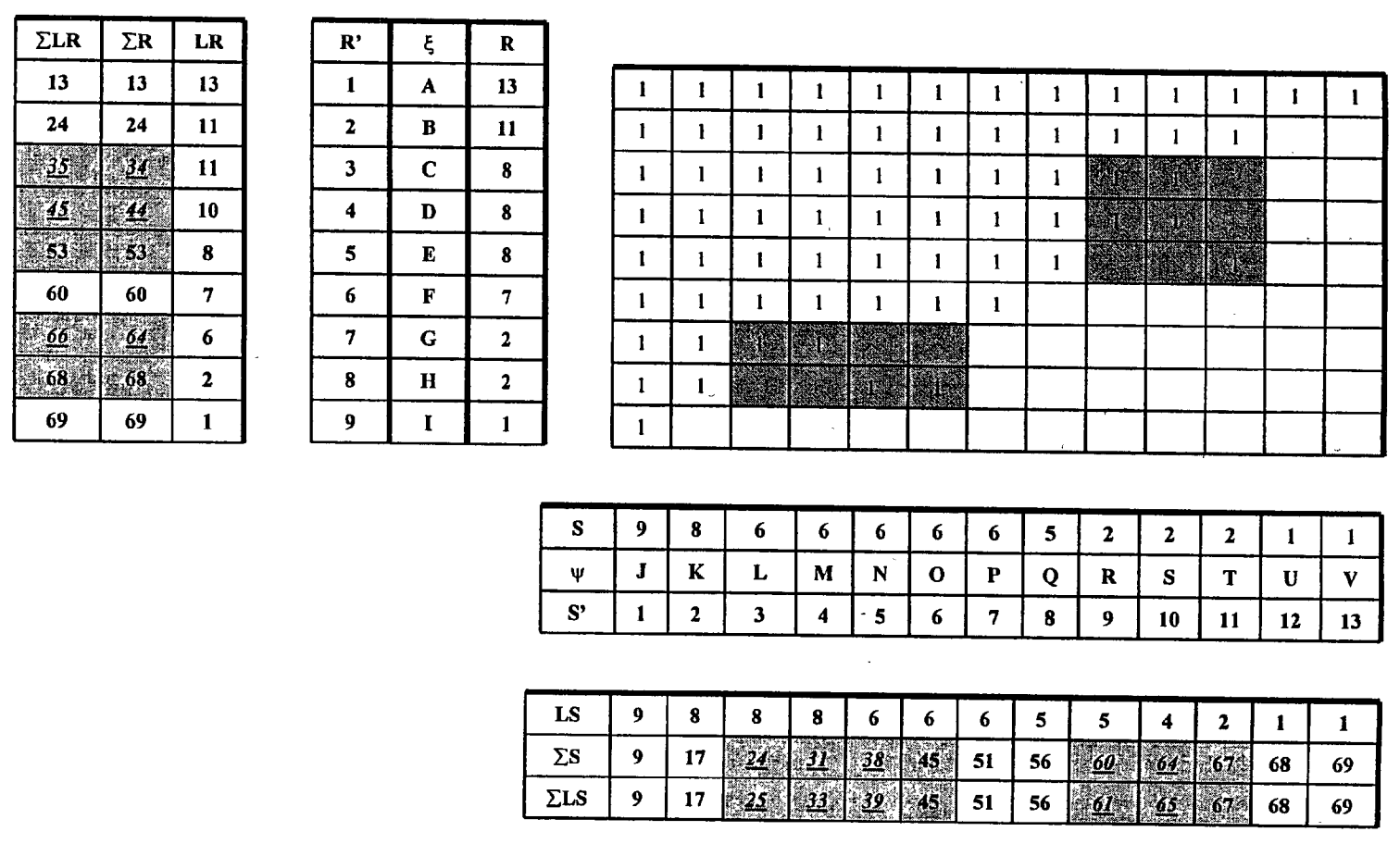

Ideally, all the associations would be arranged as maximal matrices in the power series. If so, then the prior/next projections can perfectly represent the compression of the bits into a linear form, as assumed in some embodiments of the present invention that were described above. However, many, if not most, associative matrices will yield areas of maximality but also include residual 4-switches as shown in FIG. 25 and FIG. 32. The maximal areas may be highly compressed, but first the existence and location of 4-switches may need to be determined. Solving this 4-switch problem can then reduce or remove the lossy compression of prior/next counts in some embodiments of the present invention, according to some embodiments of the present invention.

One approach for finding switches is to isolate the maximal parts of the matrix from the non-maximal parts. As already described, sorting the projections tends to collect the switches along the diagonal. Many sorting techniques then can be used. In some embodiments, but the special properties of {R, S} can allow the use of a conventional technique called C-Sort. C-Sort scales linearly but may not be used often because of a special assumption: the largest number being sorted cannot be greater than the number of items being sorted. However, {R, S} projections have this property. In particular, because the numbers being sorted represent the number of associations in a row or column to other rows or columns, the number of associations cannot be greater than the number of rows or columns. Therefore, C-Sort is usable to sort maximal projections. However, many other sort programs such as a conventional Java sort also may be used.

Figure 33:
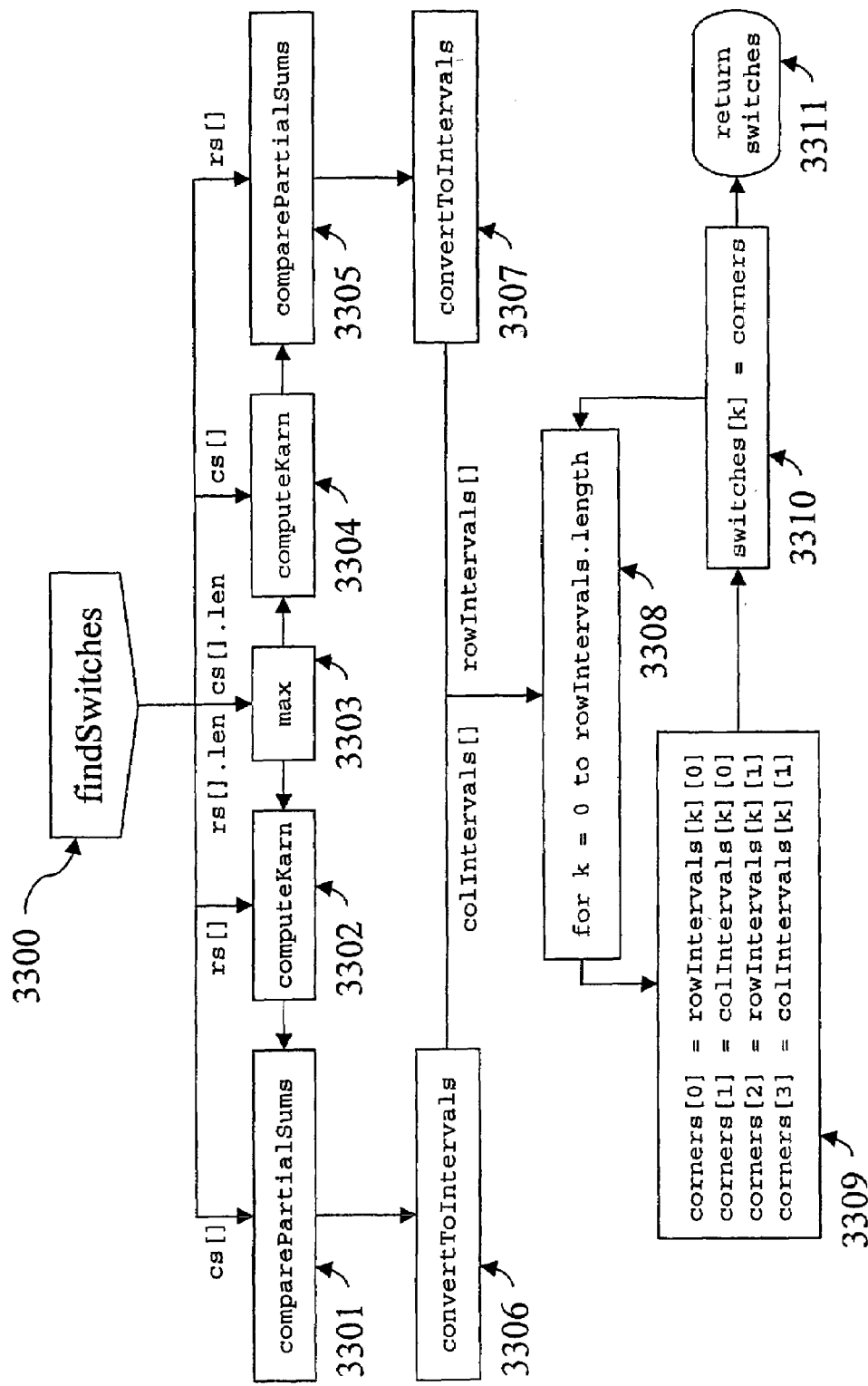
FIG. 33 is a flowchart of operations for finding switches according to some embodiments of the present invention.

Once the projections are sorted, the following operations can determine the coordinates of the 4 switches. FIG. 32 is provided as an example. FIG. 33 is a flowchart of operations that may be used to find switches according to some embodiments of the present invention.

Referring now to FIGS. 32 and 33, in order to find switches (Block 3300), "karns" are computed at Block 3302. In respect to Lorentz' method, L in L(R) and L(S) denotes a cross reference of {R, S} projections. To give this computation a name, "karn" is used as an anagram of "rank". For each column (for example), L(S)=max R'|R≧S' (Block 3303). Likewise, L(R)=max S'|S≧R'. In other words, the karn of R (Block 3302) is the largest row index such that the row projection is greater than or equal to the column index of R, using a zero-based indexing scheme. For example, in FIG. 32, LR of term C equals 11, even though its projection equals 8. This is because the column index 11 is the maximum index for which the column projection, 2, is greater than the zero-based index of C. R' for C=3, making the zero-based index=2. Hence, the $11^{th}$ column projection≧the zero-based index of C, 2≧2. Conceptually, such LS and LR values can be seen to determine the "edge" of uncertainty—the outer edge of the maximal area and switches for each row and column.

Still referring to FIG. 33, at Blocks 3301 and 3305, partial sums are compared. In other words, ΣR, ΣS, ΣL(R), and ΣL(S), respectively, are computed from the first to last index of the rows and columns. Whenever ΣS<ΣL(S) and ΣR<ΣL(R), there is a "crossover" of the row and column projections. Such crossovers are caused by variant areas of the matrix and indicate the locations of 4 switches. For example, in FIG. 32, the partial sums for the input term C are not equal to each other. The ΣR=34 while ΣL(R)=35. In other words, the running sum of projections is smaller than the running sum of the outer edge. When these values are the same, the projections are maximal. When the outer edge of uncertainty is greater than the projection, all the bits are not "packed". There is a switch at row C. The switch ends when these partial sums are again equal to each other, but the switch includes this point. Therefore, rows D and E are also part of a switch.

Still referring to FIG. 33, at Blocks 3306 and 3307, operations are performed at intervals. The coordinate intervals that contain the 4-switches are found by combining the row and column crossovers with each other. For example, FIG. 32 shows that rows [C, E] form one interval while [G, H] forms another. Likewise, [L, O] and [R, T] form the column intervals. Basic geometry may be used for combining these intervals (Block 3308) into the corner coordinates of the 4-switches (Block 3309). Given the constraint that such switches exist on the diagonal of the matrix, the [C, E] row interval is crossed with [R, T] column interval while the [G, H] interval is crossed with the [L, O] interval. Determining the comers of each switch (Block 3310), CR is the top-left corner while ET is the bottom-right corner of one switch. Once these locations are determined (Block 3311), the maximal values can be separated into a highly compressed {R, S} projection and the residual switches.

It will be understood that finding switches may only be part of writing. A complete system may not only find and store the maximal portions of each power series of projections, it may also store the residual switches. A number of conventional techniques may be employed to represent the switches as separate from the maximal projections, but explicit storage as a binary matrix is one conceptually straightforward technique, which may be used in some embodiments of the present invention.

Figure 34:
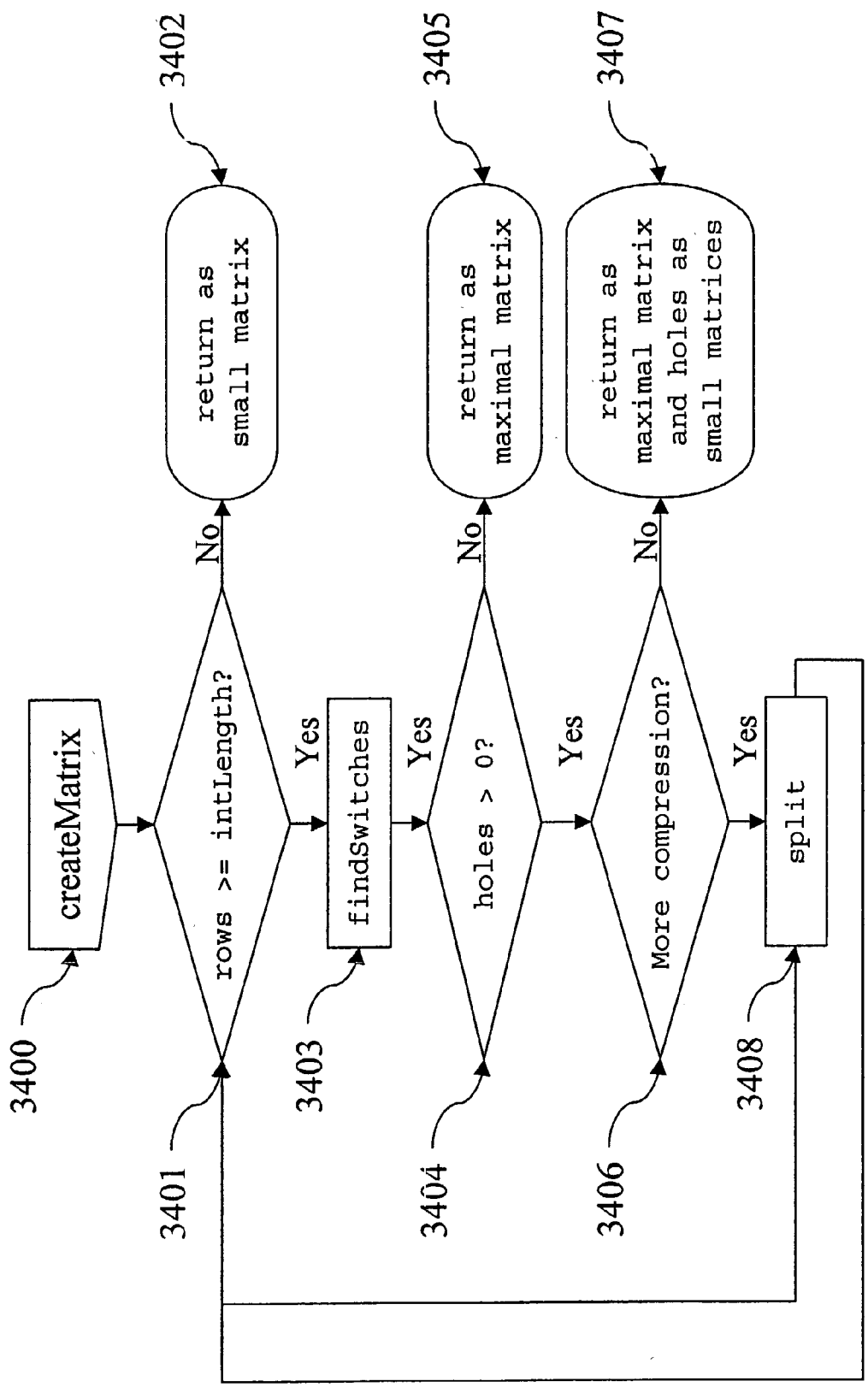
FIG. 34 is a flowchart of operations for finding maximal projections and/or switches according to some embodiments of the present invention.

FIG. 34 is a flowchart of operations 3400 that may be used to find both maximal projections, as well as switch matrices, referred to in FIG. 34 as a "small" matrix. Small bit patterns can be very effectively stored as they are—bit arrays. If the number of rows or columns is less than the word length of the computer's encoding (Block 3401), the matrix may be stored as a small matrix (Block 3402). For example, if an integer of 32 bits is used, then projections of 32 bits may be stored as 32 bits within the integer and manipulated with machine-level operations for writing and reading—whether the matrix is maximal or not. Thus, a 16×16 matrix can represent each row in 16 bits, whereas an integer representation of a projection weight can assume 32 bits.

Compression may be used for larger matrices. In this case, the operations for finding switches (Blocks 3403), such as were described in FIG. 33, will return any switches, or "holes". If there are no holes (Block 3404), then the matrix is returned as a maximal matrix at Block 3405 and can be stored linearly as its projections. Otherwise, a few other considerations may be used. If more compression is not warranted (Block 3406), then the operations return a maximal matrix as its projections and the 4-switch areas as small matrices (Block 3407).

On the other hand, it is also possible to have relatively large 4-switches that can be broken down, resulting in two maximal matrices. The exact technique of splitting (Block 3408) may be arbitrary, but splitting the original non-maximal matrix in two may destroy at least the largest and potentially most troublesome switches. The 2 split matrices are passed back to Block 3401, to determine if they are small, maximal, or require further splitting.

Figure 35:
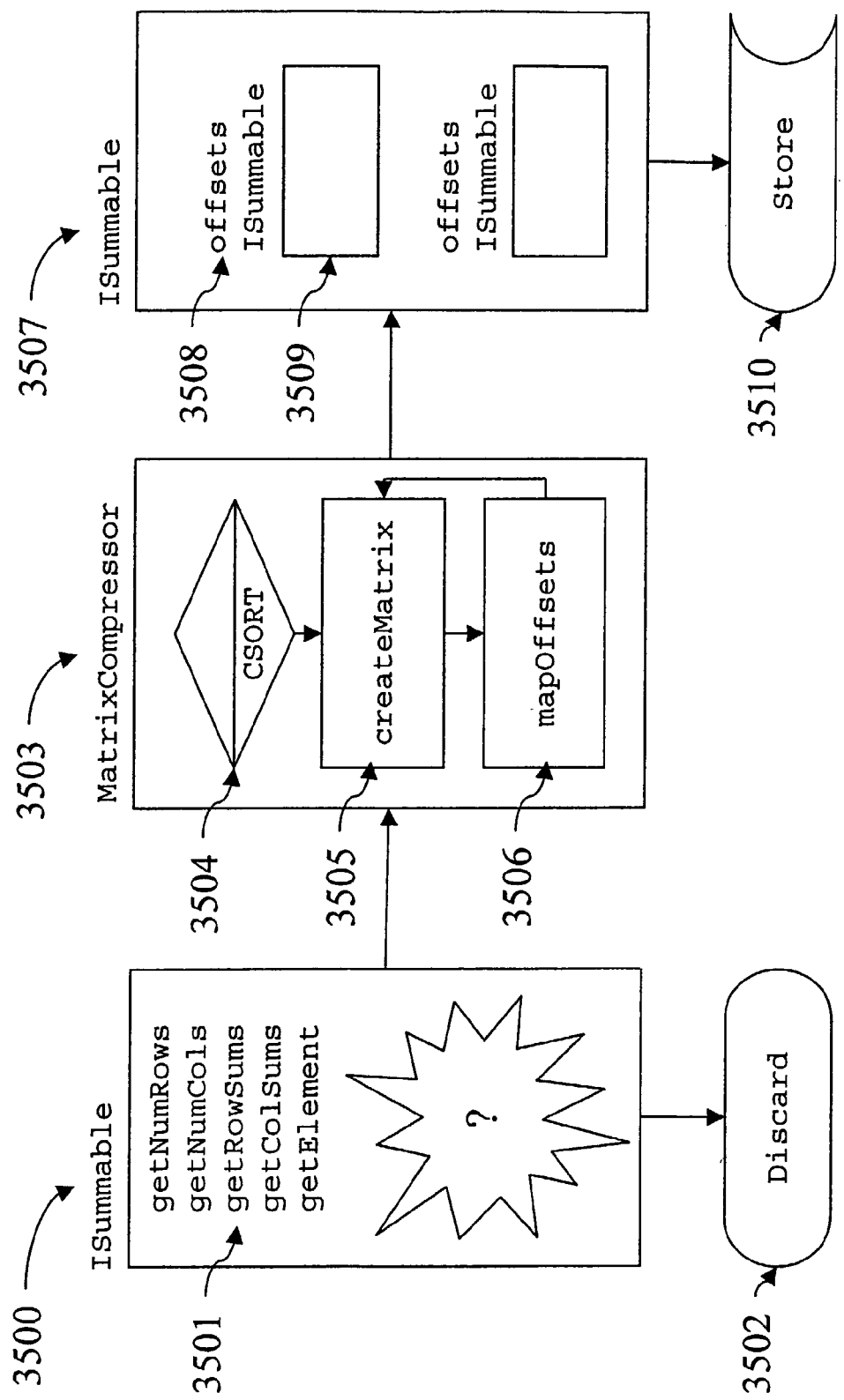
FIG. 35 is a block diagram of writing according to some embodiments of the present invention.

Embedding new trace inputs into the existing matrices (writing or memorizing) according to some embodiments of the present invention is illustrated in FIG. 35. In these embodiments, the object-oriented property of encapsulation is used. This can avoid bit-by-bit manipulation of all the associations and can, in some embodiments, allow the current representation to be the most efficient and canonical representation. Thus, the following description does not specify a detailed implementation of machine internals. Rather, it specifies the behavior of several objects, which may be implemented in a number of ways.

In FIG. 35, all matrices are of type ISummable (Block 3500). In this ISummable interface, the matrix representation can report its row and column sizes and its row and column projections at 3501. Maximal and small matrices can implement this interface so that all of the other reading and writing machinery can be isolated from this difference.

Moreover, ISummables can be recursive. Any one ISummable can contain any number of other ISummables in lists or nests. Thus, the containing ISummable can collate the results sizes and projections of contained ISummables. For instance, any two maximal projections can be added together and treated as one ISummable.

From outside the ISummable "box" 3500, it does not matter whether it is composed of one projection, many projections, or may even by implemented as a small binary matrix, so long as the object can report its size (getNumRows and getNumCols) and projections (getRowSums and getColSums) at 3501. As such, combinations of matrices can be arbitrarily composed and treated accordingly by their collective sizes and projections.

As seen in FIG. 35, a matrix compressor 3503 which can be part of a writer 2880 of FIG. 28, can call to any ISummable 3500, regardless of its unknown internal structure, as indicated by a question mark (?) in the ISummable 3500. Looking only at its virtual but complete structure, the compressor 3503 can create maximal matrices 3505 and new optimal compositions from the original composition.

FIG. 36 as an example of a first observation to create a memory from a first trace. The trace is described in a single maximal matrix, referred to in FIG. 36 as a trace matrix. In some embodiments, the full matrix is not used because the projections can reflect the trace matrix. Moreover, recall that the row projection and column projection also may independently represent the full matrix. Therefore, only the row projection (referred to in FIG. 36 as Trace R) needs to be represented in some embodiments of the present invention. The first observation is a case in which the trace projection becomes the first memory at the first level of the power series, referred to as $2^0$ Memory Matrix in FIG. 36.

Figure 37:
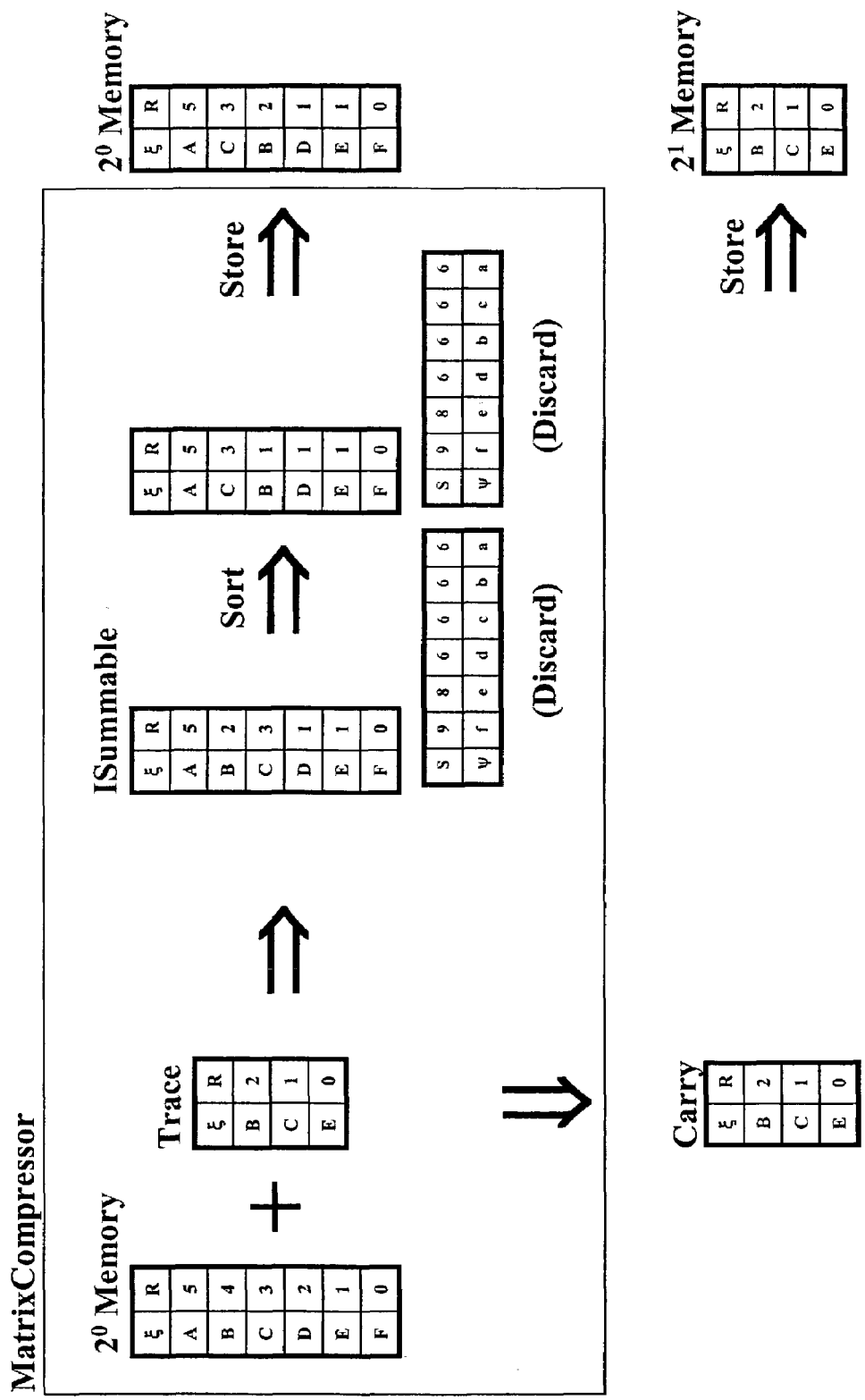
FIG. 37 illustrates writing a second observation into a bit matrix with maximal projections according to some embodiments of the present invention.

A second observation is another new trace matrix, which in this example is a completely filled maximal triangular matrix. FIG. 37 dispenses with showing such full matrices, but shows how the projections can be treated as ISummables for adding a new trace to a given memory.

First, the matrix compressor 3503 of FIG. 35 finds which elements are redundant between the memory and new trace. These bit elements become carries to another plane of the power series representation. Given read methods described above, any element can be determined using the projections. Any elements that are ON in both the memory and trace are placed in the carry of FIG. 37 and the projections of the memory and trace are lowered. In the case of FIG. 37, the entire trace becomes the carry, resulting in a memory with reduced projections.

Second, as shown in FIG. 37, because the projection weights have been changed, they may not be in sorted order. Thus, they are resorted.

Third, because the row projections, column projections, and full matrix are equivalent and derivable from each other, the compressor generates the column projections from the row projections in order to execute the createMatrix and its findHoles methods (FIG. 34). Karns and partial sums are computed (FIG. 33), but in this case, there are no holes, because the addition of the trace into this memory results in a memory that is still maximal. Therefore, the updated and resorted row projections continue to accurately represent the first memory in the power series. As shown in FIG. 37, this memory is stored as its row projections but the redundant column projections may be discarded.

Note that, in FIG. 37, the order of the input terms has been changed from its original order. In particular, B and C have been swapped. Although such detail has been removed from FIG. 37, embodiments of the present invention may account for such changes in order to map the outside terms to the inside coordinates. If not, embodiments of the invention may have to find the projection of each term each time by searching through the term list. Instead, embodiments of the invention may maintain a map of offsets (Block 3506) for each term. These offsets can serve as a map from outside terms to inside locations in the sorted projection order.

Finally, the carry is added to the next memory in the power series, but because there is none yet, the carry becomes the next memory in the power series, much like the original trace became the first memory in FIG. 36.

Figure 38:
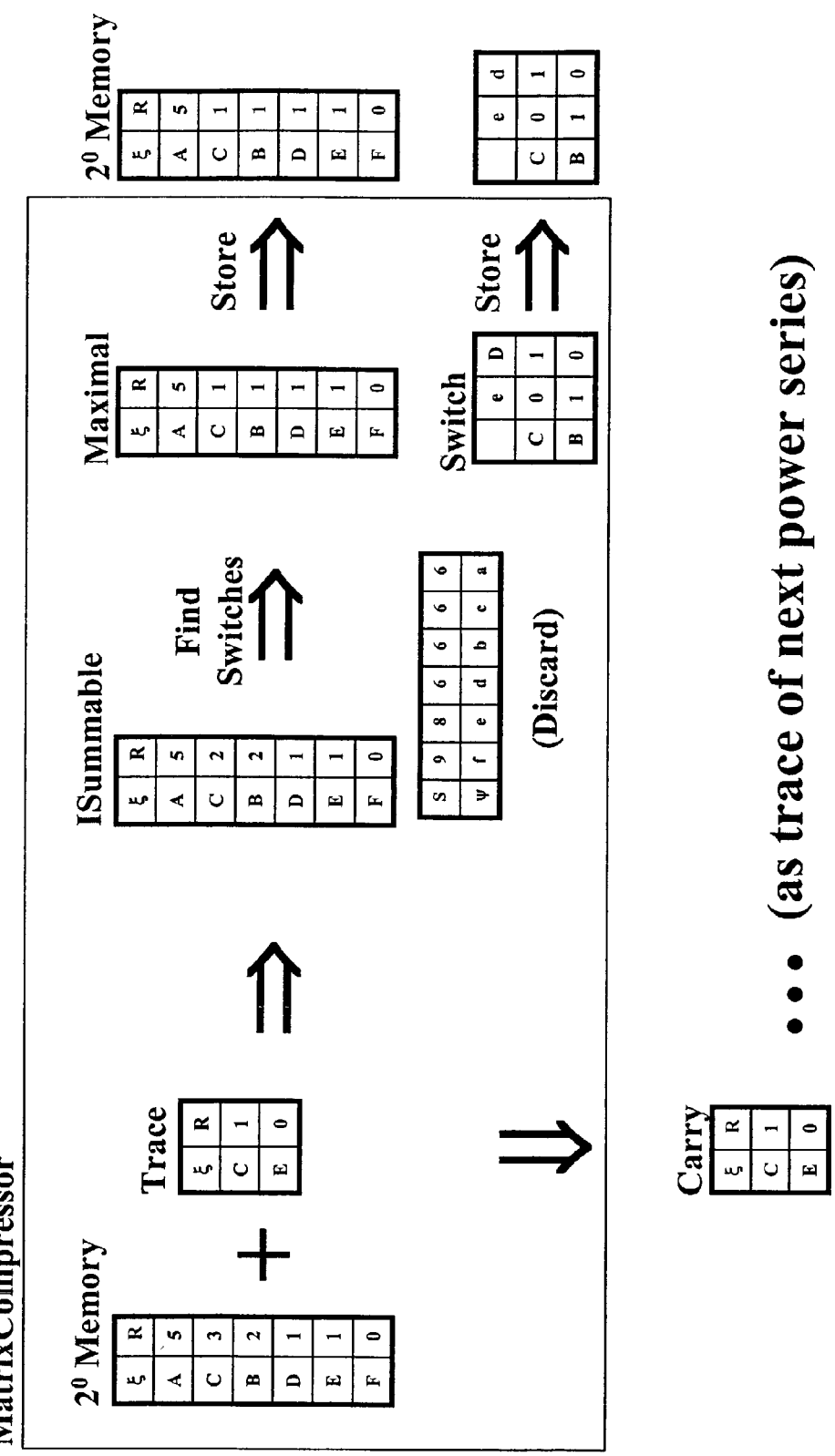
FIG. 38 illustrates writing a third observation into a bit matrix with maximal projections according to some embodiments of the present invention.

FIG. 38 provides yet another example, in this case creating a new ISummable configuration comprising a maximal projection along with one small hole offset within it. In this case, one new association between C and E is added to the first power series, which was stored as a maximal projection. Note, however, that because the association is carried, it is removed rather than added. The result of this sum (actually a removal) to the stored projections creates a new composite ISummable. This composite ISummable is already in sort order; therefore, it does not need to be resorted. The findSwitches operation described above (FIG. 33) calculates a single small new hole after the CE association is carried out of this first power series projection. From only the projections, it is unclear whether C is associated with E or D (and whether B is then associated with E or D, dependent). However, by looking explicitly into the ISummable composite, the true state can be determined and stored in an explicit matrix of the switch. By removing the switch projections from the maximal projection, the maximality of the projection is retained. Moreover, in this example, the projections continue to be in sort order after the removal of the switch and resorting need not be performed.

In summary, for direct composition of two matrices within an ISummable instance, the matrix compressor 3503 can construct the optimal new ISummables 3507 by analyzing their joint projections. The carry matrix as described in some embodiments of the present invention may be handled in the same way. The carry result can be read, for example by the above linear procedure, from one bit level and used in the composition of the next bit level, just like the original trace matrix in the first level.

For efficiency, the indices of each matrix may be local and relative to an offset in the larger matrix. These offsets 3508, 3509 may be used to translate between the indices of application attribute-values and the local indices that can be used in all the embodiments described above. Such offsets may also represent the locations of switches ("holes") within an otherwise maximal matrix.

Although other techniques might provide some level of compression, other techniques may not be able to provide the level of compression of embodiments of the present invention without duplicating at least one of its embodiments. In particular, according to information theory, the binary encoding of a number is known to be its most efficient encoding. Separation of the weights into power series bit matrices, according to some embodiments of the present invention, can preserve this ideal encoding. Like the binary encoding of any number, the scaling effect of this separation generally is logarithmic to the largest number of any pairwise association (the largest number in any non-binary matrix). Such logarithmic scaling may not be superceded in any other single separation or convolution.

Moreover, once the weighted counts of an ordinary matrix are split into binary matrices (weightless graphs), it has been shown that 4-switches are the one and only problem to solve. Specifically, it is known that the 4-switch problem is the only problem in reconstructing a matrix from its {R,S} projections. Embodiments of the present invention can attack the problem by identifying, isolating, and splitting such switches. Thus, power series separation may be the best possible primary technique of decomposition and that following this approach, there may be one and only one solution to the unique problem of switches, as described herein.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An artificial neuron comprising:
  a plurality of inputs; and
  a plurality of dendrites, a respective one of which is associated with a respective one of the plurality of inputs, at least some of the dendrites comprising a power series of weights, at least some of the weights in at least one power of the power series defining a maximal projection.

2. An artificial neuron according to claim 1 wherein at least one power of the power series also includes at least one switch.

3. An artificial neuron according to claim 2 wherein the power series of weights is a base two power series of weights, the at least some of the weights in the at least one power of the power series defining a maximal row projection and/or a maximal column projection.

4. An artificial neuron according to claim 3 wherein the maximal row projection and/or the maximal column projection is sorted by sums of row projections and/or column projections, respectively.

5. An artificial neuron according to claim 3 further comprising:
a trace that is responsive to an input signal at the associated input, the trace being configured to map activations of the input signal to locations in the maximal row projection and/or maximal column projection.

6. An artificial neuron according to claim 5 further comprising:
a router that is configured to map the at least some of the weights in the at least one power of the power series to define the maximal row projection and/or column projection.

7. An artificial neuron according to claim 5 further comprising:
a reader that is configured to determine an activated subset in the maximal row projection and/or maximal column projection in response to the trace and to select, for each column of the activated subset, a smallest row projection that is greater than or equal to an index for the column.

8. An artificial neuron according to claim 7 wherein the reader is further configured to accumulate the smallest row projections that are greater than or equal to the index for the associated column, for the columns of the activated subset, to thereby obtain an association of the input signal with the weights.

9. An artificial neuron according to claim 5 further comprising:
a writer that is configured to embed the trace into the maximal projection and the switch.

10. An artificial neuron according to claim 9 wherein the writer comprises a matrix compressor that is configured to find redundant projections between the trace and the maximal projection.

11. An artificial neuron according to claim 3 further comprising:
a router that is configured to map the at least some of the weights in the at least one power of the power series to define the maximal row projection and/or column projection.

12. An artificial neuron according to claim 1 wherein a respective dendrite comprises a power series of weights, the respective weights in a respective power of the power series defining a maximal projection.

13. An artificial neuron comprising:
a plurality of inputs; and
a plurality of dendrites, a respective one of which is associated with a respective one of the plurality of inputs, at least some of the dendrites including a weight, at least some of the weights defining a maximal projection.

14. An artificial neuron according to claim 13 further comprising at least one switch.

15. An artificial neuron according to claim 14 wherein the maximal projection comprises a maximal row projection and/or a maximal column projection.

16. An artificial neuron according to claim 15 wherein the maximal row projection and/or the maximal column projection is sorted by sums of row projections and/or column projections, respectively.

17. An artificial neuron according to claim 15 further comprising:
a trace that is responsive to an input signal at the associated input, the trace being configured to map activations of the input signal to locations in the maximal row projection and/or maximal column projection.

18. An artificial neuron according to claim 17 further comprising:
a router that is configured to map the at least some of the weights to define the maximal row projection and/or column projection.

19. An artificial neuron according to claim 17 further comprising:
a reader that is configured to determine an activated subset in the maximal row projection and/or maximal column projection in response to the trace and to select, for each column of the activated subset, a smallest row projection that is greater than or equal to an index for the column.

20. An artificial neuron according to claim 19 wherein the reader is further configured to accumulate the smallest row projections that are greater than or equal to an index for the associated column, for the columns of the activated subset, to thereby obtain an association of the input signal with the dendrites.

21. An artificial neuron according to claim 17 further comprising:
a writer that is configured to embed the trace into the maximal projection and the switch.

22. An artificial neuron according to claim 21 wherein the writer comprises a matrix compressor that is configured to find redundant projections between the trace and the maximal projection.

23. An artificial neuron according to claim 15 further comprising:
a router that is configured to map the at least some of the weights to define the maximal row projection and/or column projection.

24. An artificial neuron according to claim 13 wherein a respective dendrite includes a respective weight, the respective weights defining a maximal projection.

25. A method of operating an artificial neuron that includes a plurality of inputs and a plurality of dendrites, a respective one of which is associated with a respective one of the plurality of inputs, the method comprising:
generating a power series of weights for at least some of the dendrites, at least some of the weights in at least one power of the power series defining a maximal projection.

26. A method according to claim 25 wherein the generating further comprises generating a switch for at least one power of the power series.

27. A method according to claim 26 wherein the power series of weights is a base two power series of weights and wherein the generating further comprises generating a maximal row projection and/or a maximal column projection for the at least one power of the power series.

28. A method according to claim 27 wherein the generating further comprises generating the maximal row projection and/or the maximal column projection by sorting by sums of row projections and/or column projections, respectively.

29. A method according to claim 27 further comprising:
mapping activations of the plurality of inputs to locations in the maximal row projection and/or maximal column projection.

30. A method according to claim 29 further comprising:
mapping the at least some of the weights in the at least one power of the power series to define the maximal row projection and/or column projection.

31. A method according to claim 29 further comprising:
determining an activated subset in the maximal row projection and/or maximal column projection in response to the mapping; and
selecting, for each column of the activated subset, a smallest row projection that is greater than or equal to an index for the column.

32. A method according to claim 31 further comprising:
accumulating the smallest row projections that are greater than or equal to the index for the associated column, for the columns of the activated subset, to thereby obtain an association of the plurality of inputs with the weights.

33. A method according to claim 29 further comprising:
embedding the activations that are mapped into the maximal projection and the switch.

34. A method according to claim 33 wherein the embedding comprises:
finding redundant projections between the activations that are mapped and the maximal projection.

35. A method according to claim 27 further comprising:
mapping the at least some of the weights in the at least one power of the power series to define the maximal row projection and/or column projection.

36. A method according to claim 25 wherein the generating comprises:
generating a respective power series of weights for a respective dendrite, the respective weights in a respective power of the power series defining a maximal projection.

37. A method of operating an artificial neuron that includes a plurality of inputs and a plurality of dendrites, a respective one of which is associated with a respective one of the plurality of inputs, the method comprising:
generating a maximal projection for at least some of the dendrites.

38. A method according to claim 37 wherein the generating further comprises generating a switch for the dendrites.

39. A method according to claim 38 wherein the generating further comprises generating a maximal row projection and/or a maximal column projection for the at least some of the dendrites.

40. A method according to claim 39 wherein the generating further comprises generating the maximal row projection and/or the maximal column projection by sorting by sums of row projections and/or column projections, respectively.

41. A method according to claim 39 further comprising:
mapping activations of the plurality of inputs to locations in the maximal row projection and/or maximal column projection.

42. A method according to claim 41 further comprising:
mapping at least some the projections to define the maximal row projection and/or column projection.

43. A method according to claim 41 further comprising:
determining an activated subset in the maximal row projection and/or maximal column projection in response to the mapping; and
selecting, for each column of the activated subset, a smallest row projection that is greater than or equal to an index for the column.

44. A method according to claim 43 further comprising accumulating the smallest row projections that are greater than or equal to an index for the associated column, for the columns of the activated subset, to thereby obtain an association of the input signal with the dendrites.

45. A method according to claim 41 further comprising:
embedding the activations that are mapped into the maximal projection and the switch.

46. A method according to claim 45 wherein the embedding comprises:
finding redundant projections between the activations that are mapped and the maximal projection.

47. A method according to claim 39 further comprising:
mapping at least some the projections to define the maximal row projection and/or column projection.

48. A method according to claim 37 wherein the generating comprises:
generating a maximal projection for the plurality of dendrites.

49. A computer program product for providing an artificial neuron, the computer program product comprising a computer-readable storage medium having computer-readable program code embodied in the medium, the computer-readable program code comprising:
computer-readable program code that is configured to provide a plurality of inputs; and
computer-readable program code that is configured to provide a plurality of dendrites, a respective one of which is associated with a respective one of the plurality of inputs, at least some of the dendrites comprising a power series of weights, at least some of the weights in at least one power of the power series defining a maximal projection.

50. A computer program product according to claim 49 wherein at least one power of the power series also includes at least one switch.

51. A computer program product according to claim 50 further comprising:
computer-readable program code that is configured to provide a router that is configured to map the at least some of the weights in the at least one power of the power series to define the maximal row projection and/or column projection.

52. A computer program product according to claim 50 wherein the power series of weights is a base two power series of weights, the at least one of the weights in the at least one power of the power series defining a maximal row projection and/or a maximal column projection.

53. A computer program product according to claim 52 further comprising:
computer-readable program code that is configured to provide a trace that is responsive to an input signal at the associated input, the trace being configured to map activations of the input signal to locations in the plurality of maximal row projection and/or maximal column projection.

54. A computer program product according to claim 52 wherein the maximal row projection and/or the maximal column projection is sorted by sums of row projections and/or column projections, respectively.

55. A computer program product according to claim 54 further comprising:
computer-readable program code that is configured to provide a router that is configured to map the at least some of the weights in the at least one power of the power series to define the maximal row projection and/or column projection.

56. A computer program product according to claim 54 further comprising:
computer-readable program code that is configured to provide a reader that is configured to determine an activated subset in the maximal row projection and/or maximal column projection in response to the trace and to select, for each column of the activated subset, a smallest row projection that is greater than or equal to an index for the column.

57. A computer program product according to claim 56 wherein the computer-readable program code that is configured to provide a reader is further configured to accumulate the smallest row projections that are greater than or equal to the index for the associated column, for the columns of the activated subset, to thereby obtain an association of the input signal with the weights.

58. A computer program product according to claim 54 further comprising:
computer-readable program code that is configured to provide a writer that is configured to embed the trace into the maximal projection and the switch.

59. A computer program product according to claim 58 wherein the computer-readable program code that is configured to provide a writer comprises computer-readable program code that is configured to provide a matrix compressor that is configured to find redundant projections between the trace and the maximal projections.

60. A computer program product according to claim 49 wherein the computer-readable program code that is configured to provide a plurality of dendrites comprises computer-readable program code that is configured to provide a plurality of dendrites, a respective one of which is associated with a respective one of the plurality of inputs, a respective dendrite comprising a power series of weights, the respective weights in a respective power of the power series defining a maximal projection.

61. A computer program product for providing an artificial neuron, the computer program product comprising a computer-readable storage medium having computer-readable program code embodied in the medium, the computer-readable program code comprising:
computer-readable program code that is configured to provide a plurality of inputs; and
computer-readable program code that is configured to provide a plurality of dendrites, a respective one of which is associated with a respective one of the plurality of inputs, at least some of the dendrites including a weight, at least some of the weights defining a maximal projection.

62. A computer program product according to claim 61 further comprising:
computer-readable program code that is configured to provide at least one switch.

63. A computer program product according to claim 62 wherein the maximal projection comprises a maximal row projection and/or a maximal column projection.

64. A computer program product according to claim 63 wherein the maximal row projection and/or the maximal column projection is sorted by sums of row projections and/or column projections, respectively.

65. A computer program product according to claim 63 further comprising:
computer-readable program code that is configured to provide a trace that is responsive to an input signal at the associated input, the trace being configured to map activations of the input signal to locations in the maximal row projection and/or maximal column projection.

66. A computer program product according to claim 65 further comprising:
computer-readable program code that is configured to provide a router that is configured to map the at least some of the weights to define the maximal row projection and/or column projection.

67. A computer program product according to claim 65 further comprising:
computer-readable program code that is configured to provide a reader that is configured to determine an activated subset in the maximal row projection and/or maximal column projection in response to the trace and to select, for each column of the activated subset, a smallest row projection that is greater than or equal to an index for the column.

68. A computer program product according to claim 67 wherein the computer-readable program code that is configured to provide a reader is further configured to accumulate the smallest row projections that are greater than or equal to an index for the associated column, for the columns of the activated subset, to thereby obtain an association of the input signal with the dendrites.

69. A computer program product according to claim 65 further comprising:
computer-readable program code that is configured to provide a writer that is configured to embed the trace into the maximal projection and the switch.

70. A computer program product according to claim 69 wherein the computer-readable program code that is configured to provide a writer comprises computer-readable program code that is configured to provide a matrix compressor that is configured to find redundant projections between the trace and the maximal projection.

71. A computer program product according to claim 63 further comprising:
computer-readable program code that is configured to provide a router that is configured to map the at least some of the weights to define the maximal row projection and/or column projection.

72. A computer program product according to claim 61 wherein the computer-readable code that is configured to provide a plurality of dendrites comprises computer-readable program code that is configured to provide a plurality of dendrites, a respective one of which is associated with a respective one of the plurality of inputs, a respective one of the dendrites including a respective weight, the respective weights defining a maximal projection.

* * * * *